United States Patent
Li

(10) Patent No.: US 10,534,447 B2
(45) Date of Patent: Jan. 14, 2020

(54) MULTI-SURFACE CONTROLLER

(71) Applicant: Yinbo Li, Fremont, CA (US)

(72) Inventor: Yinbo Li, Fremont, CA (US)

( * ) Notice: Subject to any disclaimer, the term of this patent is extended or adjusted under 35 U.S.C. 154(b) by 0 days.

(21) Appl. No.: 15/405,175

(22) Filed: Jan. 12, 2017

(65) Prior Publication Data
US 2017/0123516 A1  May 4, 2017

Related U.S. Application Data

(63) Continuation-in-part of application No. 14/829,512, filed on Aug. 18, 2015.

(60) Provisional application No. 62/044,372, filed on Sep. 1, 2014.

(51) Int. Cl.
*G06F 3/0346* (2013.01)
*G06F 3/01* (2006.01)
*G06F 3/0354* (2013.01)

(52) U.S. Cl.
CPC ............ *G06F 3/0346* (2013.01); *G06F 3/016* (2013.01); *G06F 3/03547* (2013.01); *G06F 2203/0333* (2013.01); *G06F 2203/0337* (2013.01)

(58) Field of Classification Search
CPC .... G06F 3/0346; G06F 3/016; G06F 3/03547; G06F 3/0485
See application file for complete search history.

(56) References Cited

U.S. PATENT DOCUMENTS

| | | | |
|---|---|---|---|
| 5,144,594 A * | 9/1992 | Gilchrist | G06F 3/0346 178/18.04 |
| D366,875 S | 2/1996 | Kakizaki | |
| D380,473 S | 7/1997 | Otani | |
| D392,945 S | 3/1998 | Barry et al. | |
| D420,006 S | 2/2000 | Tonino | |
| D426,232 S | 6/2000 | Silbermann et al. | |

(Continued)

FOREIGN PATENT DOCUMENTS

| | | |
|---|---|---|
| CN | 1896938 | 1/2007 |
| CN | 101228499 | 7/2008 |

(Continued)

OTHER PUBLICATIONS

International Search Report for PCT Application No. PCT/US2015/46790, dated Dec. 1, 2015, 9 pages.

(Continued)

*Primary Examiner* — Abbas I Abdulselam
(74) *Attorney, Agent, or Firm* — Kilpatrick Townsend & Stockton LLP

(57) ABSTRACT

Disclosed herein are a controller device and a method of detecting user inputs. According to at least one embodiment, an electronic controller device includes first and second button components, a processing circuit and a communication interface. The first and second button components respectively include first and second touch pads. The first and second button components are configured to register click operations by respectively first and second fingers of a user. The first and second touch pads are configured to register touch operations by fingers. The processing circuit is configured to convert the click operations and the touch operations into input signals. The communication interface is configured to transmit the input signals to at least one external device.

31 Claims, 36 Drawing Sheets

(56) References Cited

U.S. PATENT DOCUMENTS

| | | |
|---|---|---|
| D486,144 S | 2/2004 | Esslinger et al. |
| D502,929 S | 3/2005 | Copeland et al. |
| D511,750 S | 11/2005 | Badarello |
| D512,027 S | 11/2005 | Sarasjoki et al. |
| D520,462 S | 5/2006 | Maeyama et al. |
| D527,006 S | 8/2006 | Francz et al. |
| D528,103 S | 9/2006 | Mabry et al. |
| D550,168 S | 9/2007 | Chang |
| D550,654 S | 9/2007 | Miyawaki |
| D556,201 S | 11/2007 | Ashida et al. |
| D597,038 S | 7/2009 | Glassman et al. |
| D620,925 S | 8/2010 | Geck et al. |
| D632,673 S | 2/2011 | Isaias |
| D673,138 S | 12/2012 | Kim et al. |
| D690,684 S | 10/2013 | Lee et al. |
| D693,333 S | 11/2013 | Joe et al. |
| D715,774 S | 10/2014 | Lee et al. |
| D716,767 S | 11/2014 | Lee |
| D716,768 S | 11/2014 | Lee et al. |
| D717,279 S | 11/2014 | Wai |
| D723,008 S | 2/2015 | Kim |
| D724,059 S | 3/2015 | Kim |
| D725,609 S | 3/2015 | Madani |
| D729,208 S | 5/2015 | Ryu et al. |
| D734,743 S | 7/2015 | Geck et al. |
| D746,266 S | 12/2015 | Kwon et al. |
| D773,407 S | 12/2016 | Kim et al. |
| D776,091 S | 1/2017 | Spio |
| D796,454 S | 9/2017 | Zheng |
| D797,743 S | 9/2017 | Awad et al. |
| D798,275 S | 9/2017 | Huang |
| D798,842 S | 10/2017 | Kass et al. |
| D812,041 S | 3/2018 | Fiedler et al. |
| D813,203 S | 3/2018 | Hardi |
| D828,337 S | 9/2018 | Li |
| D844,608 S | 4/2019 | Chen et al. |
| 2002/0084986 A1 | 7/2002 | Armstrong |
| 2002/0118167 A1 | 8/2002 | Mei et al. |
| 2002/0158815 A1* | 10/2002 | Zwern ............... G09B 9/00 345/7 |
| 2005/0179658 A1 | 8/2005 | Huang et al. |
| 2006/0001657 A1 | 1/2006 | Monney et al. |
| 2006/0197750 A1 | 9/2006 | Kerr et al. |
| 2006/0274042 A1 | 12/2006 | Krah et al. |
| 2006/0279529 A1 | 12/2006 | Kitazawa |
| 2007/0008284 A1 | 1/2007 | Kim et al. |
| 2007/0049374 A1 | 3/2007 | Ikeda et al. |
| 2007/0050597 A1 | 3/2007 | Ikeda |
| 2008/0148184 A1 | 6/2008 | Davis |
| 2009/0054145 A1 | 2/2009 | Yang et al. |
| 2010/0259481 A1* | 10/2010 | Oh ............... G06F 3/03548 345/163 |
| 2010/0295787 A1 | 11/2010 | Tang |
| 2010/0302190 A1 | 12/2010 | Yeh |
| 2012/0075242 A1* | 3/2012 | Hotelling ............ G06F 3/044 345/174 |
| 2012/0188191 A1 | 7/2012 | Chen et al. |
| 2012/0194427 A1 | 8/2012 | Lee et al. |
| 2013/0038534 A1 | 2/2013 | Krah et al. |
| 2013/0141373 A1 | 6/2013 | Takuma et al. |
| 2013/0231186 A1 | 9/2013 | Yoshizawa et al. |
| 2013/0342455 A1 | 12/2013 | Choi et al. |
| 2014/0009441 A1* | 1/2014 | Bernstein ............ G06F 3/016 345/174 |
| 2014/0118261 A1 | 5/2014 | Choi et al. |
| 2014/0139433 A1 | 5/2014 | Choi et al. |
| 2015/0074578 A1* | 3/2015 | Liang ............... G06F 3/0488 715/770 |
| 2015/0109209 A1* | 4/2015 | Fu ............... G06F 3/0346 345/163 |
| 2016/0062489 A1 | 3/2016 | Li |
| 2017/0123516 A1 | 5/2017 | Li |

FOREIGN PATENT DOCUMENTS

| | | |
|---|---|---|
| CN | 101611371 | 12/2009 |
| CN | 102778961 | 11/2012 |
| CN | 103513894 | 1/2014 |
| CN | 302953597 | 10/2014 |
| JP | 09212288 | 8/1997 |
| JP | 2001290598 | 10/2001 |
| JP | 2008532185 | 8/2008 |
| JP | 2008542915 | 11/2008 |
| JP | 2009064449 | 3/2009 |
| JP | D1391476 | 7/2010 |
| JP | 2014002719 | 1/2014 |
| JP | 6408156 | 9/2018 |
| WO | 2008111138 | 9/2008 |
| WO | D82132/000001 | 11/2013 |

OTHER PUBLICATIONS

Non-Final Office Action for U.S. Appl. No. 14/829,512, dated Jan. 25, 2017.

Final Office Action for U.S. Appl. No. 14/829,512, dated Jul. 25, 2017.

Device Control Hardware by FutureVideo, Available Online at: http://www.futurevideo.com/device-control-hardware.htm, 2012, (Retrieved Jan. 24, 2019), 4 pages.

U.S. Appl. No. 14/829,512, Advisory Action dated Dec. 6, 2017, 9 pages.

U.S. Appl. No. 14/829,512, Non-Final Office Action dated Feb. 7, 2018, 26 pages.

U.S. Appl. No. 29/608,273, Notice of Allowance dated May 9, 2018, 11 pages.

European Application No. 15837335.7, Extended European Search Report dated Jul. 2, 2018, 12 pages.

European Application No. 15837335.7, Partial Supplementary European Search Report dated Mar. 28, 2018, 12 pages.

Japanese Application No. 2017-530960, Notice of Decision to Grant dated Aug. 14, 2018, 6 pages.

Japanese Application No. 2017-530960, Office Action dated May 8, 2018, 9 pages.

International Application No. PCT/US2015/046790, International Preliminary Report on Patentability dated Mar. 16, 2017, 8 pages.

Care Touch Digital Thermometer—Infrared Ear and Forehead Fever Thermometer, 4 Pages, Retrieved from the internet on Jul. 9, 2019.

U.S. Appl. No. 29/659,728, Notice of Allowance dated Jul. 25, 2019, 7 pages.

Chinese Application No. 201580053746.1, Office Action dated May 7, 2019, 13 pages.

U.S. Appl. No. 14/829,512, "Final Office Action", dated Jul. 19, 2018, 28 pages.

U.S. Appl. No. 14/829,512, "Non-Final Office Action", dated Jan. 9, 2019, 27 pages.

U.S. Appl. No. 14/829,512, "Notice of Allowance", dated May 24, 2019, 6 pages.

* cited by examiner

2101
Ctrl - C

2102
Ctrl - V

2103
Ctrl - Z

2104
Ctrl - S

2105
Ctrl - A

2106
Ctrl - X

MULTI-SURFACE CONTROLLER

CROSS-REFERENCE TO RELATED APPLICATIONS

This application is a continuation-in-part of U.S. patent application Ser. No. 14/829,512, entitled "MULTI-SURFACE CONTROLLER," filed on Aug. 18, 2015, which claims priority benefit of U.S. Provisional Application No. 62/044,372, entitled "MULTI-SURFACE TOUCH BASED WIRELESS CONTROLLER FOR COMPUTING APPARATUS," filed on Sep. 1, 2014, all of which are incorporated herein by references.

FIELD

The present specification relates to a control device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A personal computer or workstation may use an electronic mouse as a control device. Regardless of different shapes, sizes, and designs, most of the electronic mice are held by human hands to move on a flat surface, and the movement of the electronic mouse is produced by movements of the wrist and/or arm of a user. Either a rubberized ball or a laser beneath the electronic mouse is used to measure the displacement over the underlying surface, which is then translated to the movement of a cursor on the computer display. A traditional mouse may include two or three actuator buttons on the top surface, which may be clicked by the index finger and/or middle finger to control the operations of the computer. The thumb in most cases is just for the purpose of holding and moving the electronic mouse.

Due to the requirement of a flat surface to operate the traditional mouse, the mouse user has to extend the arm and hand away from the body over a desk surface. Usually there is no supporting structures on which the arm may rest, and the arm and hand may need to be maintained in an unnatural position for the full duration of the computer operation or at least on occasion for prolonged periods of time. Prolonged use of the electronic mouse on a flat surface has caused shoulder and back pain for many users. The medical society has long recognized the direct connection between prolonged use of an electronic mouse and a repetitive stress injury on an arm such as in carpal tunnel syndrome. A wireless mouse differs from the wired mouse (serial or USB) in communication methods used to connect the electronic mouse to the computer, while the wireless mouse still requires a flat surface to operate on and thereby causes similar health issues for the users.

Personal computers and workstations may include separate hardware/software units to implement various accessory functionalities that include, but are not limited to, a mouse, a keyboard, a microphone and speakers, a monitor. A user may have to switch among various interface devices to interact with a computer, for example to use a mouse for navigation, a keyboard for text inputting, and a microphone and speakers for giving a voice command or receiving computer's audio output, and a monitor for receiving computer's visual output. Furthermore, multiple electronic devices may be used at home, in different locations using different platforms. A user may have to walk around the house to approach different devices for different purposes. For example, the user may sit in front of a desktop computer or a laptop to work on some documents or do some reading, or browse the Internet using a tablet in the bedroom, or go to the living room and sit in front of a flat screen television to watch TVs or play video games, or use a smart phone to text and make phone calls wherever the user goes. Therefore, the user experience operating on the variety of computing/electronic systems is segmented.

SUMMARY

In at least one embodiment, a control device is provided for accommodating multiple interfacing requirements. In at least one embodiment, a control device is provided for controlling multiple computing/electronic devices. In at least one embodiment, the controller includes multiple buttons with touch sensors connected at the top of the buttons, forming touch pads. In at least one embodiment, the buttons and touch pads detect various finger operations caused by the movements and/or gestures of fingers, and translate the detected finger operations into control commands for controlling various devices. In at least one embodiment, the controller does not need a flat surface to operate on, and thus allows the user to hold and manipulate the controller in a natural posture without stressing his neck, shoulder, back, and/or wrist. In at least one embodiment, the controller communicates with a variety of computing devices and/or electronic devices via wireless and/or wired communication.

In at least one embodiment, the controller includes a thumb button with a thumb touch pad for the thumb to operate, and two buttons, each having a touch pad, for the index and middle finger to operate, respectively. In another embodiment, the two buttons that are dedicated for the index finger and middle finger may be combined into one button. In at least one embodiment, the buttons detect click operations and the touch pads detect touch operations, when the fingers move and/or make gestures on the buttons and/or touch pads. In at least one embodiment, some or all of the buttons' resistance may be programmable so that a user can adjust them in the configuration menu. In at least one embodiment, some or all of the buttons may have haptic/tactile feedback. In at least one embodiment, the controller can recognize handwriting through the thumb's moving trajectory on the thumb touch pad. In at least one embodiment, the controller may operate in a variety of user selectable configurations and/or modes, according to which the click and/or touch operations of the fingers are translated to various control commands for controlling the computing devices and/or other devices. In at least one embodiment, the controller generates control commands based on a combination of movements of different fingers on different buttons and/or touch pads. In at least one embodiment, the controller includes a microphone for receiving voice commands that are translated into control commands. In at least one embodiment, the controller includes a light that lights up in different manners for indicating different types of information (e.g., power status, operation status, etc.). In at least one embodiment, the controller includes a laser for presentation and/or pointing purposes. In at least one embodiment, the controller includes at least one connector for connecting to external devices such as a headset and/or a set of goggles. In at least one embodiment, the controller includes motion sensors for detecting the motion and/or orientation of the controller, which may be interpreted individually or in combination with other detected signals for generating control commands. In at least one embodiment when the controller is equipped with motion sensors, the controller may recognize handwriting based on the controller's moving trajectory in the air. In at least one embodiment, the controller includes a touchscreen that may display contents for the user to interact with. In at least one embodiment, the controller may control a soft keyboard on a display for inputting text and/or other content. In at least one embodiment, the controller may be mirror symmetric that can be manipulated by a right hand as well as a left hand.

In at least one embodiment, the controller serves as a human-machine interface for the user to interact with multiple computing/electronic devices. For example, the controller is configured to remotely control personal computers, laptop computers, workstations, smart phones, tablet computers, mobile devices, and/or televisions (TV), for example. In at least one embodiment, the controller provides a single display platform for a variety of different display devices (e.g., a flat screen TV, a projector, a set of projection goggles, and/or a headset).

In at least one embodiment, the controller has multiple buttons. Each of the buttons can include a touch pad for a finger (or multiple fingers) to operate. In at least one embodiment, the buttons detect click operations and the touch pads detect touch operations, when the fingers move and/or make gestures on the buttons and/or touch pads. In other embodiments, at least one of the buttons does not have a touch pad connected to it. In such case, the buttons only register the finger operations on the buttons as click operations. Throughout this specification the term "touch button" will be used to describe a button that has a touch pad connected to it. Both click operations and touch operations can be detected by the touch buttons. The term "regular button" or "click button" refers to a conventional button that can only detect click operations.

In at least one embodiment, the controller includes a thumb touch button for the thumb to operate, an index-finger touch button for the index finger to operate, and a middle-finger button for the middle finger to operate. In at least one embodiment, the thumb touch button is located on the top of the controller. In at least one embodiment, the index-finger touch button is located on the front of the controller. In at least one embodiment, the middle-finger button is located also on the front of the controller, next to the index touch button. In at least one alternative embodiment, the middle-finger button is located on the side of the controller.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-26 and 29 is a brief description of each element, which may have no more than the name of each of the elements in the one of FIGS. 1-26 and 29 that is being discussed. After the brief description of each element, each element is further discussed in numerical order. In general, each of FIGS. 1-29 is discussed in numerical order and the elements within FIGS. 1-29 are also usually discussed in numerical order to facilitate easily locating the discussion of a particular element. Nonetheless, there is no one location where all of the information of any element of FIGS. 1-29 is necessarily located. Unique information about any particular element or any other aspect of any of FIGS. 1-29 may be found in, or implied by, any part of the specification.

It should be understood that specific embodiments described herein are only used to explain at least one embodiment but not used to limit the present invention.

Figure 1:
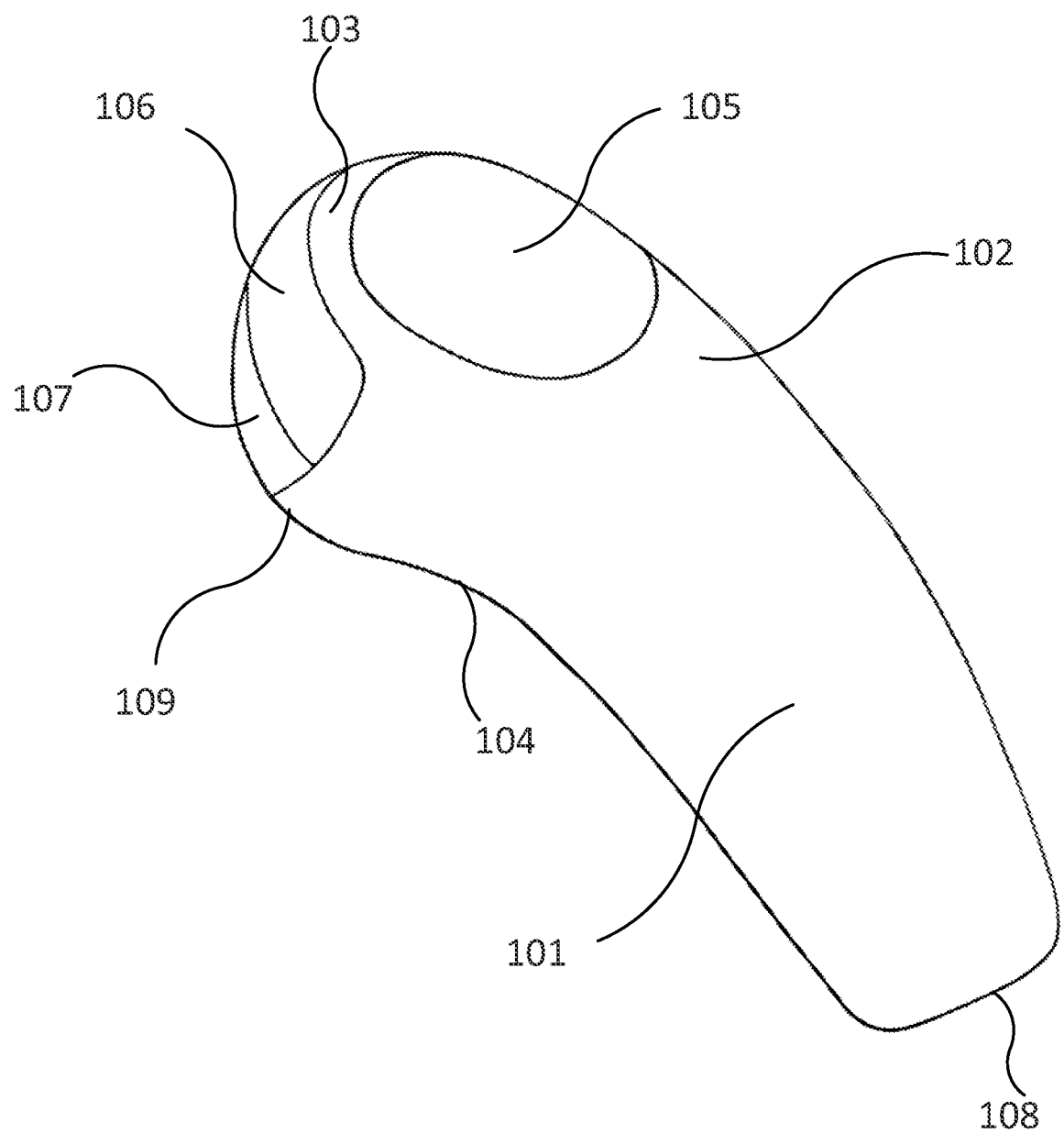
FIG. 1 shows an embodiment of a controller.

FIG. 1 shows an embodiment of a controller 100. Controller 100 includes at least a housing 101, a top surface 102, a front slope 103, a concave area 104, a thumb button 105, an index button 106, a middle button 107, a tail end 108, and a head end 109. In other embodiments, the controller 100 may not have all of the elements or features listed and/or may have other elements or features instead of or in addition to those listed.

FIG. 1 shows a perspective view of a controller that has multiple buttons and/or touch pads for detecting movement and/or gestures of fingers.

Controller 100 is a handheld control device that is configured to control multiple computing devices and/or electronic devices to perform functions such as, but not limited to, pointing, selection, zooming, rotation, menu activation, navigation, and inputting contents and/or commands. In at least one embodiment, the controller 100 includes sensors that are connected to multiple buttons for detecting finger movements and/or gestures. In at least one embodiment, the controller 100 has an ergonomic shape, and is mirror symmetric and thus capable of accommodating the left hand (e.g., in a left hand mode) and a right hand (e.g., in a right hand mode). In an embodiment since when a left handed person uses controller 100, the finger tips of the left handed person are on the opposite side of controller 100 compared to when a right handed person uses the controller 100, a left hand mode and a right hand mode are provided. In the left hand mode which portions of the touch pad respond to pressing and/or touching at different parts of the touch pad are in mirror locations of the touch pad with respect to where those locations are when in the right hand mode. In at least one embodiment, the controller 100 does not need to be rested on a flat surface (e.g., table surface) to operate, and thus minimizes stress and fatigue of the muscles of the user. In at least one embodiment, the controller 100 does not include a rubberized ball or a laser that detects the motion of the controller 100 with respect to a flat surface. In at least one embodiment, the controller 100 may implement operations that can be performed by a traditional electronic mouse, as well as many other operations.

In at least one embodiment, the controller 100 communicates with various computing/electronic devices wirelessly and/or via cables or wires. In at least one embodiment, the controller 100 provides an integrated user interface for the user to interact with various computing devices, and thus enhances user experience. Throughout this specification the terms "controller," "controlling device," "control device," "pointing device," "mouse," and "interface device" are used interchangeably, and may be substituted one for the other to obtain different embodiments.

Housing 101 is a housing that retains and/or supports the mechanical and electronic components of the controller 100. In at least one embodiment, the housing 101 has a curved handle shape that fits the arches of a half-way closed human hand. In at least one embodiment, the housing 101 may have different sizes for different sized hands. In at least one embodiment, the housing 101 is mirror symmetric. In other embodiments, the housing 101 may include other shapes and/or structures. For example, the housing 101 may have a ball shape or close to a ball shape with two buttons (or one button) located in the front end and one button on the top.

Top surface 102 is the top surface of the housing 101, in the orientation as shown in FIG. 1. In at least one embodiment, when the controller 100 is held in the hand of a user, the thumb may rest on the top surface 102. In at least one embodiment, the top surface 102 is defined as the surface that is in contact with the thumb when the user holds the controller 100. In other embodiments, top surface 102 may face in different directions when the controller 100 is in normal use.

Front slope 103 is a slope on a head end of the controller 100, extending at an angle from the top surface 102 of the controller 100. In at least one embodiment, the front slope 103 is located between a thumb button on the top surface 102 and an index button on the head end of the controller 100. In at least one embodiment, the front slope 103 is curved.

Concave area 104 is a concave area on a bottom surface of the housing 101. In at least one embodiment, when holding the controller 100 in the hand, the ring finger and the little finger of the hand wrap underneath the concave area 104 for providing better support and grip. Throughout this specification, the terms "concave area," "concave," and "trough" are used interchangeably, and may be substituted one for the other to obtain different embodiments.

Thumb button 105 is a button that is located on the top surface 102, close to the head end of the controller 100. In at least one embodiment, the thumb button 105 has a circular or oval shape. In at least one embodiment, when the user holds the controller 100 with his right hand or left hand, the thumb of the right hand or left hand rests on the thumb button 105 in a natural posture, and may click and/or move on the thumb button 105. In at least one embodiment, the thumb button 105 is connected to a button switch and/or other sensors for detecting click operations on the thumb button 105 (e.g., single click, double click, holding down, etc.). In at least one embodiment, the resistance of the buttons of controller 100 in response to user's click operations is adjustable. In at least one embodiment, when the pressure of the finger clicking and/or pressing down on the button (or a portion of the button) is higher than a predetermined threshold, the click/pressing is registered by the button (the lower the threshold, the less resistance of the button, and the more sensitive the button). In at least one embodiment, the user may choose and/or change the threshold of the buttons of the controller 100 so as to adjust the sensitivity of the buttons in different operation mode or circumstance (e.g., the user may need more sensitive buttons to play a video game than in regular control mode and TV mode). In at least one embodiment, there is a game mode and one or more other modes (e.g., a TV mode and control mode) for performing other types of tasks, and when in the game mode, the default threshold for the pressure that needs to be applied to the buttons is preset to a threshold that is lower than the default preset threshold during the control mode and/or TV mode. In other embodiments, the thumb button 105 may have other shapes and/or sizes. Throughout this specification the terms "main button," "function button," and "thumb button" are used interchangeably, and may be substituted one for the other to obtain different embodiments.

In at least one embodiment, a top surface of the thumb button 105 includes high resolution touch sensors, and thus the top surface of the thumb button 105 serves as a thumb touch pad. In at least one embodiment, the touch sensors of the thumb touch pad detect touch operations (e.g., single tap, double-tap, scroll, swipe, etc.) when the thumb makes movements and/or gestures on the thumb touch pad. In at least one embodiment, the thumb touch pad may have haptic/tactile feedback (e.g., a vibration or a click may be created in response to inputting a command into the touchpad) to notify user his/her touch operation has been executed. In at least one embodiment, the thumb touch pad may have different types of haptic/tactile feedback for different touch operations In at least one embodiment, the click operations and/or touch operations detected by the thumb button 105 and thumb touch pad, respectively, may be combined with other data (e.g., mode of operation, input data from other buttons and/or touch pads, voice commands, motion signals, etc.) for the controller 100 to generate control commands for controlling various devices. In at least one embodiment, the controller 100 includes a circuit that collects and analyzes signals and generates control instructions to control a variety of devices. Throughout this specification the terms "data," "information," and "content" are used interchangeably, and may be substituted one for the other to obtain different embodiments. Throughout this specification the terms "thumb touch pad," "main pad," "main touch pad," "function pad," and "thumb pad" are used interchangeably, and may be substituted one for the other to obtain different embodiments. Throughout this specification the terms "touch pad," "touch surface," "touchscreen," and "touch screen" are used interchangeably, and may be substituted one for the other to obtain different embodiments.

In at least one embodiment, a triple click anywhere on the thumb button 105 brings up a setup menu. The setup menu allows the user to choose from different configurations, operation modes, and/or various settings such as, but not limited to, left-hand and right-hand configurations, a control mode, a text input mode, a presentation mode, a television mode, a game mode, a three-dimension (3-D) mode, a media control mode, a handwriting mode, a voice command mode, an idle mode, a sleep mode, soft keyboard settings, energy saving settings, motion sensors settings, light indication settings, and button resistance settings. The configurations, modes, and/or settings will be discussed in conjunction with FIGS. 6, 7A, 7B, and 9-22.

Index button 106 is a button that is located on the head end of the controller 100, next to the front slope 103. In at least one embodiment, the index button 106 has a shape of a narrow long strip that is curved to align with the arc shape of the head end of the controller 100. In at least one embodiment, the index button 106 extends along the arc-shaped front side of the head end, allowing the index button 106 to be effectively activated by the index finger regardless of whether the controller 100 is held by a right hand or a left hand. In at least one embodiment, the index button 106 is connected to a button switch and/or other sensors for detecting click operations when the index finger clicks or presses down on the index button 106. In other embodiments, the index button 106 may have other shapes and/or sizes. In at least one embodiment, the index button 106 may include the functionalities of a "left button" of a traditional electronic mouse, besides of many other functions. Throughout this specification the terms "index button," "index finger button," and "left button" are used interchangeably, and may be substituted one for the other to obtain different embodiments.

In at least one embodiment, the surface of the index button 106 faces outward, perpendicular to the top surface of the thumb button 105. In at least one embodiment, high resolution touch sensors are connected on top of the index button 106, and thus serve as an index touch pad. In at least one embodiment, the touch sensors of the index touch pad detect touch operations when the index finger moves and/or makes gestures on the index touch pad. In at least one embodiment, the index touch pad may have haptic/tactile feedback to notify user his/her touch operation has been executed. In at least one embodiment, the index touch pad may have different types of haptic/tactile feedback for different touch operations. For example, the haptic feedback for a scroll operation could be different from that of a swipe operation. In at least one embodiment, the click operations and touch operations detected by the index button 106 and the index touch pad, respectively, may be combined with other data for the controller 100 to generate control commands. Throughout this specification the terms "index touch pad," "index finger touch pad," "index pad," and "left touch pad" are used interchangeably, and may be substituted one for the other to obtain different embodiments.

Middle button 107 is a button that is located on the head end of the controller 100, parallel to the index button 106 and close to the bottom surface of the housing 101. In at least one embodiment, the middle button 107 has a similar shape as the index button 106, and is placed next to the index button 106. In at least one embodiment, the middle button 107 extends along the arc-shaped head end to a similar extent to which the index button 106 extends, allowing the middle button 107 to be effectively activated by the middle finger regardless of whether a right hand or a left hand is used. In at least one embodiment, the middle button 107 is connected to a button switch and/or other sensors for detecting click operations when the middle finger clicks or presses down on the middle button 107. In at least one embodiment, the middle button 107 may include the functionalities of a "right button" of a traditional electronic mouse, besides of many other functions. In other embodiments, the middle button 107 may have other shapes and/or sizes. Throughout this specification the terms "middle button," "middle finger button," "middle pad," and "right button" are used interchangeably, and may be substituted one for the other to obtain different embodiments.

In at least one embodiment, the surface of the middle button 107 faces outward in a similar direction as the surface of the index button 106. In at least one embodiment, high resolution touch sensors are connected on top of the middle button 107, and thus serve as a middle touch pad. In at least one embodiment, the touch sensors on the middle touch pad detect touch operations when the middle finger moves and/or makes gestures on the middle touch pad. In at least one embodiment, the middle touch pad may have haptic/tactile feedback to notify user his/her touch operation has been executed. In at least one embodiment, the middle touch pad may have different types of haptic/tactile feedback for different touch operations. For example, the haptic feedback for a scroll operation could be different from that of a swipe operation. In at least one embodiment, the click operations and touch operations detected by the middle button 107 and the middle touch pad, respectively, may be combined with other data for the controller 100 to generate control commands. Throughout this specification the terms "middle touch pad," "middle finger touch pad," and "right touch pad" are used interchangeably, and may be substituted one for the other to obtain different embodiments.

In at least one embodiment, when the user holds the controller 100 in his hand, the index finger and middle finger are in contact with the index button 106 and middle button 107, respectively, in a natural posture. In at least one embodiment, the touch sensors of the index touch pad and middle touch pad are capable of detecting both, and distinguishing between when the index finger and middle finger move along the index touch pad and middle touch pad, respectively (which may cause the screen to scroll) and when the index finger and middle finger move across the index touch pad and middle touch pad, respectively (which may cause the screen to display a swiping action—which is the sliding from one page to another in response to the cursor being moved in a fashion mimicking a swipe by a finger on the touchscreen of a smart phone). In at least one embodiment, the touch sensors of the thumb touch pad may have higher precisions than those of the index and/or middle touch pads, and thus can detect more complex movements of the thumb with higher precisions (e.g., during fine pointing control, for handwriting recognition, etc.). In an embodiment, it may be cost-effective to attach different touch sensors having different resolutions on different buttons, depending on the desired functionality of each button.

Throughout this specification, the sensors connected to the buttons (e.g., thumb button 105, index button 106, and middle button 107) are configured to detect click operations, while the touch sensors of the touch pads (e.g., thumb touch pad, index touch pad, and middle touch pad) are configured to detect touch operations. In an embodiment, each of the buttons of the controller 100 is dedicated to be manipulated by a different finger. Therefore, when each button is dedicated for a different finger, the touch pad on top of each button may not require multi-touch technology that is configured to detect multiple touches simultaneously on the same touch pad. In an embodiment when each button is dedicated for a different finger, it may be cost-effective not to include complex logic and/or circuits for detecting and processing multi-touch signals on each touch pad. In another embodiment, one or more of the touch pads of the controller 100 may be operated by multiple fingers (e.g., the index button 106 and middle button 107 may be replaced by a single button that can be operated by both the index and middle fingers), and thus multi-touch technology may be adopted to detect and process the multi-touch signals.

Tail end 108 is the end of the controller 100 that is closest to the wrist when the controller 100 is held in the hand of the user.

Head end 109 is the end of the controller 100 that is wrapped by the index and middle fingers when the controller 100 is held in the hand of the user.

In at least one embodiment, the controller 100 has a length of 5 inches, a width of ⅝ inches at the narrowest point and ⅞ inches at the widest point, and a height of ⅞ inches. The concave area 104 has a depth of ¼ inches. It should be understood that modifications may be made without departing from the essential teachings of the invention. The dimensions of the controller 100 may have a tolerance of 10%. Of course, components that are intended to fit snugly within one another need to vary together so that those components still fit within one another, snugly. In other embodiments other dimensions may be used that are outside of the 10% tolerances of the dimensions.

Figure 2:
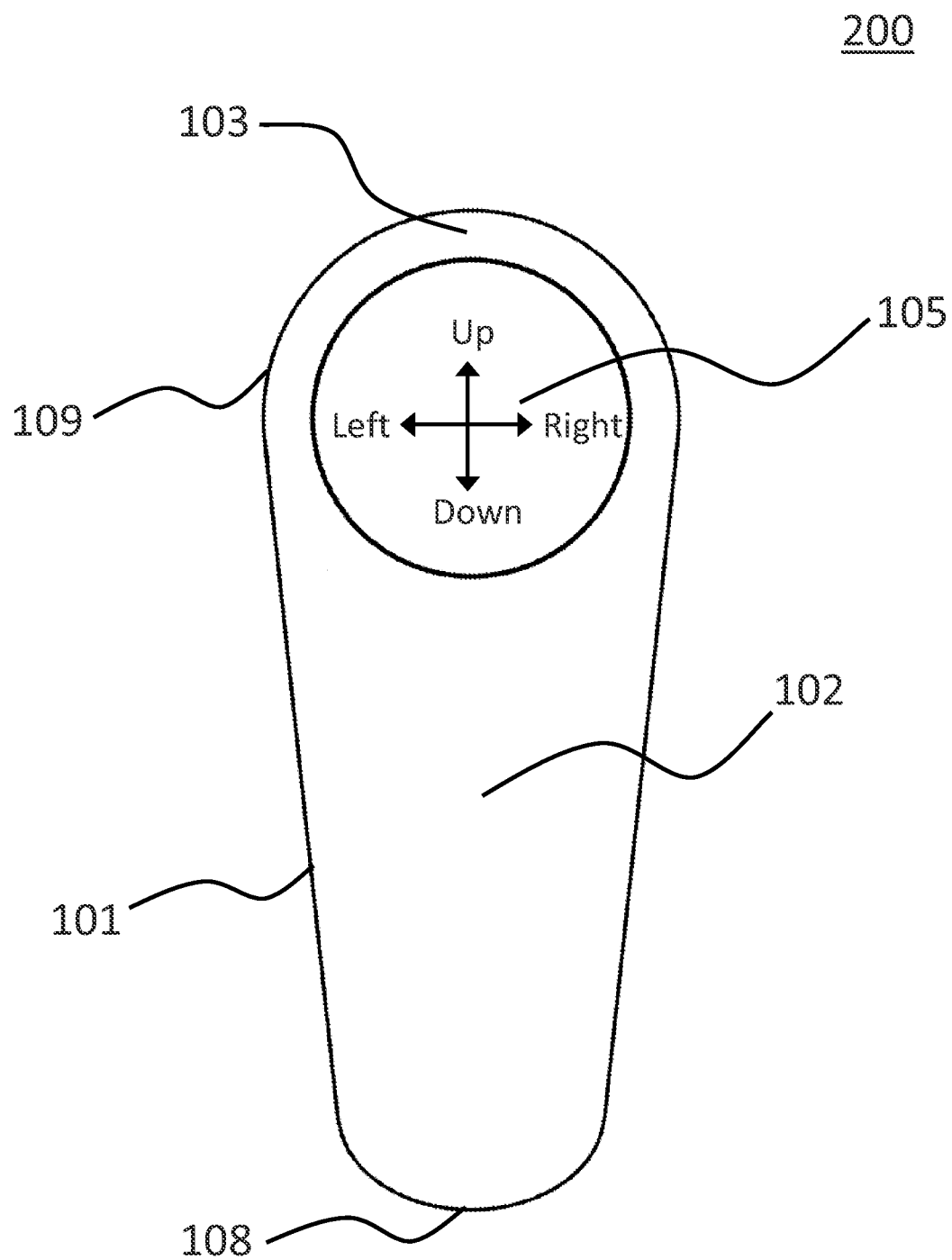
FIG. 2 shows a top view of an embodiment of the controller of FIG. 1.

FIG. 2 shows a top view 200 of an embodiment of the controller 100 of FIG. 1. The view 200 shows at least housing 101, top surface 102, front slope 103, thumb button 105, tail end 108, and head end 109. In other embodiments, the device in view 200 may not have all of the elements or features listed and/or may have other elements or features instead of or in addition to those listed.

FIG. 2 shows a top view 200 when the user looks at the top surface 102 of the controller 100. In at least one embodiment, the directions with respect to the thumb touch pad are indicated by arrows in FIG. 2 and defined as follows. Left is defined as the direction toward the left edge of the thumb touch pad. Right is defined as the direction toward the right edge of the thumb touch pad. Up is defined as the direction toward the front slope 103. Down is defined as the direction toward the tail end 108.

Figure 3:
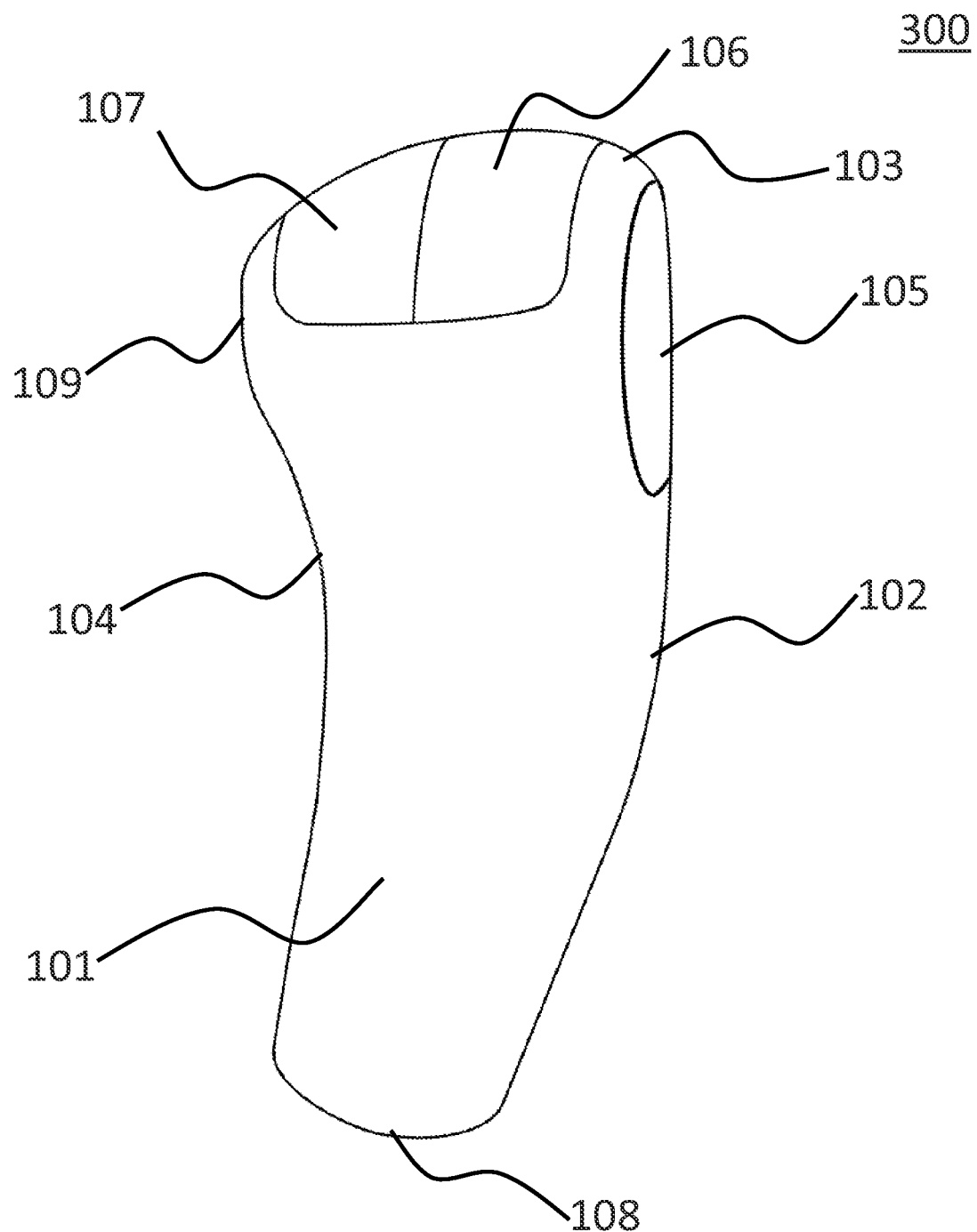
FIG. 3 shows a side view of an embodiment of the controller of FIG. 1.

FIG. 3 shows a side view 300 of an embodiment of the controller 100 of FIG. 1. View 300 shows at least housing 101, top surface 102, front slope 103, concave area 104, thumb button 105, index button 106, middle button 107, tail end 108, and head end 109. In other embodiments, the device in view 300 may not have all of the elements or features listed and/or may have other elements or features instead of or in addition to those listed.

FIG. 3 shows a side view 300 of the controller 100 with the thumb button 105 located on the top surface while the index button 106 and middle button 107 on the front side of the head end 109. In an embodiment, the head end 109 is curved so that the index and middle fingers wrap around the head end 109 in a comfortable and natural posture. In an embodiment, the front slope 103 between the thumb button 105 and index button 106 is at an angle that is less than 90 degrees from the top surface 102. In an embodiment, the surfaces of the index button 106 and middle button 107 are at a plane that is perpendicular to the surface of the thumb button 105. In at least one embodiment, the front slope 103 between the thumb button 105 and index button 106 is at an angle that is more than 60 degrees but less than 120 degrees with respect to the top surface 102. In an embodiment, the front slope 103 is at an angle that is between 60 degrees and 70 degrees with respect to the top surface 102. In an embodiment, the front slope 103 is at an angle that is between 70 degrees and 80 degrees with respect to the top surface 102. In an embodiment, the front slope 103 is at an angle that is between 80 degrees and 90 degrees with respect to the top surface 102. In an embodiment, the front slope 103 is at an angle that is between 90 degrees and 100 degrees with respect to the top surface 102. In an embodiment, the front slope 103 is at an angle that is between 100 degrees and 110 degrees with respect to the top surface 102. In an embodiment, the front slope 103 is at an angle that is between 110 degrees and 120 degrees with respect to the top surface 102. In an embodiment, the front slope 103 is at an angle that is less than 60 degrees with respect to the top surface 102. In an embodiment, the front slope 103 is at an angle that is greater than 120 degrees with respect to the top surface 102. In an embodiment, the index button 106 and middle button 107 face the same direction. In another embodiment, the index button 106 faces a direction that is different from the direction of the middle button 107. For example, when the top surface 102 faces upwards, the index button 106 may face a direction at an angle upwards and middle button 107 may face a direction at an angle downwards. In another example of the controller being ball shaped, the index button and middle button face different directions.

Figure 4:
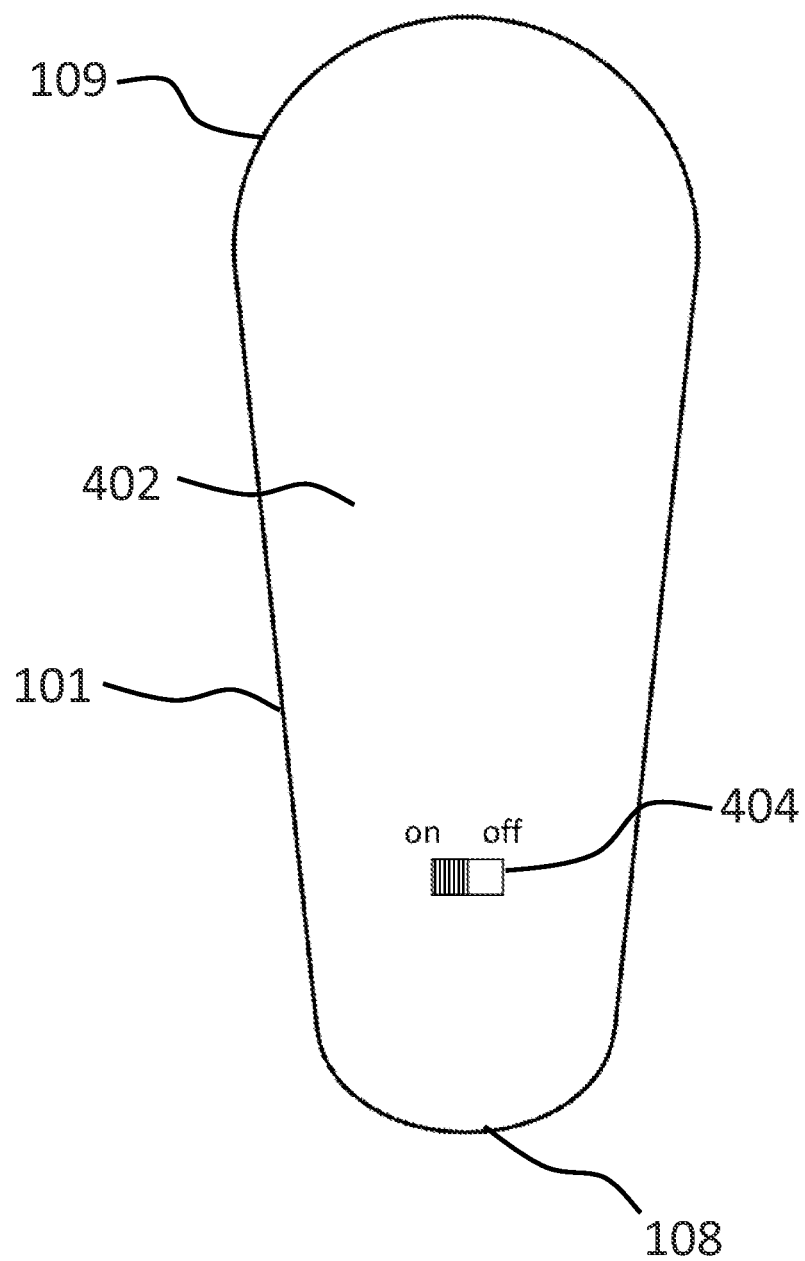
FIG. 4 shows a bottom view of an embodiment of the controller of FIG. 1.

FIG. 4 shows a bottom view 400 of an embodiment of the controller 100 of FIG. 1. View 400 shows at least housing 101, tail end 108, and head end 109. View 400 further shows a bottom surface 402 and a switch 404. In other embodiments, the device in view 400 may not have all of the elements or features listed and/or may have other elements or features instead of or in addition to those listed.

FIG. 4 shows a view 400 from the bottom of the controller 100.

Bottom surface 402 is the surface at the bottom of the controller 100. In at least one embodiment, the bottom surface 402 is curved at the concave area 104, where the ring finger and little finger wrap to support the holding of the controller 100. In other embodiments, the bottom surface 402 may include other shapes and/or structures. In at least one embodiment, the concave area 104 of the bottom surface 402 may have structures such as bumps and/or convex curved lines for a better grip.

Switch 404 is an on-and-off switch that is located on the bottom surface, close to the tail end 108. In an embodiment, the switch 404 is a slide switch that can be pushed to stop at two positions, in which the controller 100 is either turned on or off. In other embodiments, switch 404 may be a push button, toggle, rotary selector switch, or any other switch. In at least one embodiment, the switch 404 is located away from the ring finger and little finger that wrap underneath the concave area 104 of the controller 100 when in operation. In other embodiments, the switch 404 may be in any other location on controller 100. In other embodiments, the switch 404 may be located only in a location where the switch is unlikely to interfere with the normal finger and/or hand operations, so that the switch is unlikely to be turned on and/or turned off inadvertently while performing other tasks and/or causing discomfort.

Figure 5:
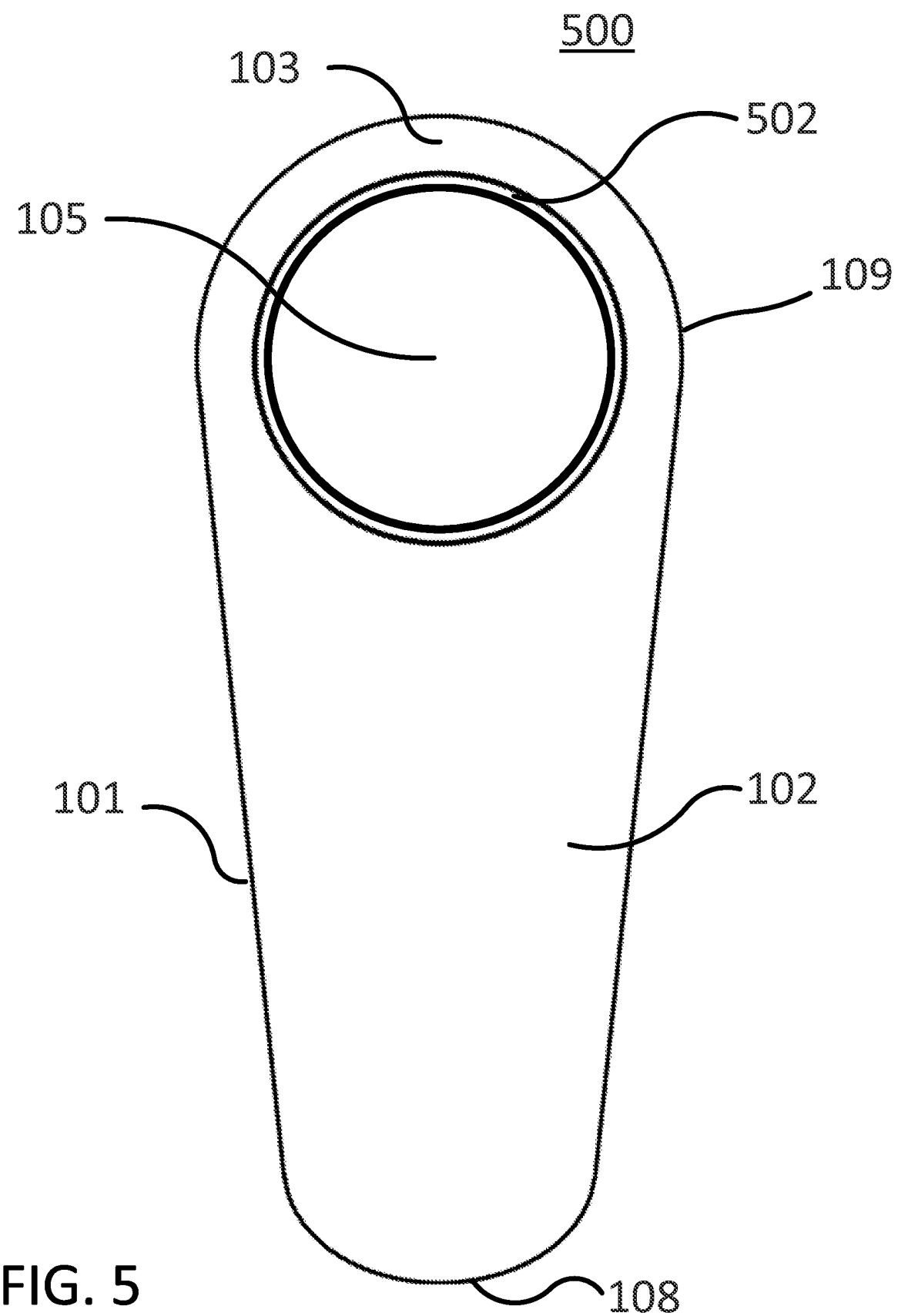
FIG. 5 shows a view of an embodiment of the controller having a light.

FIG. 5 shows a view 500 of an embodiment of the controller having a light. View 500 shows at least housing 101, top surface 102, front slope 103, thumb button 105, tail end 108, and head end 109. View 500 further shows a light 502. In other embodiments, the device in view 500 may not have all of the elements or features listed and/or may have other elements or features instead of or in addition to those listed.

FIG. 5 shows a view 500 of an embodiment of the controller 100 having a light for displaying indications.

Light 502 is a light that is installed on the top surface 102 for indication purposes. In an embodiment, the light 502 has a ring shape that outlines the edge of the thumb button 105. In an embodiment, light 502 includes a light-emitting diode (LED). In an embodiment, light 502 is powered by one or more batteries or a built-in battery inside the housing 101 of the controller 100. In other embodiments, the light 502 may be in other shapes, sizes, and/or locations. In at least one embodiment, the light 502 may light up in various manners indicating the operation mode and/or status of the controller 100. In at least one embodiment, the light emitted by the light 502 may have different colors, and/or may be capable of illuminating different portions of the surface of light 502, and/or flashing frequencies, for indicating different information to the user. In at least one embodiment, the light emitted by the light 502 may be capable of illuminating different portions in different colors simultaneously and/or have different portions change colors.

In an embodiment, light 502 may emit light of different colors to indicate the power status of the battery/batteries. For example, the light 502 may glow in blue when the battery has sufficient power (e.g., more than 30% power remains in the battery). When the remaining power runs lower than 30%, the light 502 may emit yellow light to remind the user to recharge the controller 100 soon. When the power is below 10%, the light 502 may blink in red to remind the user to recharge the controller 100 immediately. When the battery is fully charged, the light 502 may glow in green to indicate the completion of charging. In at least one embodiment, the light 502 may have an ambient glow of soft light.

In another embodiment, percentage of the light 502 that lights up may indicate the power status. In an embodiment, the percentage of the light 502 is proportional to the remaining power. For example, when the power of the battery is full, the entire ring of the light 502 glows. When 50% of power remains, only half of the light 502 lights up. In an embodiment, when the power status is indicated by the percentage of the light 502 that lights up, the light 502 may also indicate the operation modes, for example, by using different colors. For example, a blue light emitted by the light 502 may indicate that the controller 100 is in the control mode, while a red light indicates the presentation mode, and a yellow light indicates the television mode. In at least one embodiment, what color/percentage of light indicates what mode/status may be selected or reset using the controller 100 in the setup menu.

In an embodiment, the light 502 may indicate whether the controller 100 is active or inactive. For example, when no activity is detected by the controller 100 within a time threshold (e.g., 30 seconds, 1 minute, 2 minutes, 5 minutes, etc.), the controller 100 may automatically go into an idle mode or a sleep mode, with the light 502 turned off. In at least one embodiment, the idle mode and the sleep mode are distinct from one another. The idle mode is activated when the controller 100 is inactive for a short period of time (for example, 30 seconds, 1 minute). In the idle mode the cursor may disappear from the display. In an embodiment, a movement of the controller 100, a touch on any of the touch pads, or a click on any of the buttons may bring the controller 100 out of the idle mode, with the light 502 turned back on and the cursor showing up on the display. If the controller 100 remains inactive for a period of time (for example, 10 minutes, 30 minutes), the controller 100 may go further into the sleep mode, and optionally the wireless connection to the computing device is turned off. To bring the controller 100 out of the sleep mode, a user may press and hold down on all three buttons simultaneously for more than 2 seconds, for example. During the media control mode, the controller 100 is configured not to go to the sleep mode during the movie and/or music, etc. In an embodiment, the idle mode may be similar to a sleep mode on a computer in which only those components needed to detect that the user is attempting to interact with the controller 100 remain on, while all other components may be shutoff and/or not provided with power. In another embodiment, the terms "sleep mode" and "idle mode" may be used interchangeably and either term may be substituted for the other to obtain different embodiments. Throughout this specification, the time thresholds (e.g., 2 seconds, 30 seconds, 1 minutes, 5 minutes) are for depicting different examples, and it should be understood that other time thresholds may be used in different embodiments. In at least one embodiment, the user may modify the settings to change time thresholds or to use default threshold settings for various operation and/or modes in the setup menu.

Figure 6:
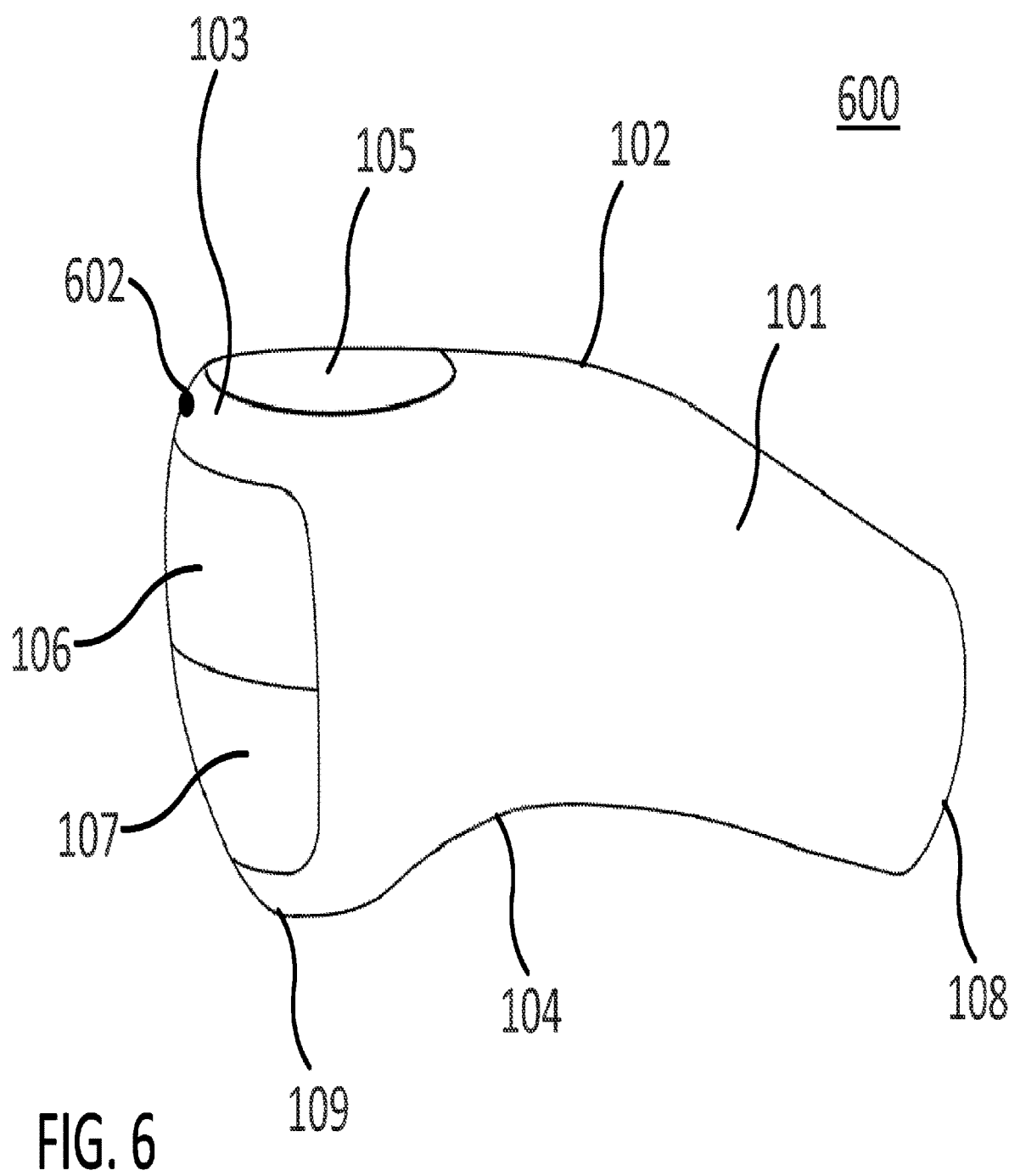
FIG. 6 shows a view of an embodiment of the controller having a laser.

FIG. 6 shows a view 600 of an embodiment of the controller 100 having a laser. View 600 shows at least housing 101, top surface 102, front slope 103, concave area 104, thumb button 105, index button 106, middle button 107, tail end 108, and head end 109. View 600 further shows a laser 602. In other embodiments, the device in view 600 may not have all of the elements or features listed and/or may have other elements or features instead of or in addition to those listed.

FIG. 6 shows a side view 600 of an embodiment of the controller 100 having a laser to be used in the presentation mode. The presentation mode may be activated by selecting from the setup menu using the controller 100. Alternatively, the controller 100 may detect the opening up of presentation slides and automatically activate the presentation mode.

Laser 602 is a component that emits a laser beam, a beam of coherent light, allowing the laser beam to stay narrow and focused to a tight spot. In an embodiment, the controller 100 may be used as a presentation device (which is a device to assist with presenting presentations) and/or a laser pointer when in the presentation mode. In at least one embodiment, the laser 602 is installed in the middle of the front slope 103, between the thumb button 105 and index button 106. In the presentation mode, the laser 602 is activated when the user clicks on any portion of the thumb button 105 and holds down for longer than a preset threshold (e.g., 0.5 second, 1 second, two seconds, etc.). In at least one embodiment, when activated, the laser 602 emits a light beam to pinpoint a desired target shown on the display or in other locations.

Figure 7A:
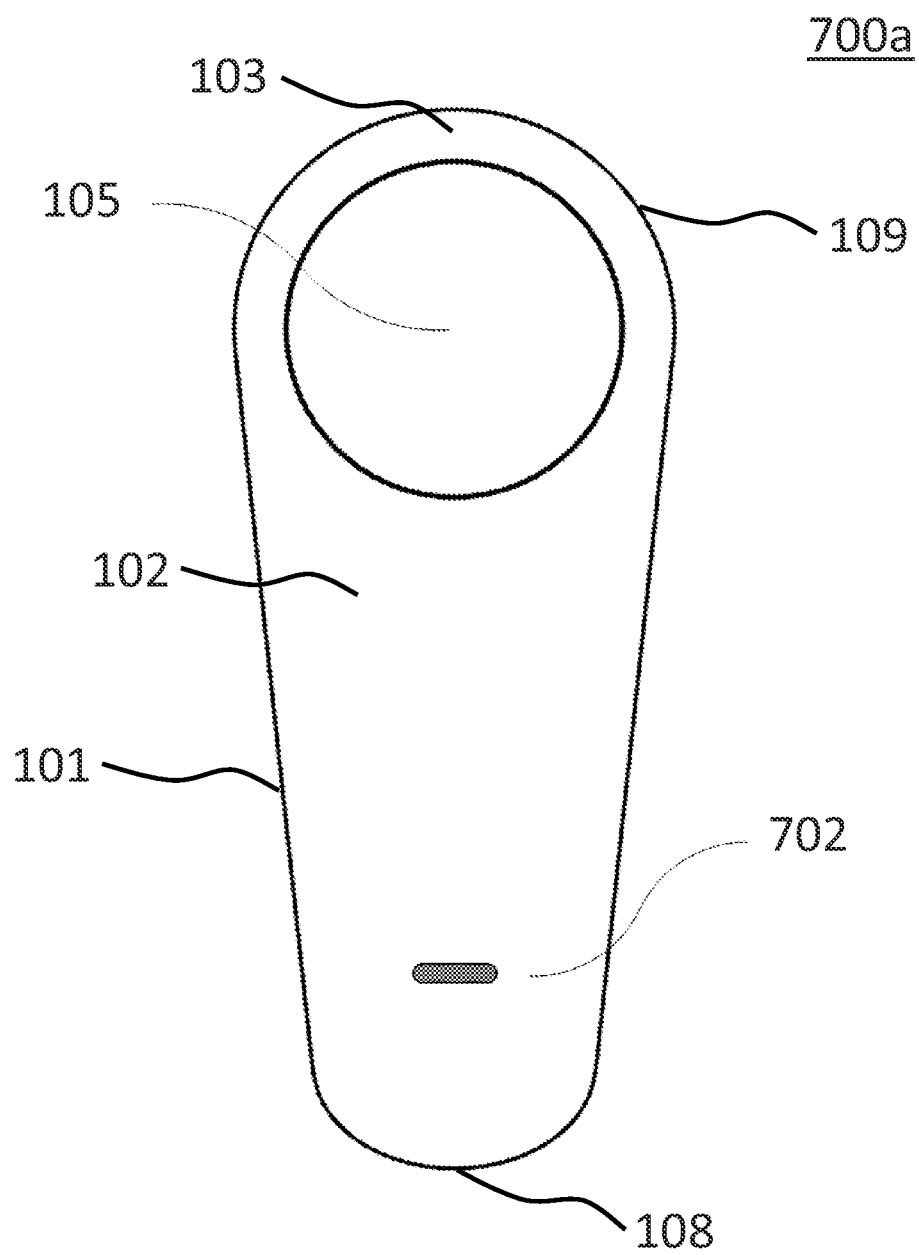
FIG. 7A shows a view of an embodiment of the controller having a microphone.

FIG. 7A shows a view 700a of an embodiment of the controller 100 having a microphone. View 700a shows at least housing 101, top surface 102, front slope 103, thumb button 105, tail end 108, and head end 109. View 700a further shows a microphone 702. In other embodiments, the device in view 700a may not have all of the elements or features listed and/or may have other elements or features instead of or in addition to those listed.

FIG. 7A shows a top view 700a of an embodiment of the controller 100 installed with a microphone on the top surface 102.

Microphone 702 is a microphone or mini microphone for detecting sound signals. In an embodiment, the microphone 702 is installed on the top surface 102, away from the thumb button 105 and close to the tail end 108. In at least one embodiment, the microphone 702 receives voice data that may be recognized and translated into control commands using speech recognition and natural language understanding methods, in the voice command mode. In at least one embodiment, the voice command feature of the controller 100 provides an alternative way for the user to quickly and conveniently input instructions, which enhances user experience and user interaction with the system. Although in the embodiment of FIG. 7A there is only one microphone, in other embodiments, the controller 100 may include another numbers of microphones in other locations where the microphone is not blocked by the hand that holds the controller 100.

Figure 7B:
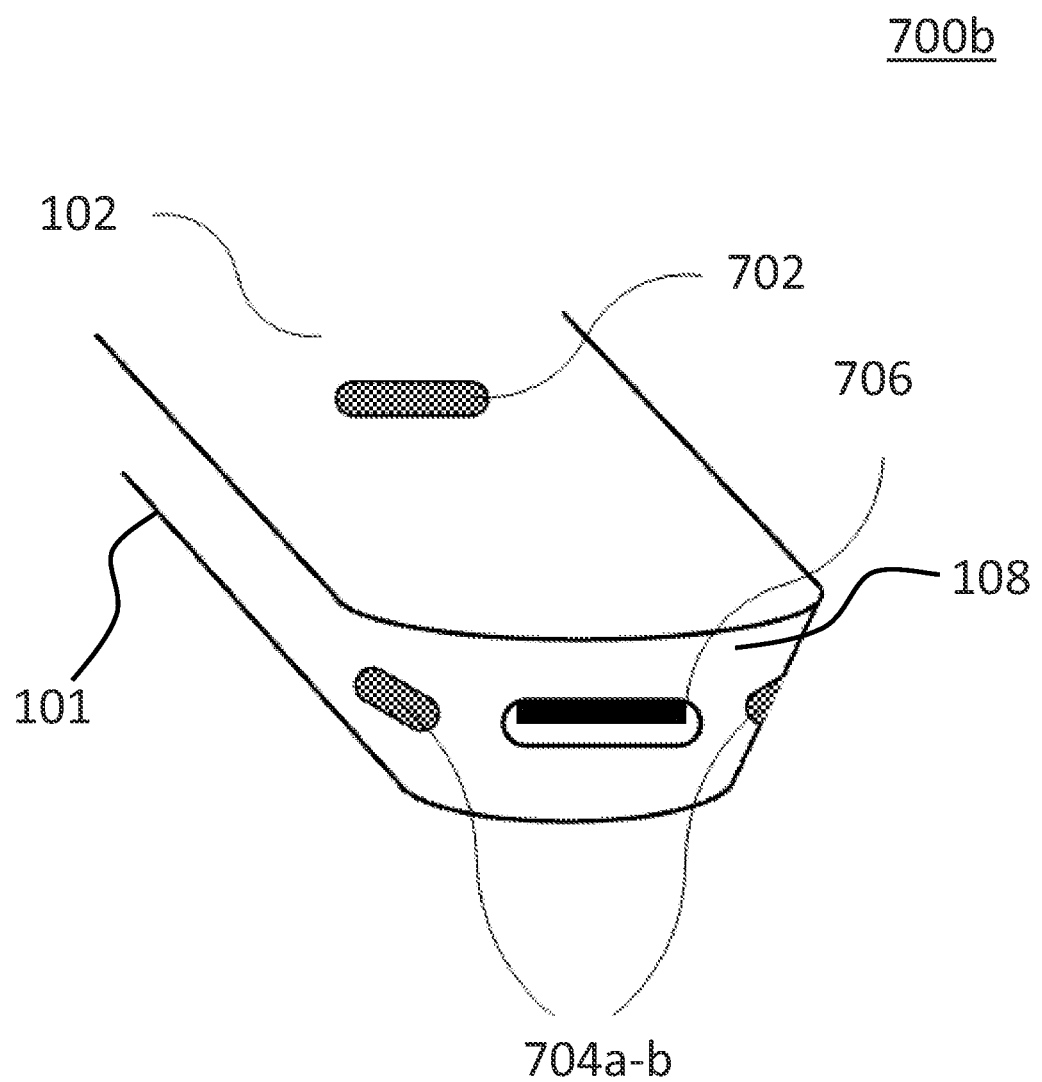
FIG. 7B shows a view of the tail end of an embodiment of the controller of FIG. 7A.

FIG. 7B shows a view 700b of the tail end of an embodiment of the controller of FIG. 7A. View 700b shows at least housing 101, top surface 102, tail end 108, head end 109, and microphone 702. View 700a further shows speakers 704a-b and a connector 706. In other embodiments, the device in view 700b may not have all of the elements or features listed and/or may have other elements or features instead of or in addition to those listed.

FIG. 7B shows a view 700b of the tail end 108, on which a connector and a plurality of speakers are installed.

Speakers 704a-b include electroacoustic transducers for converting electrical signals into sound and playing audio content. In an embodiment, the speakers 704a-b include a pair of speakers located on the tail end 108, on either side of a connector. In other embodiment, the speakers 704a-b may be in other locations. In other embodiment, the speakers 704a-b may be in other locations where the speakers are not blocked by the hand that holds the controller 100. Although in the embodiment drawn in FIG. 7B there are 2 speakers, in another embodiment, the controller 100 may include another number of speakers.

Connector 706 is an electro-mechanical device for connecting the controller 100 to other devices. In an embodiment, the connector 706 includes an interface, a port, and/or a plug. In an embodiment, the connector 706 may act as a power charging port for connecting to a power outlet. Alternatively or additionally, the connector 706 may be used as an audio/video extension connector for connecting to audio/video devices. In at least one embodiment, the connector 706 has sufficient bandwidth for transmitting audio and/or video content to a head-wearing device, such as a headset and/or a set of goggles. In at least one embodiment, the connector 706 is both a charging port and a data connector. In an embodiment, the connector 706 is a Universal Serial Bus (USB) connector or a Micro USB connector. In an embodiment, the connector 706 may be connected, via a data cable (e.g., a USB cable), to the computing device, allowing the controller 100 to be connected locally, while the control commands are transmitted, via the data cable instead of wireless communication.

Figure 8:
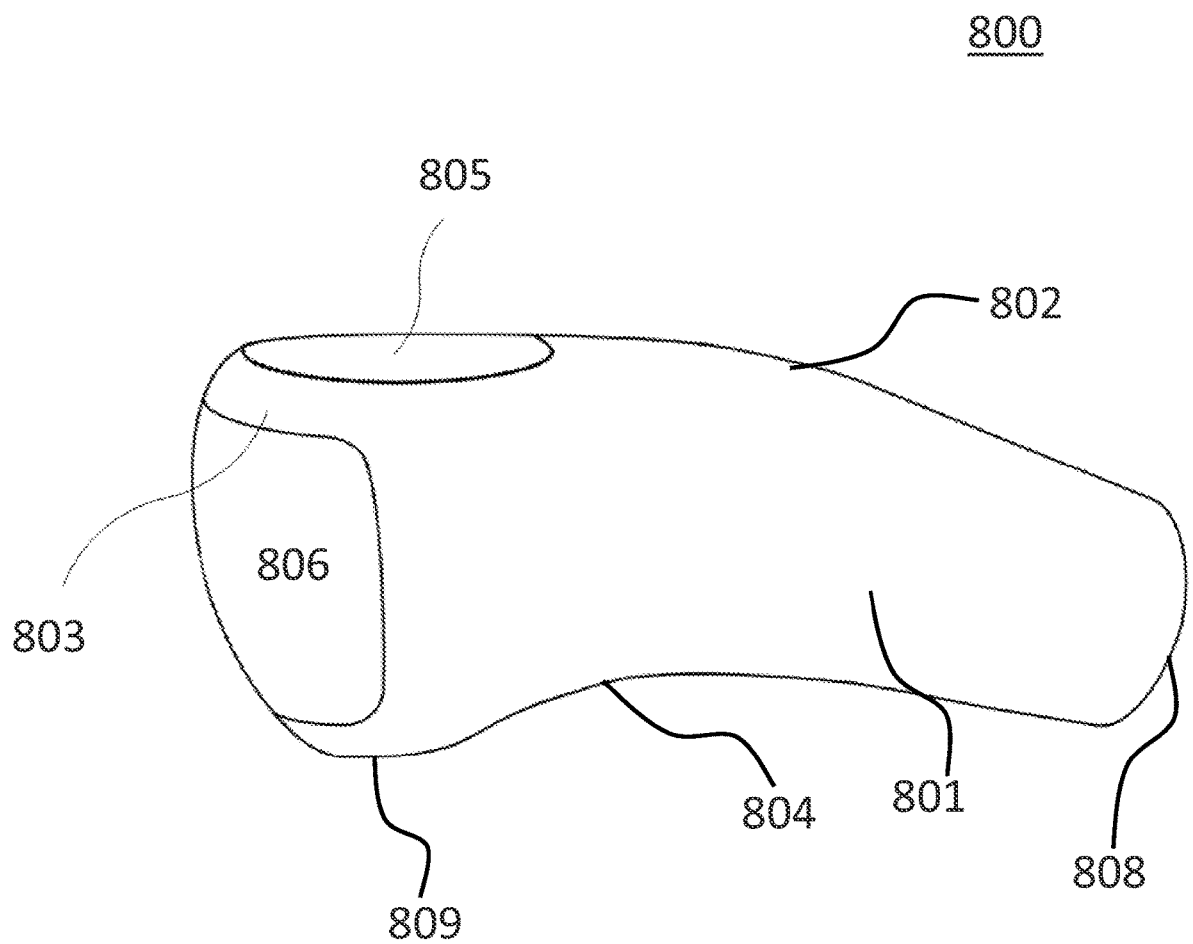
FIG. 8 shows a view of another embodiment of a controller having two buttons.

FIG. 8 shows a view 800 of another embodiment of the controller having two touch surfaces. Controller 800 shows at least a housing 801, a top surface 802, a front slope 803, a concave area 804, a thumb button 805, an auxiliary button 806, a tail end 808, and a head end 809. In other embodiments, the controller 800 may not have all of the elements or features listed and/or may have other elements or features instead of or in addition to those listed.

FIG. 8 shows a view of a controller 800 that includes only two touch buttons, each connected to touch sensors. In at least one embodiment, controller 800 may be another version of the controller 100 when the index button 106 and the middle button 107 are merged into one button while the index touch pad and middle touch pad merged into one touch pad. In at least one embodiment, the controller 800 is symmetric and can fit in both a left hand and a right hand.

Housing 801, top surface 802, front slope 803, concave area 804, thumb button 805, and tail end 808 may be similar to the housing 101, top surface 102, front slope 103, concave area 104, thumb button 105, and tail end 108, which were discussed in conjunction with FIG. 1.

Auxiliary button 806 is a single button that is located on the head end 109 of the controller 800, on which the index and middle fingers rest in a natural posture when the controller 800 is held in the hand of a user. In an embodiment, the auxiliary button 806 takes the place of the index button 106 and middle button 107 of the controller 100. In at least one embodiment, high resolution touch sensors are connected to the top of the auxiliary button 806, and thus serve as an auxiliary touch pad. In at least one embodiment, the auxiliary touch pad is configured to detect multi-touch operations when both the index finger and the middle finger clicks or moves on the auxiliary touch pad.

In at least one embodiment, top portions of the auxiliary button 806 and auxiliary touch pad that are close to the front slope 803 correspond to the index button 106 and index touch pad, respectively, while bottom portions of the auxiliary button 806 and auxiliary touch pad that are close to the bottom surface correspond to the middle button 107 and middle touch pad, respectively. In an embodiment, the index finger may click the top portion of the auxiliary button 806, while the middle finger may click the bottom portion of the auxiliary button 806. In at least one embodiment, depending on which portion of the auxiliary button 806 is clicked, the controller 800 may interpret the click as either a left-click by the index finger or a right-click by the middle finger. Similarly, scrolling or swiping on the auxiliary touch pad with either one or both of the index and middle fingers may be interpreted in similar manners as scrolling or swiping on the index touch pad and/or middle touch pad of the controller 100. In at least one embodiment, finger operations on the two buttons/touch pads of controller 800 and on the three buttons/touch pads of controller 100 may generate control commands and instructions in similar manners.

Head end 809 is the end of the controller 800 which may be wrapped by the index finger and middle finger when the controller 800 is held in the hand of a user. In an embodiment, the head end 809 has similar curve and/or shape as the head end 109 of the controller 100. The auxiliary button 806 is located on the front side of the head end 809. In other embodiments, the head 809 may have other shapes and/or sizes.

Figure 9:
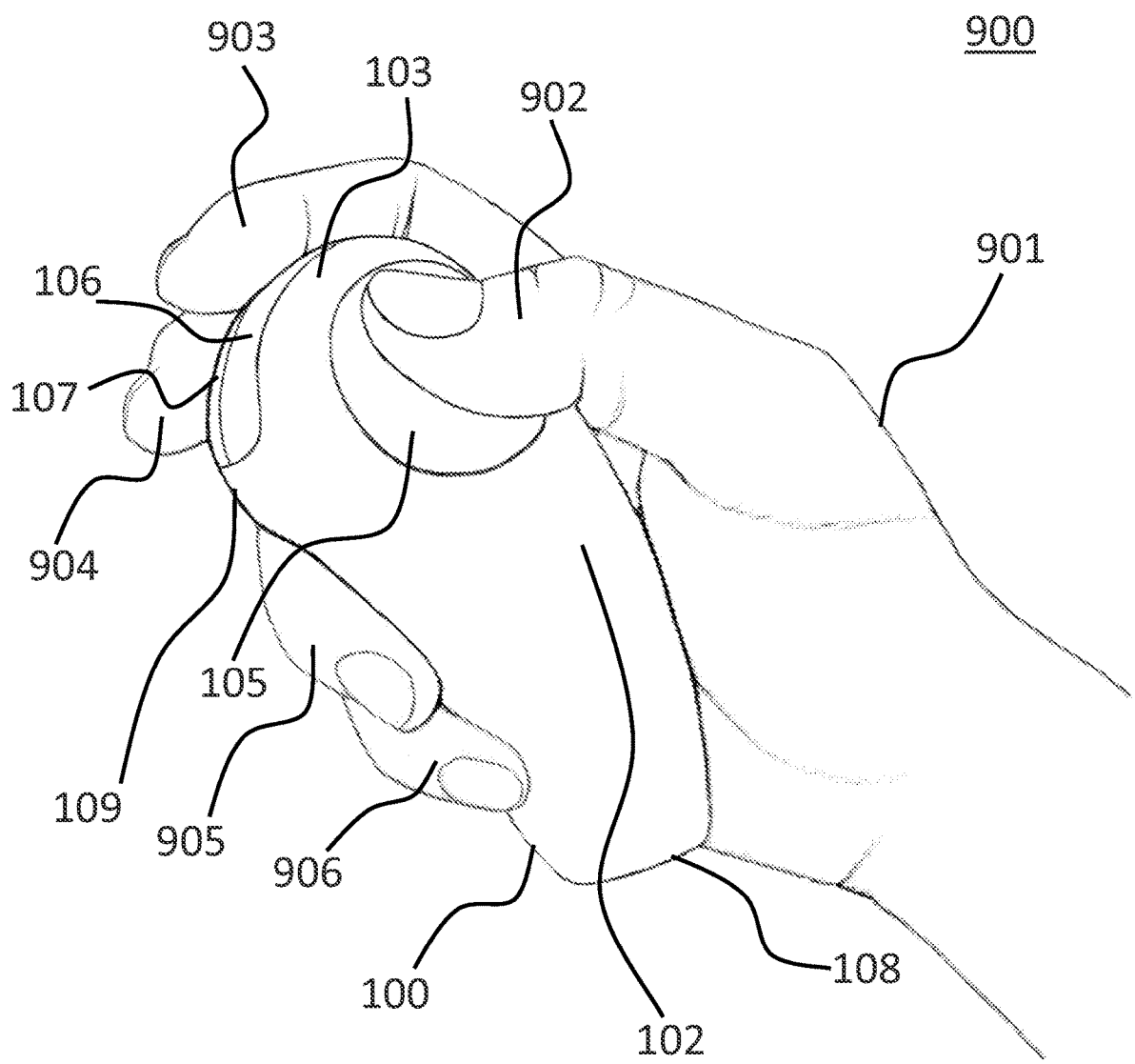
FIG. 9 shows a view of an embodiment of the controller held in a right hand.

FIG. 9 shows a view 900 of an embodiment of the controller 100 held in a right hand. View 900 shows at least controller 100, top surface 102, front slope 103, thumb button 105, index button 106, middle button 107, tail end 108, and head end 109. View 900 further shows a right hand 901 that includes thumb 902, index finger 903, middle finger 904, ring finger 905, and little finger 906. In other embodiments, the view 900 may not have all of the elements or features listed and/or may have other elements or features instead of or in addition to those listed.

FIG. 9 shows a view 900 of the controller 100 that is held in the right hand of a user, with the thumb resting on the thumb button 105, the index finger and middle finger in contact with the index button 106 and middle button 107, respectively, and the ring finger and little finger wrapping underneath the concave area 104.

Right hand 901 holds the controller 100 if the user is right-handed. Alternatively, the controller 100 may be held by a left-handed user in his left hand. In at least one embodiment, the right hand 901 may hold the controller 100 in the air, on the lap, or anywhere near the body of the user. In at least one embodiment, the right hand 901 does not have to operate the controller 100 on a flat surface.

Thumb 902 is in contact with the thumb button 105, while index finger 903 and middle finger 904 are in contact with the index button 106 and middle button 107, respectively, in a natural posture when the right hand 901 is holding the controller 100. The directions of movements of the thumb 902 with respect to the thumb button 105 were defined in conjunction with FIG. 2. The directions of movements of the index finger 903 and middle finger 904 on the index touch pad and middle touch pad, respectively, are defined in FIG. 9 as follows. A clockwise movement is defined as the movement of the index finger 903 and middle finger 904 along the index touch pad and middle touch pad, respectively, in a clockwise direction starting from the left side of the controller 100 toward the right side as shown in FIG. 9. A counter clockwise movement is defined as the movement of the index finger 903 and middle finger 904 in a counter clockwise direction starting from the right side of the controller 100 toward the left side as shown in FIG. 9. An up movement is defined as the movement of the index finger 903 and middle finger 904 across the index touch pad and middle touch pad, respectively, toward the top surface 102. A down movement is defined as the movement of the index finger 903 and middle finger 904 across the index touch pad and middle touch pad, respectively, toward the bottom surface 402.

Ring finger 905 and little finger 906 wrap underneath the concave area 104 for support.

Figure 10:
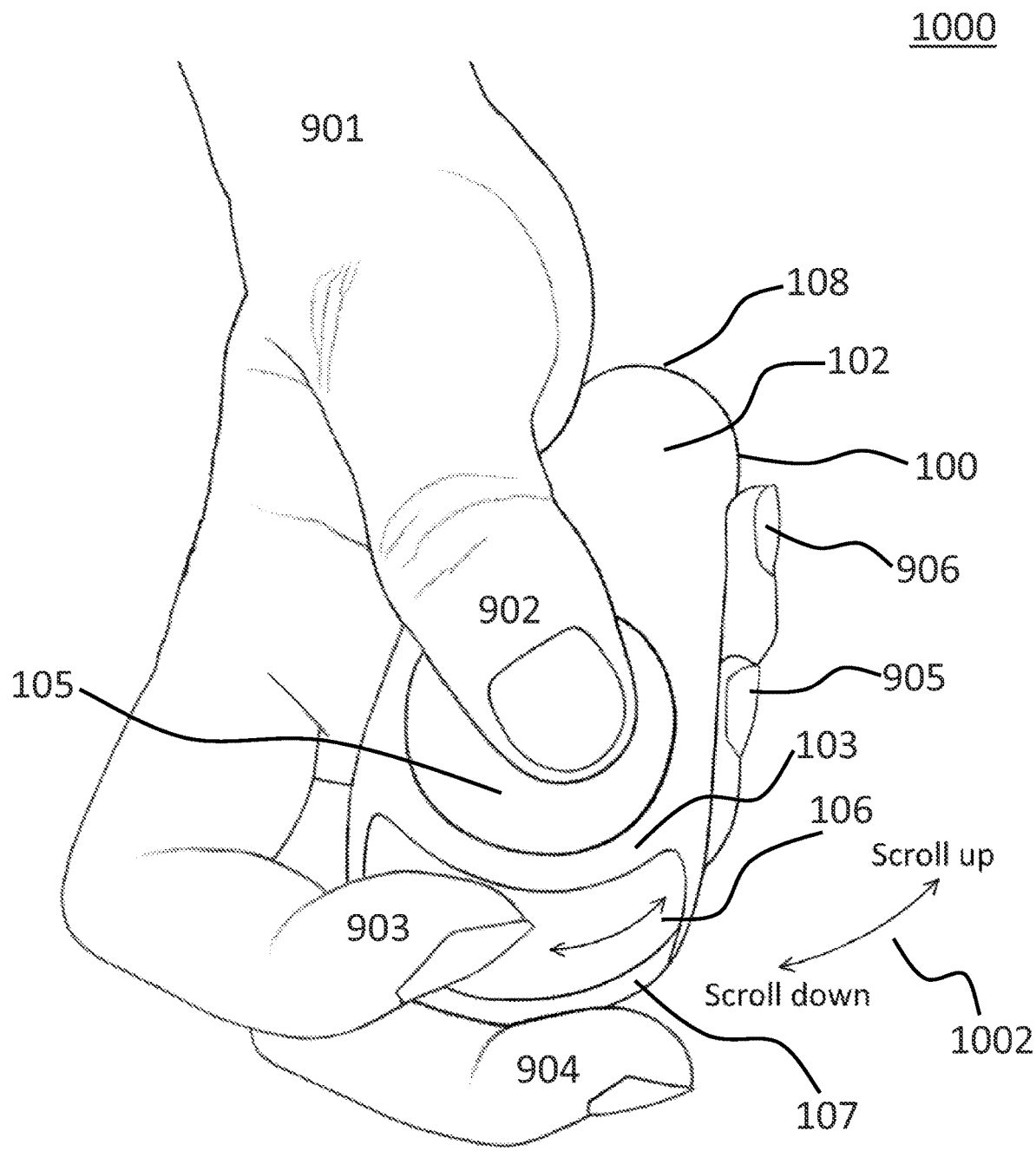
FIG. 10 shows an example of a user manipulating the controller to activate a scrolling operation.

FIG. 10 shows an example 1000 of a user manipulating the controller 100 to activate a scrolling operation. The view 1000 shows at least controller 100, top surface 102, front slope 103, thumb button 105, index button 106, middle button 107, tail end 108, right hand 901, thumb 902, index finger 903, middle finger 904, ring finger 905, and little finger 906. View 1000 also shows arrows 1002. In other embodiments, the view 1000 may not have all of the elements or features listed and/or may have other elements or features instead of or in addition to those listed.

FIG. 10 shows an example 1000 in which the index finger 903 of the right hand 901 scrolls along the index touch pad to activate scrolling operations. As shown in FIG. 10, when the index finger 902 scrolls on the index touch pad in a clockwise direction, an opened web page or document on the display is scrolled down (e.g., similar to scrolling down on a scroll wheel or a scroll ball of a traditional electrical mouse). A counter clockwise scrolling movement on the index touch pad activates a scroll up operation (e.g., similar to scrolling up on the scroll wheel or scroll ball of a traditional electrical mouse).

Arrows 1002 show the directions in which the index finger 903 scrolls on the index touch pad. FIG. 10 shows that, when the controller 100 is held in the right hand 901, a clockwise scrolling movement corresponds to a scroll down operation, while a counter clockwise scrolling movement corresponds to a scroll up operation. In another embodiment, when the user uses his left hand to manipulate the controller 100 in the left hand mode, the controller 100 may adopt a different configuration so as to implement similar operations. For example, to activate the scrolling down operation, the left index finger may scroll in a counter clockwise direction. A clockwise movement of the left index finger along the index touch pad may correspond to a scroll up operation. A user may select either the right hand configuration or left hand configuration in the setup menu. In at least one embodiment, when in the right hand mode, if the user uses his left hand to hold the controller 100 and double-clicks both the index button 106 and middle button 107 on portions close to the right ends of the buttons, the controller 100 may instruct a message to be automatically prompted on the display asking if the user wants to switch to the left hand mode. Vice versa for the right hand mode switch.

Figure 11:
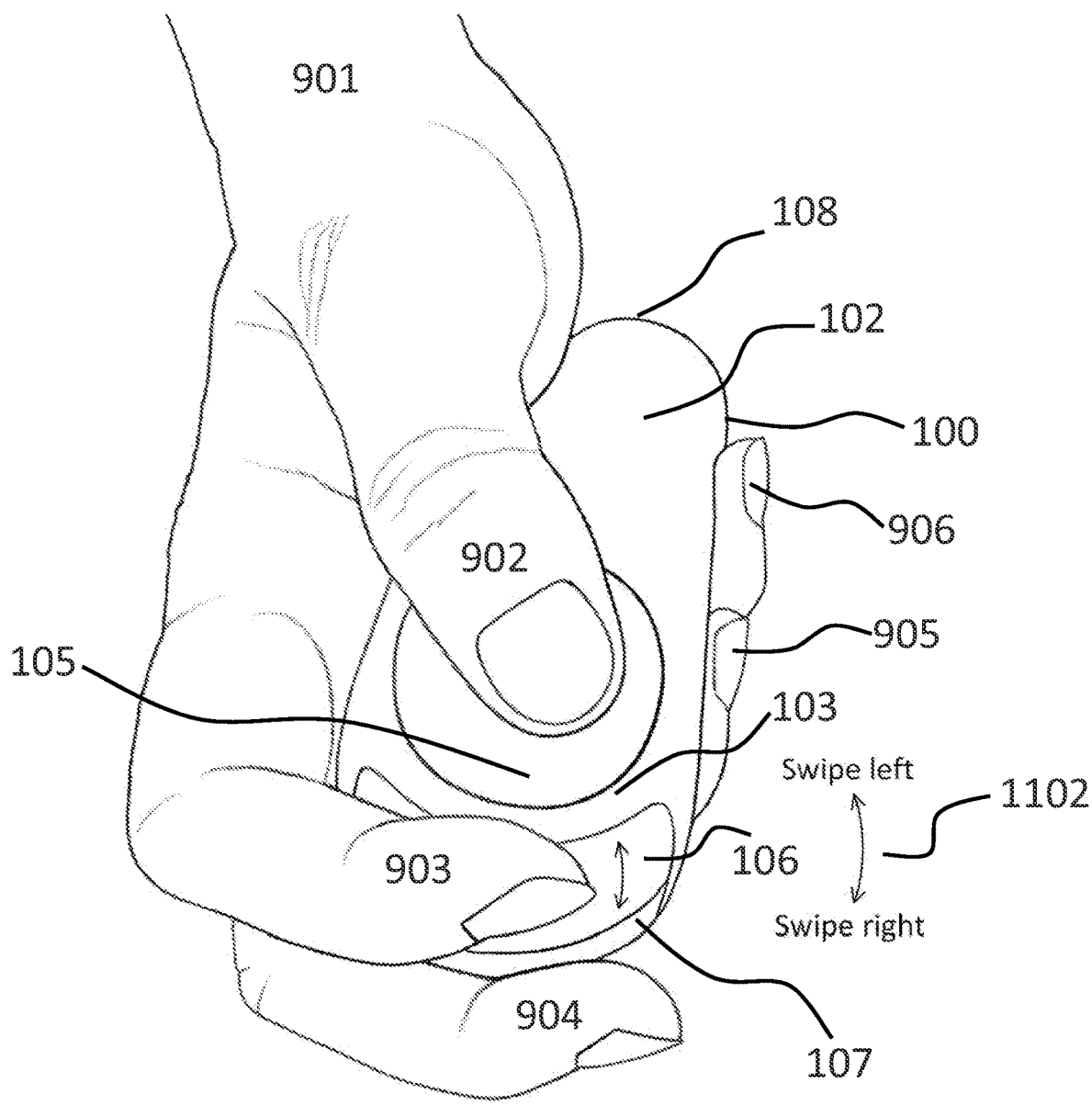
FIG. 11 shows an example of a user manipulating the controller to activate a swiping operation.

FIG. 11 shows an example 1100 of a user manipulating the controller 100 to activate a swiping operation. The view 1100 shows at least controller 100, top surface 102, front slope 103, thumb button 105, index button 106, middle button 107, tail end 108, right hand 901, thumb 902, index finger 903, middle finger 904, ring finger 905, and little finger 906. View 1100 also shows arrows 1102. In other embodiments, the view 1100 may not have all of the elements or features listed and/or may have other elements or features instead of or in addition to those listed.

FIG. 11 shows an example 1100 in which the index finger 903 swipes across the index touch pad to activate swiping operations.

Arrows 1102 show the directions in which the index finger 903 swipes across the index touch pad that correspond to swiping operations. FIG. 11 shows that, when the controller 100 is held in the right hand 901, swiping upwards on the index touch pad corresponds to a left swipe operation (e.g., the opened webpage or document on the display is swiped to the left), while swiping downwards on the index touch pad corresponds to a right swipe operation. In an embodiment, in the left hand mode, swiping upwards and downwards using the left index finger corresponds to a left swipe and right swipe, respectively.

Figure 12:
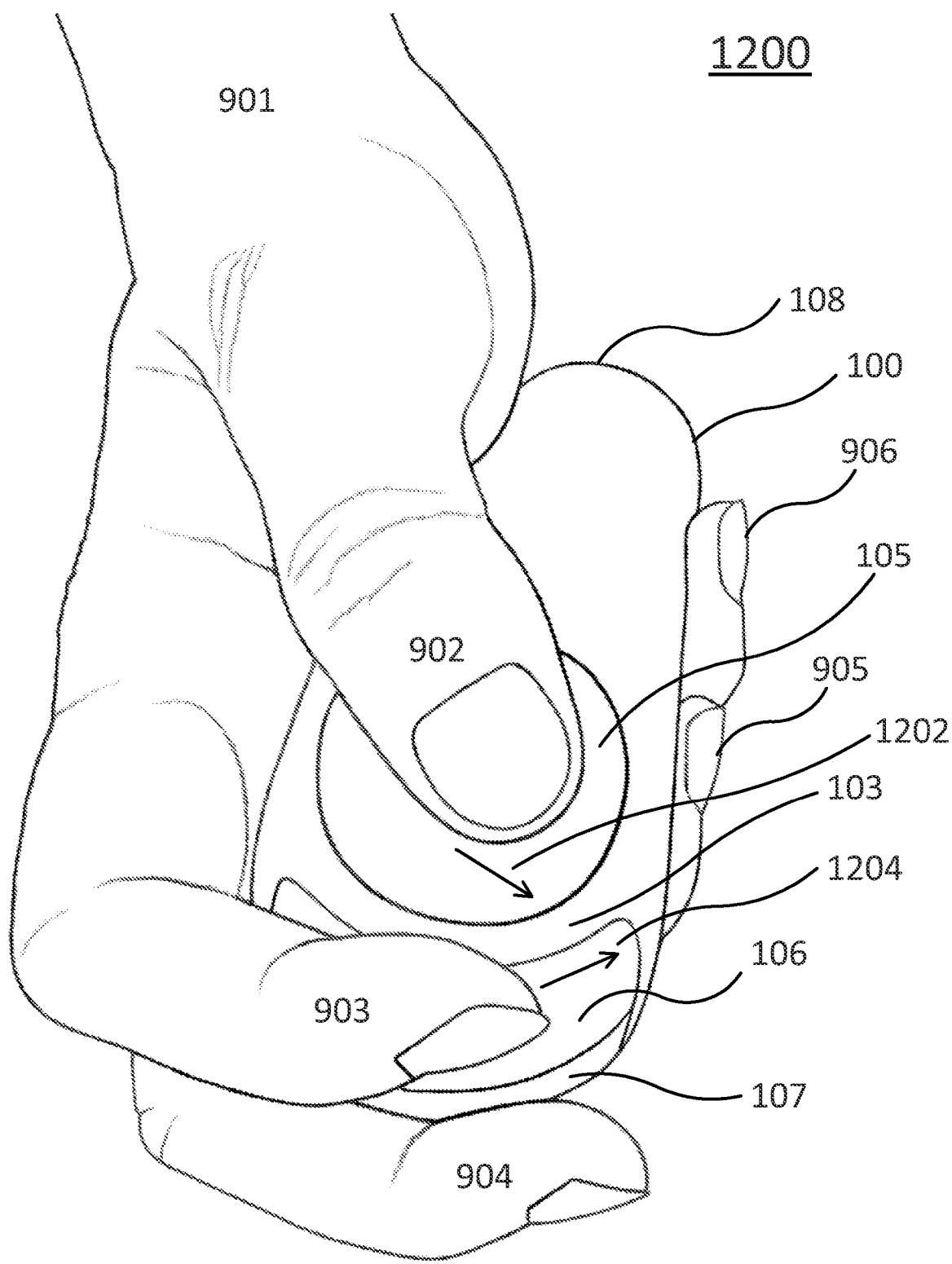
FIG. 12 shows an example of a user manipulating the controller to activate a zoom-out operation.

FIG. 12 shows an example 1200 of a user manipulating the controller 100 to activate a zoom-out operation. The view 1200 shows at least controller 100, top surface 102, front slope 103, thumb button 105, index button 106, middle button 107, tail end 108, right hand 901, thumb 902, index finger 903, middle finger 904, ring finger 905, and little finger 906. View 1200 also shows arrows 1202 and 1204. In other embodiments, the view 1200 may not have all of the elements or features listed and/or may have other elements or features instead of or in addition to those listed.

FIG. 12 shows an example 1200 in which both the thumb touch pad and the index touch pad are manipulated simultaneously to activate a zoom-out operation.

Arrow 1202 shows the direction in which the thumb 902 moves on the thumb touch pad toward the upper left side of the controller 100 (the direction with respect to the controller was discussed in conjunction with FIG. 2). Arrow 1204 shows the direction in which the index finger 903 moves along the index touch pad toward the left side of the controller 100. In at least one embodiment, when the thumb 902 and the index finger 903 (in right hand mode) move simultaneously in the directions as indicated by the arrow 1202 and 1204, respectively, the controller 100 combines the signals detected by the thumb touch pad and index touch pad to generate a zoom-out control command to zoom out the image (e.g., the image of the document, webpage, or map, for example) shown on the display, thereby reducing the size of the features of the image.

Although a right hand is depicted in FIG. 12 (and in the following FIG. 13), it should be understood that the fingers of a left hand can also manipulate the thumb touch pad and index touch pad (the thumb of the left hand moving toward the upper right side while the index finger of the left hand moving toward the right side) to activate a zoom out operation in the left hand mode.

Figure 13:
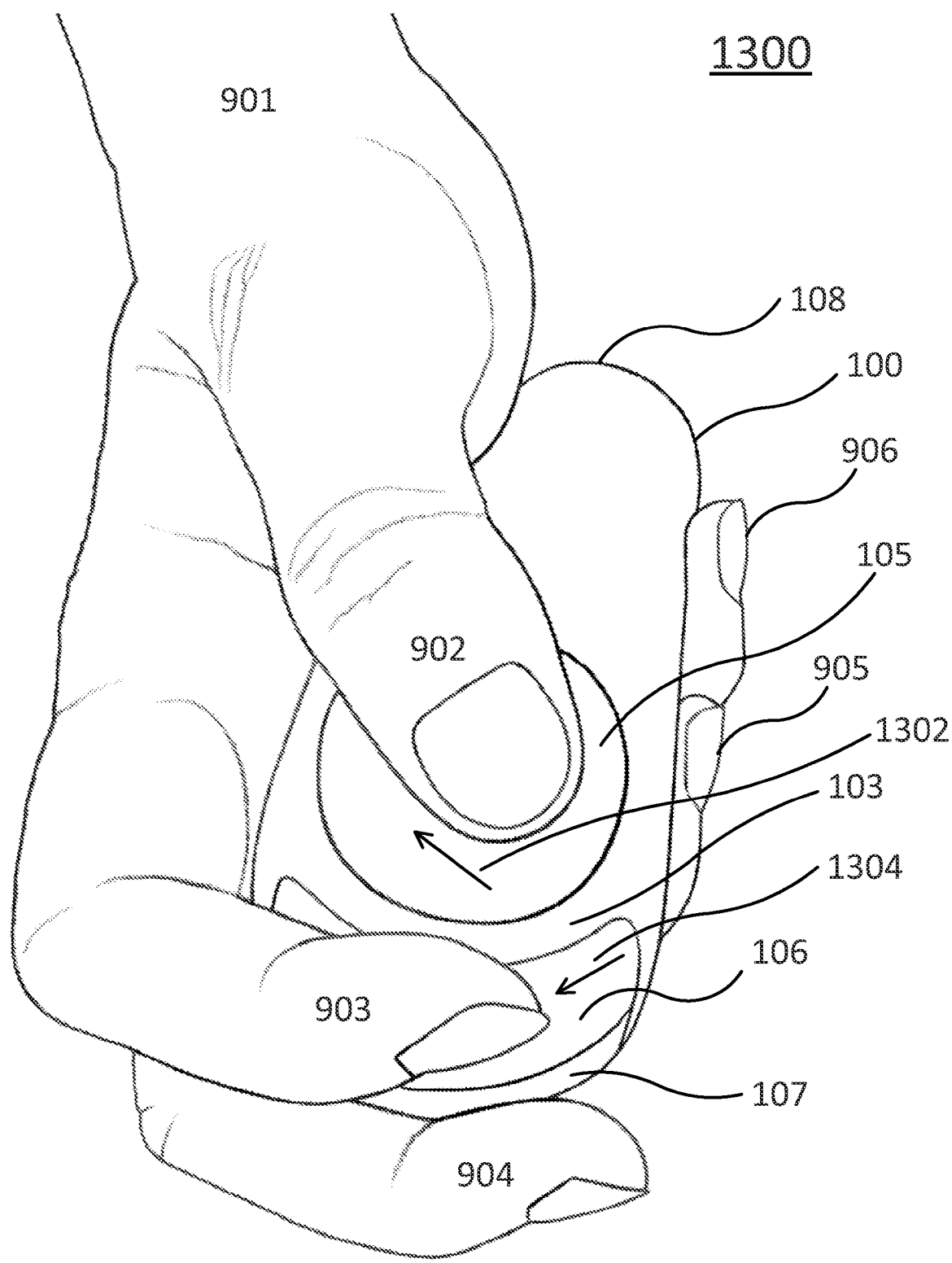
FIG. 13 shows an example of a user manipulating the controller to activate a zoom-in operation.

FIG. 13 shows an example 1300 of a user manipulating the controller 100 to activate a zoom-in operation. The view 1300 shows at least controller 100, top surface 102, front slope 103, thumb button 105, index button 106, middle button 107, tail end 108, right hand 901, thumb 902, index finger 903, middle finger 904, ring finger 905, and little finger 906. View 1300 also shows arrows 1302 and 1304. In other embodiments, the view 1300 may not have all of the elements or features listed and/or may have other elements or features instead of or in addition to those listed.

FIG. 13 shows an example 1300 in which both the thumb touch pad and the index touch pad are manipulated simultaneously to activate a zoom-in operation, thereby increasing the size of the features of the image.

Arrow 1302 shows the direction in which the thumb 902 moves on the thumb touch pad toward the lower right side of the controller 100. Arrow 1304 shows the direction in which the index finger 903 moves along the index touch pad toward the right side of the controller 100. In at least one embodiment, when the thumb 902 and the index finger 903 move simultaneously in the directions as indicated by the arrow 1302 and 1304, respectively, a zoom-in control command is generated by the controller 100 to zoom in the image (e.g., the image of the document, webpage, or map, for example) shown on the display. In at least one embodiment, the zoom-out and zoom-in operations using the controller 100 do not require the movement of the middle finger 904.

In the left hand mode, the thumb of the left hand may move toward the lower left side while the index finger of the left hand may move toward the left side to activate zoom in operation, for example.

Figure 14:
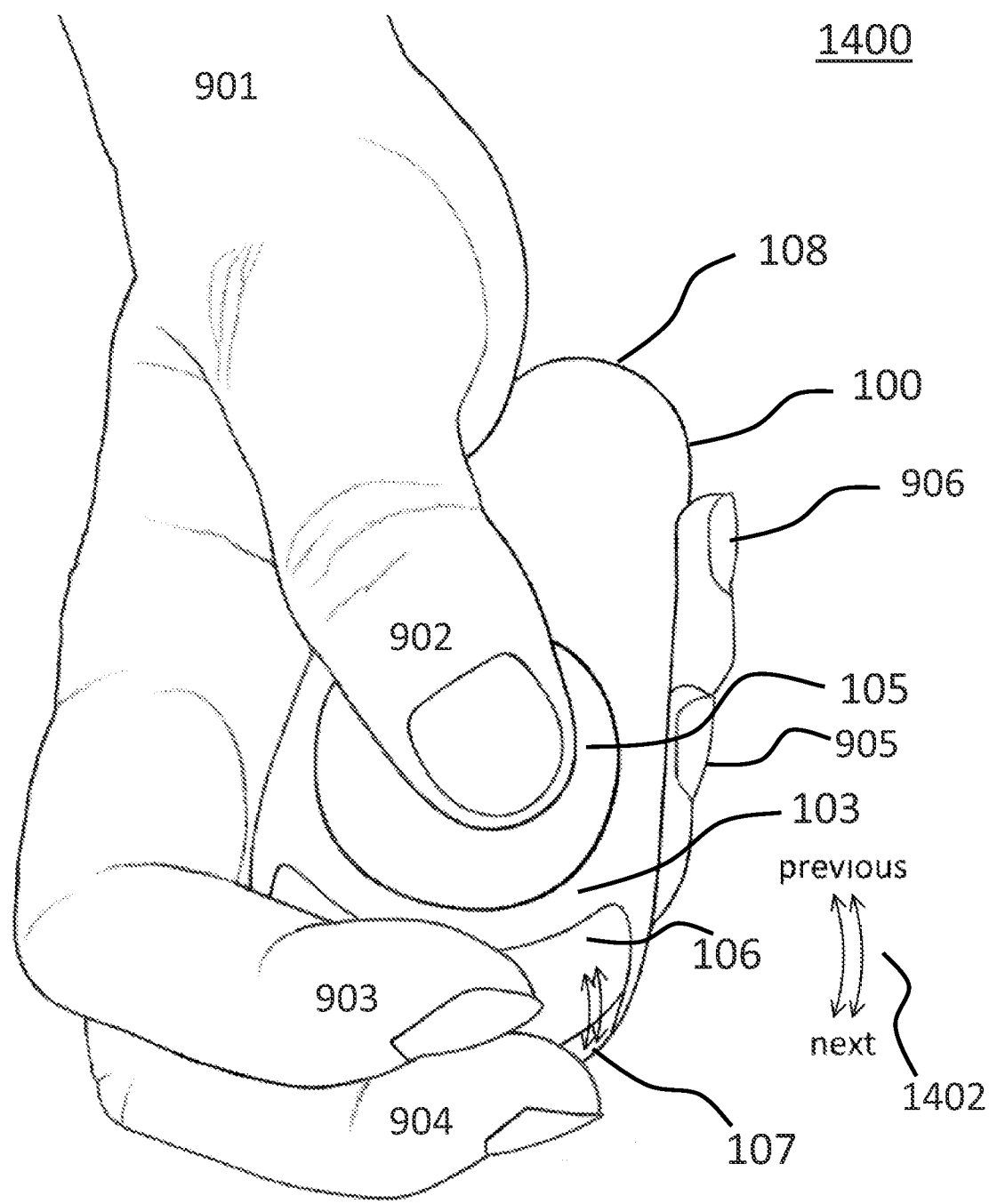
FIG. 14 shows an example of a user manipulating the controller to activate a switch operation.

FIG. 14 shows an example 1400 of a user manipulating the controller 100 to activate a switch operation. The view 1400 shows at least controller 100, top surface 102, front slope 103, thumb button 105, index button 106, middle button 107, tail end 108, right hand 901, thumb 902, index finger 903, middle finger 904, ring finger 905, and little finger 906. View 1400 also shows arrows 1402. In other embodiments, the view 1300 may not have all of the elements or features listed and/or may have other elements or features instead of or in addition to those listed.

FIG. 14 shows an example 1400 in which swiping operations on both the index touch pad and middle touch pad are combined to perform a switch operation.

Arrows 1402 show the directions in which both the index finger 903 and middle finger 904 are swiped. During the swiping operation, index finger 903 and middle finger 904 are swiped simultaneously across the index touch pad (which is on top of index button 106) and middle touch pad (which is on top of middle button 107), respectively. In at least one embodiment, when both the index finger 903 and middle finger 904 are swiped toward the front slope 103, the controller 100 controls the computing device or an application to switch the selected content to the previous content (e.g., to switch from the current webpage to the previous webpage in a browser, switch from the current photo to a previous photo in a photo viewing application, showing the previous slide in a presentation application, etc.). Similarly, swiping both the index finger 903 and middle finger 904 simultaneously toward the bottom surface 402 causes a switch operation to the next content. In another example, during the text input mode, when a soft keyboard is shown on the display, swiping both the index finger 903 and middle finger 904 may switch quickly among different soft keyboards (e.g., a keyboard having alphanumeric symbols—English or International, keyboards showing digits and signs, keyboard showing special characters, for example).

Figure 15:
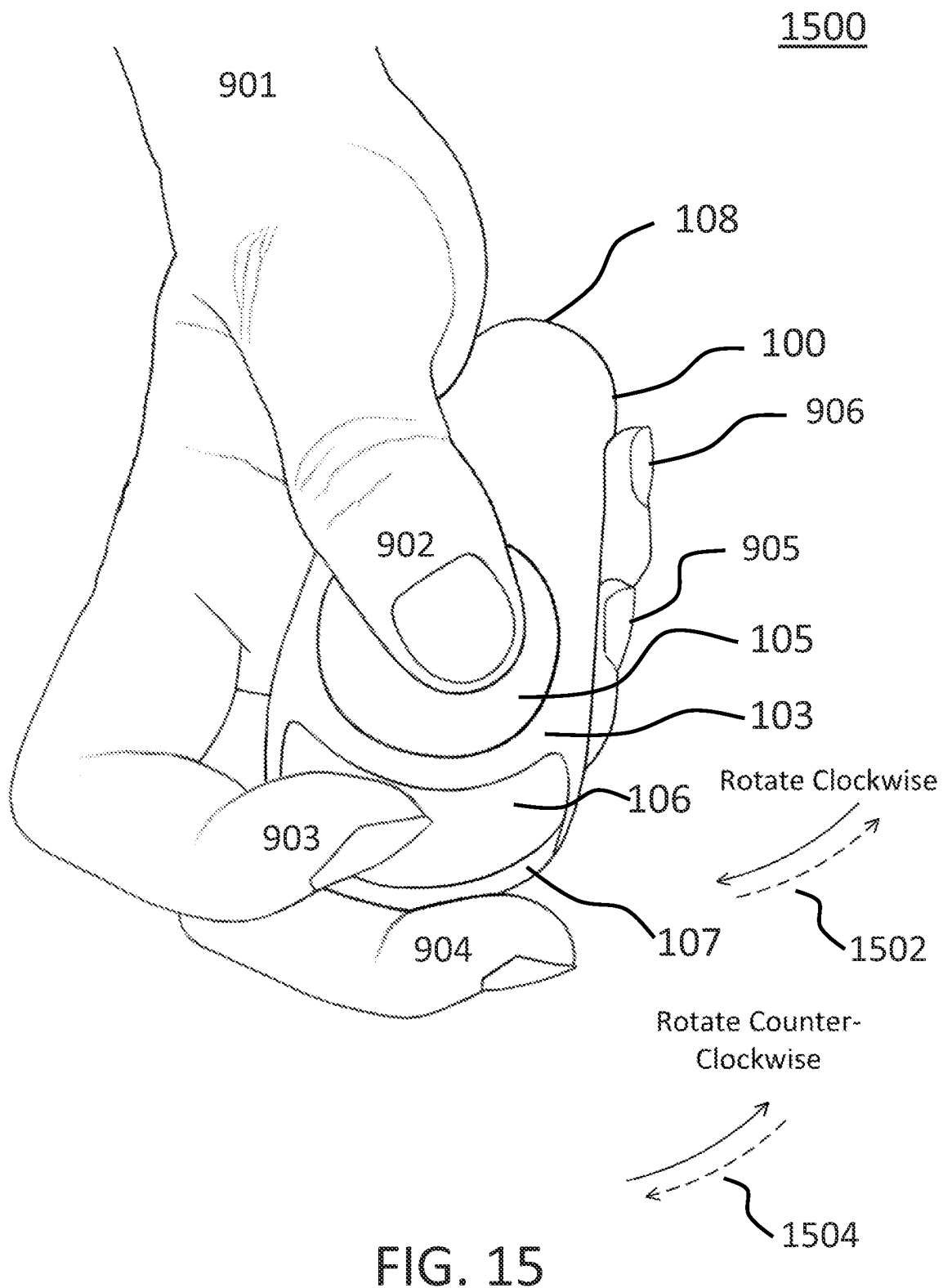
FIG. 15 shows an example of a user manipulating the controller to activate a rotation operation.

FIG. 15 shows an example 1500 of a user manipulating the controller 100 to activate a rotation operation. The view 1500 shows at least controller 100, top surface 102, front slope 103, thumb button 105, index button 106, middle button 107, tail end 108, right hand 901, thumb 902, index finger 903, middle finger 904, ring finger 905, and little finger 906. View 1500 also shows arrows 1502 and arrows 1504. In other embodiments, the view 1500 may not have all of the elements or features listed and/or may have other elements or features instead of or in addition to those listed.

FIG. 15 shows an example 1500 in which the index finger 903 and middle finger 904 are moved in reverse directions simultaneously (e.g., one in a clockwise direction or towards the right side of FIG. 15, while the other in a counter clockwise direction or towards the left side of FIG. 15) along the index touch pad and middle touch pad, respectively, to activate a rotation operation.

Arrows 1502 include a solid arrow that shows the direction that the index finger 903 moves along the index touch pad leftwards, and a dashed arrow that shows the direction that the middle finger 904 moves along the middle touch pad rightwards. In at least one embodiment, when the index finger 903 and middle finger 904 move simultaneously in the directions as indicated by the arrows 1502, respectively, the controller 100 generates a control command to rotate the selected object shown in the user interface in a clockwise direction with respect to the display.

Arrows 1504 include a solid arrow that shows the direction that the index finger 903 moves, which is rightward, and a dashed arrow shows the direction that the middle finger 904 moves, which is leftward, to cause a counter clockwise rotation of a selected object. In other words, at least one embodiment, moving the index finger 903 and middle finger 904 simultaneously in the directions as indicated by the arrows 1504, respectively, causes the selected object to rotate in a counter clockwise direction with respect to the display.

In at least one embodiment, in the three-dimension (3-D) mode, the controller 100 may use various combinations of finger operations on the buttons and/or touch pads to control the movements and orientations of a 3-D object. For example, the user may use the index finger 903 and middle finger 904 to click and hold down on both the index button 106 and middle button 107, respectively, and meanwhile move the thumb 902 on the thumb touch pad to the left, right, up, or down, so as to shift the 3-D view point to the left, right, forward, or backward, respectively. In another example, the user may use the thumb 902 to press down on the thumb button 105, and meanwhile swipe both the index finger 903 and middle finger 904 upward or downward across the index touch pad and middle touch pad, so as to increase or decrease the 3-D view angle, respectively. In yet another example, the user may use the thumb 902 to press down on the thumb button 105, and meanwhile move both the index finger 903 and middle finger 904 leftwards or rightwards along the index touch pad and middle touch pad, respectively, so as to rotate the 3-D view angle in a clockwise or counter clockwise direction. In at least one embodiment, when the controller 100 is equipped with motion sensors, while holding down the thumb button 105, the user may shift the 3-D view point by moving the controller 100 left, right, forward, or backward on the same horizontal plane, change the view angle by raising or lowering the controller 100 to a different horizontal plane, and/or rotate the 3-D view angle clockwise or counter clockwise by rotating the controller 100 in the same horizontal plane.

In at least one embodiment, the 3-D mode may be activated in the setup menu. In at least one embodiment, the controller 100 may use the operations in the 3-D mode to control 3-D objects or views in a computer application, such as, but not limited to, Google Earth and Computer Aided Design (CAD) software. In an embodiment, the presentation mode is automatically deactivated when the 3-D mode is on.

Figure 16:
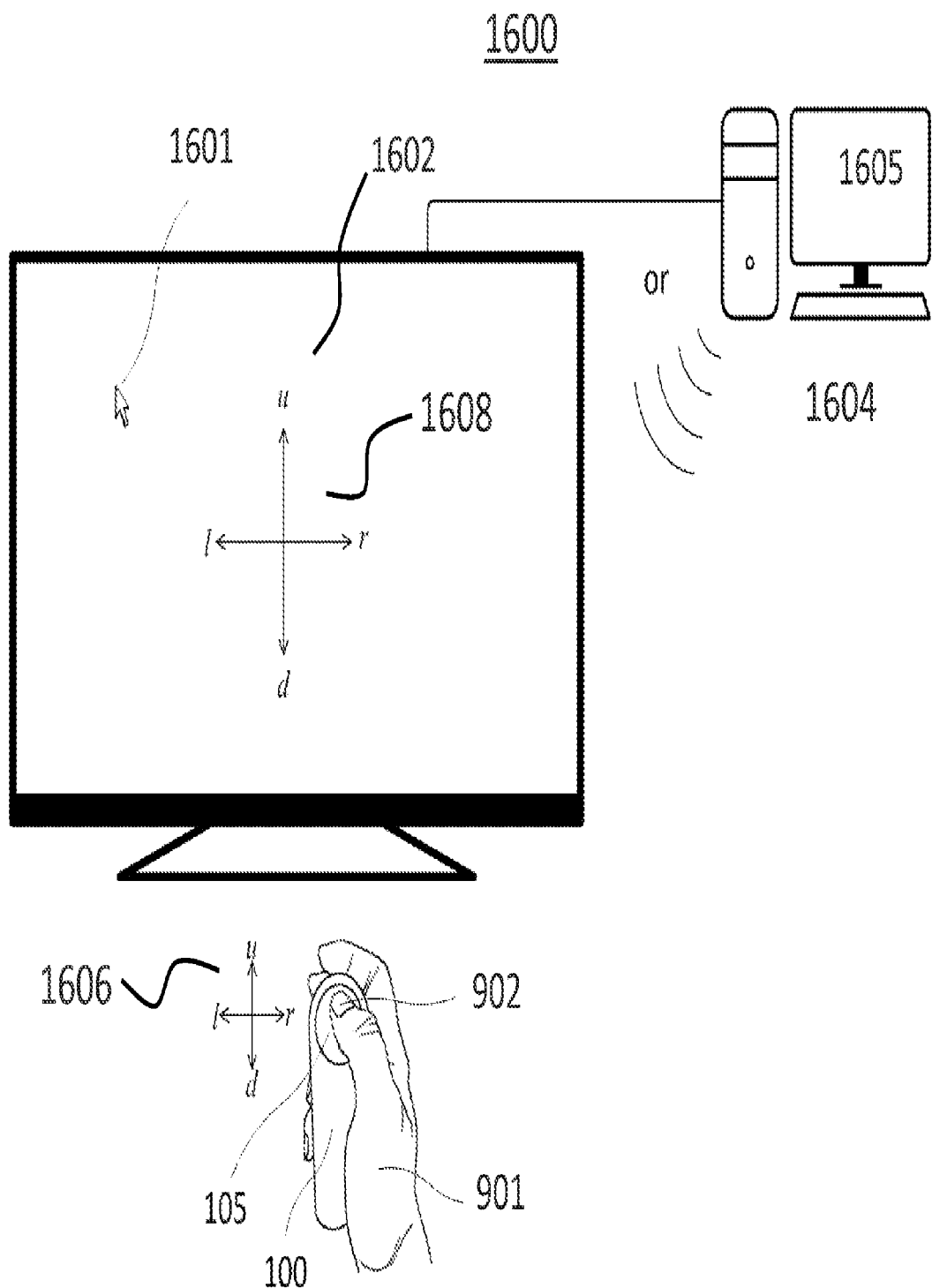
FIG. 16 shows an example of a user manipulating the controller using the right hand.

FIG. 16 shows an example 1600 of a user manipulating the controller 100 using the right hand 901. The view 1600 shows at least controller 100, thumb button 105, right hand 901, and thumb 902. The view 1600 also shows a cursor 1601, a display 1602, a computing device 1604, a display 1605, and coordinate frames 1606 and 1608. In other embodiments, the view 1600 may not have all of the elements or features listed and/or may have other elements or features instead of or in addition to those listed.

FIG. 16 shows an example 1600 in which the user uses his right hand 901 to manipulate the controller 100 to control a computing device and a separate display.

Cursor 1601 is an indicator that indicates the position on a computer monitor or other display device in respond to input from a pointing device or text input. In at least one embodiment, cursor 1601 may be a pointer or a mouse cursor, and have an arrow shape as shown in FIG. 16. In another embodiment, cursor 1601 may be a flashing text cursor or a caret. In at least one embodiment, the movement of the cursor 1601 corresponds to the thumb movement on the thumb touch pad and/or the movement of the controller 100 as a whole. In at least one embodiment, a single tap on the thumb touch pad wakes or locates the cursor 1601 on the display. When in the text input window, a tap on the thumb touch pad or a click on the index button 106 locates the text cursor.

Display 1602 is a display device that is separate from the display device or monitor of the computing device. In an embodiment, the display 1602 has a larger screen compared to the monitor of the computing device. In an embodiment, the display 1602 is in another location away from the computing device. In an embodiment, the display 1602 is a screen of a television. In an embodiment, the display 1602 may be connected, via a cable or wirelessly, to the computing device, so that a view of the user interface (e.g., a desktop view in a Windows-base system) that is intended to be displayed on the monitor of the computer device can be mirrored onto the display 1602. In at least one embodiment, the display 1602 may need a wireless communication module or hardware (e.g., a wireless dongle) for establishing wireless connections to the computing device 1604. In at least one embodiment, the display 1602 may be a television that includes at least a screen and speakers, while the computing device 1604 transmits image/video content as well as audio content via the wireless connection or data cable. The image/video content may be displayed on the screen of the television and the audio content may be played via the speakers of the TV.

Computing device 1604 is a device that can be programmed to carry out a set of arithmetic or logical operations automatically. Although the computing device 1604 is illustrated as a desktop computer in FIG. 16, it should be understood that the computing device 1604 may represent a variety of computing devices such as, but not limited to, mobile devices, laptop computers, tablet computers, workstations, game consoles, and smart phones. In at least one embodiment, the controller 100 is paired up with the computing device 1604 to control the operations on the computing device 1604 in the control mode. In at least one embodiment, the computing device 1604 may need a wireless communication module or hardware (e.g., a wireless dongle) for establishing wireless connections with the controller 100. In at least one embodiment, the computing device 1604 may be connected with the controller 100 via cables or wires. In at least one embodiment, the computing device 1604 includes its own display, and can be connected to one or more external display devices via data cables or wirelessly.

In at least one embodiment, the controller 100 includes a wireless communication module or hardware for establishing wireless connections to the computing device 1604. In at least one embodiment, the user may turn on the switch 404 (FIG. 4) and click on all three buttons (e.g., thumb button 105, index button 106, and middle button 107) of the controller 100 and hold down all three buttons for more than 1 second, for example, to trigger a process to establish wireless connection with the computing device 1604 and/or other devices. Once the wireless connection is successfully established, software applications of the controller 100 and/or computing device 1604 may be automatically activated, thereby allowing the detected finger operations of the controller 100 to control the computing device 1604. In an embodiment, multiple display devices may be on and connected to the computing device 1604, and upon connecting the controller 100 to the computing device, a list of connected display devices are presented on all connected display devices. The user may choose at least one from the list of connected display devices to show the user interface of the computing device 1604. After the user selects that display device and/or devices of interest, the other display devices that were not selected are automatically turned off by computing device 1604 (or going into sleep mode). In at least one embodiment, the user may hold down on all three buttons for more than 0.5 second, for example, to bring up a task manager to appear on the selected display device (e.g., similar to the "Ctrl-Alt-Del" shortcut operation in the Windows system). In an embodiment, if the user holds down on all three buttons for more than 1 second, for example, a window will prompt up to ask if the user wants to close the control session of the controller 100 or to turn off the computing device 1604.

Display 1605 is the display device or monitor of the computing device 1604. In an embodiment, the display 1605 displays a user interface for the user to interact with the computing device 1604. In at least one embodiment, when the user interface of computing device 1604 is displayed on the display 1602, the display 1605 may or may not show the user interface simultaneously.

Directions 1606 show the directions in which the thumb 902 may move on the thumb touch pad of the controller 100. In an embodiment, directions 1606 include directions such as left (l), right (r), up (u), and down (d). In at least one embodiment, the directions 1606 are similar to the directions as defined in FIG. 2. In an embodiment, the controller 100 may move as a whole in the directions 1606, when the user holds and moves the controller 100 as a whole.

Directions 1608 show the directions in which the cursor 1601 may move on the display 1602. In an embodiment, directions 1608 include directions, such as left (l), right (r), up (u), and down (d). In at least one embodiment, the directions 1608 correspond to the directions 1606, respectively, and the movements of the thumb 902 with respect to the thumb touch pad correspond to the movements of the cursor 1601 with respect to the display 1602. For example, when the thumb 902 of the user moves across the thumb touch pad toward the left, the cursor 1601 on the display 1602 also moves to the left with respect to the display 1602. In an embodiment, the distance of the movement of thumb 902 on the thumb touch pad may be proportional to the distance of the movement of cursor 1601 on the display 1602. In an embodiment, the speed of the movement of thumb 902 on the thumb touch pad may be measured and incorporated into the calculation of the displacement of the cursor 1601 on the display 1602. For example, the faster the thumb 902 moves on the thumb touch pad, the further the cursor 301 may travel.

In at least one embodiment, the controller 100 may include motion sensors such as accelerometers and/or gyroscopes to detect the direction and speed of the controller 100 when the user holds and moves the controller 100. In at least one embodiment, the movements of the controller 100, in combination with the movements of the thumb 902, determine how far and/or how fast the cursor 1601 travels. For example, the user may flick or move the controller 100 toward left, and concurrently move the thumb 902 to the left. As a result, the cursor 1601 may move further to the left than when only the thumb 902 is moved. In another embodiment, the controller 100 may adopt another configuration in which the motion sensors and the thumb touch pad independently control the movements of the cursor 1601. For example, the user may wave the controller 100 to quickly relocate the cursor 1601 to a desired region on the display 1602, and then move the thumb 902 on the thumb touch pad for fine control of the movements of the cursor 1601.

In at least one embodiment, the controller 100 is not required to point to the computing device 1604 and/or the display 1602 during the operation of the controller 100. For example, the user may hold the controller 100 in his hand and rest his hand on the lap or on an armrest of a couch, with the controller 100 facing sideways and pointing away from the display 1602. The directions of movements of the cursor 1601 is determined by the movements of the thumb 902 with respect to the thumb touch pad and/or the movements of the controller 100, but may not be affected by the direction in which the controller 100 points to.

In at least one embodiment, the display 1602 may be a screen of a television, and the controller 100 may be used to remotely control the television in the television mode. In an embodiment, the controller 100 includes an Infrared transmitter and can function as a TV remote control. The user may activate the television mode in the setup menu, and may operate on the controller 100 while pointing the controller 100 to the television to switch channels, adjust volume, etc. In at least one embodiment, the controller 100 may be used to toggle through various modes (control mode, TV mode, presentation mode, for example) when the user holds down the thumb button 105 while clicks the index button 106 and the middle button 107 simultaneously. In an embodiment, the color of light emitted by light 502 acts as an indicator of the mode the controller 100 is in. In at least one embodiment, when the TV is currently turned off, the user may toggle to or activate the TV mode using the controller 100, and then hold down on all three buttons for more than 0.5 second, for example, to turn the TV on. Vice Versa to turn off the TV. In at least one embodiment, the controller 100 may include various settings to translate click and/or touch operations into control commands in the television mode. For example, to switch channels, the user may click on the top/bottom portion of the thumb button 105 or to swipe the thumb 902 across the main touch pad to the left/right, or to swipe the index finger 903 upward/downward on the index touch pad, depending on what settings are selected by the user. In an example, to turn the volume up/down, the user may click on the right/left portion of the thumb button 105 or swipe the thumb 902 across the main touch pad upward/downward, or to scroll the index finger 903 in a clockwise/counter clockwise direction, respectively, along the index touch pad, depending on the selected settings. In yet another example, to input a channel number directly, the user may hold down on both the index button 106 and middle button 107, and meanwhile use the thumb 902 to write a digit on the thumb touch pad. The user may wait till the TV has registered this digit, and then write the next digit while still holding down the two buttons. The user may repeat the abovementioned steps until all digits are input. Alternatively, in another setting the user may hold down the thumb button and move the controller 100 in the air to write the channel number in the air, and the handwriting recognition software of the controller 100 may recognize the input channel number and switch to the desired channel on the television. In another example, less frequently used functions (e.g., Guide, Menu, Mute, etc.) on a regular TV remote control may be implemented using various combinations of finger operations on the buttons and/or touch pads of the controller 100. In an embodiment, the user may choose from the setup menu which settings to be used to control the television.

In at least one embodiment, the controller 100 may be used to control a game console or video games on the computing device 1604 when in the game mode. The game mode may be activated in the setup menu. In at least one embodiment, the buttons and/or touch pads of the controller 100 may be used for selection and/or navigation in the games. In at least one embodiment, the motion sensors of the controller 100 provide extra dimensions of user input when the user waves and/or rotates the controller 100 to control the video games.

In at least one embodiment, the controller 100 is used to control the display of the multimedia content in the media control mode. In this specification, multimedia content may be any of, or any combination of, content forms including, but not limited to, text, still images, animation, video, audio, and/or interactive content forms. The media control mode may be activated in the setup menu, or by selecting a video or audio file to play. In an embodiment, in the media control mode, the user may move the thumb 902 upward or downward on the thumb touch pad to increase or decrease the volume of the audio content, respectively. In another embodiment, the user may move the thumb 902 in a counter clockwise or clockwise direction on the thumb touch pad to rewind or to fast forward a video clip, respectively.

Figure 17:
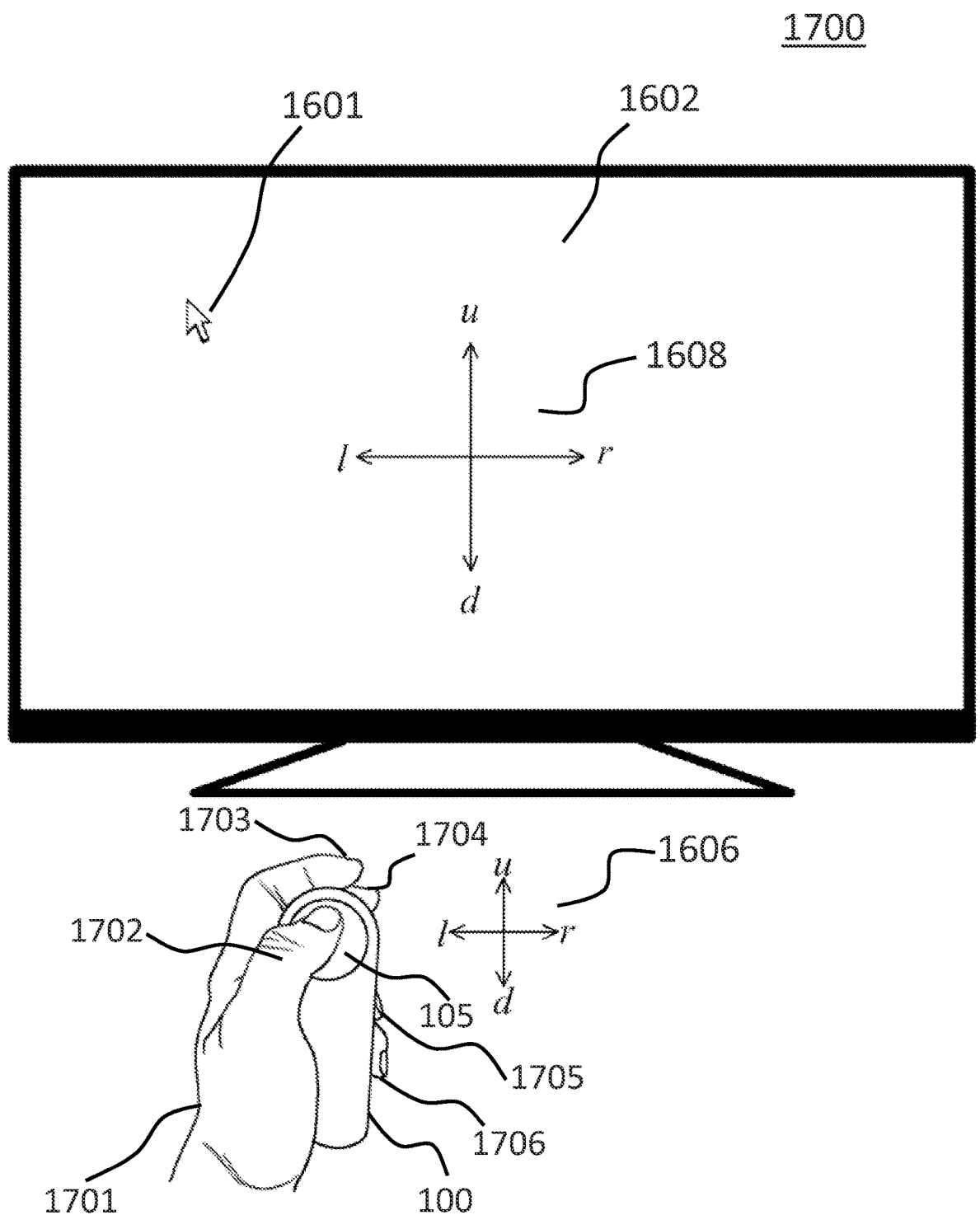
FIG. 17 shows an example of a user manipulating the controller using the left hand.

FIG. 17 shows an example 1700 of a user manipulating the controller 100 using the left hand. The view 1700 shows at least controller 100, thumb button 105, cursor 1601, display 1602, and coordinate frames 1606 and 1608. The view 1700 further shows a left hand 1701, thumb 1702, index finger 1703, middle finger 1704, ring finger 1705, and little finger 1706. In other embodiments, the view 1700 may not have all of the elements or features listed and/or may have other elements or features instead of or in addition to those listed.

FIG. 17 shows an example 1700 in which the user uses his left hand to manipulate the controller 100.

Left hand 1701 holds the controller 100 if the user is left-handed. In at least one embodiment, the left hand 1701 does not have to operate the controller 100 on a flat surface. In an embodiment, the left hand 1701 holds the controller to move in directions 1606 that correspond to the directions 1608 in which the cursor 1601 moves on the display 1602, in a similar manner as discussed in conjunction with FIG. 16.

Thumb 1702 of the left hand 1701 is in contact with the thumb button 105 in a natural posture when the left hand 1701 is holding the controller 100. In at least one embodiment, the thumb 1702 may operate on the thumb button 105 and/or the thumb touch pad for inputting commands. In at least one embodiment, the thumb 1702 moves in the directions 1606 to control the cursor movements accordingly, in a similar manner as discussed in conjunction with FIG. 16.

Index finger 1703 and middle finger 1704 of the left hand 1701 are in contact with the index button 106 and middle button 107, respectively, in a natural posture when the left hand 1701 is holding the controller 100. In at least one embodiment, the index finger 1703 may operate on the index button 106 and/or the index touch pad, while the middle finger 1704 may operate on the middle button 107 and/or the middle touch pad. In at least one embodiment, the index finger 1703 and middle finger 1704 of the left hand 1701 may move along or swipe across the index touch pad and middle touch pad, respectively, in manners as discussed in conjunction with FIGS. 10-15.

Ring finger 1705 and little finger 1706 wrap underneath the concave area 104 for support.

Figure 18:
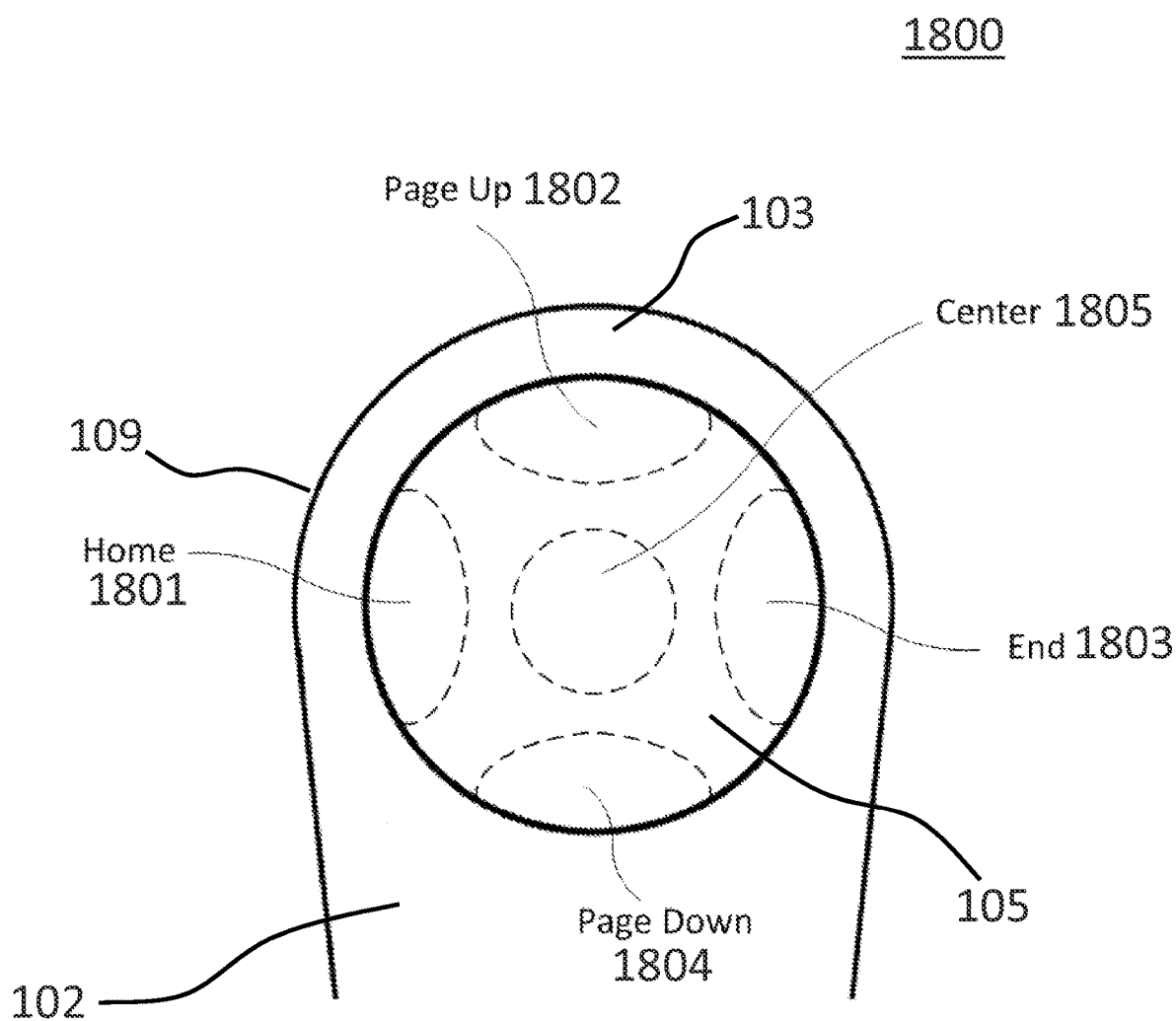
FIG. 18 shows a view of an embodiment of the thumb touch pad having different region for performing different operations.

FIG. 18 shows a view 1800 of an embodiment of the thumb touch pad that is configured to perform various operations. The view 1800 shows at least top surface 102, front slope 103, thumb button 105, and head end 109. The view 1800 further shows a left portion 1801, a top portion 1802, a right portion 1803, a bottom portion 1804, and a center portion 1805. In other embodiments, the view 1800 may not have all of the elements or features listed and/or may have other elements or features instead of or in addition to those listed.

FIG. 18 shows a view 1800 of the thumb touch pad that is used to control the computing device 1604 when browsing a webpage or a map. In at least one embodiment, when the user is browsing an image (e.g., a webpage/document or viewing a map), a double-tap on the thumb touch pad realigns the content of the user interface shown on the display 1602 or 1605, depending on which part of the thumb touch pad is tapped.

Left portion 1801 is a portion of the thumb touch pad close to the left side. In an embodiment, a double-tap on the left portion 1801 brings the user back to the home page (e.g., similar to clicking the Home key on a keyboard). In another embodiment, a double-tap on the left portion 1801 moves the focus of the image (e.g. a map) to the left.

Top portion 1802 is a portion of the thumb touch pad close to the front slope 103. In an embodiment, a double-tap on the top portion 1802 brings the user to the previous page (e.g., similar to clicking the Page Up key on a keyboard). In another embodiment, a double-tap on the top portion 1802 moves the focus of the image (e.g., a map) upwards.

Right portion 1803 is a portion of the thumb touch pad close to the right side. In an embodiment, a double-tap on the right portion 1803 brings the user to the end of the webpage or document (e.g., similar to clicking the End key on a keyboard). In another embodiment, a double-tap on the right portion 1803 moves the focus of the map to the right.

Bottom portion 1804 is a portion of the thumb touch pad close to the bottom side. In an embodiment, a double-tap on the bottom portion 1804 brings the user to the next page (e.g., similar to clicking the Page Down on a keyboard). In another embodiment, a double-tap on the bottom portion 1804 moves the focus of the image downwards.

Center portion 1805 is a portion of the thumb touch pad in the center. In an embodiment, a double-tap on the center portion 1805 realigns the image (e.g. the webpage or map) to the center of the user interface show on the display 1602 or 1605.

Figure 19:
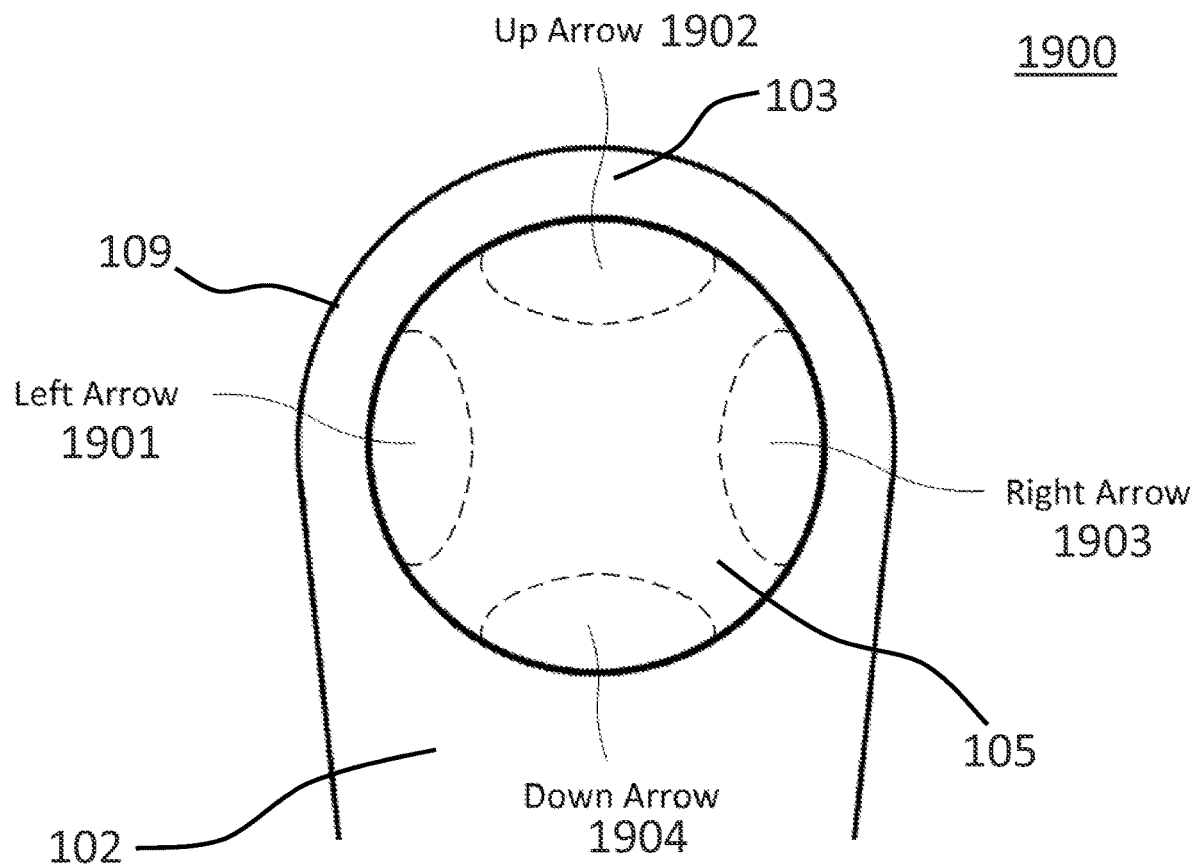
FIG. 19 shows a view of an embodiment of the thumb button that is configured to perform operations during the text input mode.

FIG. 19 shows a view 1900 of an embodiment of the thumb button 105 that is configured to perform operations during the text input mode. The view 1900 shows at least top surface 102, front slope 103, thumb button 105, and head end 109. The view 1900 further shows a left portion 1901, a top portion 1902, a right portion 1903, and a bottom portion 1904. In other embodiments, the view 1900 may not have all of the elements or features listed and/or may have other elements or features instead of or in addition to those listed.

FIG. 19 shows a view 1900 of the thumb button 105 that controls the text input location during the text input mode. FIG. 19 shows that the click operations on the thumb button 105 may be translated to various arrow key operations during the text input mode.

In at least one embodiment, to activate the text input mode, the user may move the thumb 902 on the thumb touch pad to relocate the cursor 1601 over a text input area, and then the user may tap on the thumb touch pad or click the index button 106 to highlight the text cursor in the text input area, causing a soft keyboard to appear on the display 1602 or 1605. The user may further move the thumb 902 on the thumb touch pad to move the cursor 1601 over a desired key on the soft keyboard. In an embodiment, the key, upon selection, becomes ballooned or highlighted. Then the user may click the index button 106 to select the highlighted key. If a letter or number is selected, the letter/number is inserted to the current location of the text cursor 1601. If a function key is selected, the corresponding operation will be activated. For example, if the "Caps Lock" key on the soft keyboard is selected, the next letter input may be capitalized. To deactivate the text input mode, the cursor 1601 may be relocated over a non-input area, and the index button 106 is clicked, causing the soft keyboard to disappear from the display 1602 or 1605. In at least one embodiment, the user may click the middle button 107 to activate a context menu next to the cursor 1601 (e.g., similar to a right click using a traditional electrical mouse).

Left portion 1901 is a portion of the thumb button 105 close to the left side. During the text input mode, clicking on the left portion 1901 causes the cursor 1601 to move to the left of the previous cursor position (e.g., similar to clicking the Left Arrow key on the soft keyboard or a real keyboard). In at least one embodiment, each single click on the thumb button 105 causes the text cursor 1601 to move a distance of just one position (e.g., the distance of the space occupied by one character).

Top portion 1902 is a portion of the thumb button 105 close to the front slope 103. During the text input mode, clicking on the top portion 1902 causes the cursor 1601 to move up to the previous text line (e.g., similar to clicking the Up Arrow key on the soft keyboard or a real keyboard).

Right portion 1903 is a portion of the thumb button 105 close to the right side. During the text input mode, clicking on the right portion 1903 causes the cursor 1601 to move to the right of the previous cursor position (e.g., similar to clicking the Right Arrow key on the soft keyboard or a real keyboard). In an embodiment, when the cursor 1601 is at the end of a text line, clicking the right portion 1903 moves the cursor 1601 to the beginning of the next text line, if available.

Bottom portion 1904 is a portion of the thumb button 105 close to the bottom side. During the text input mode, clicking on the bottom portion 1904 causes the cursor 1601 to move down to the next text line (e.g., similar to clicking the Down Arrow key on the soft keyboard or a real keyboard).

Figure 20:
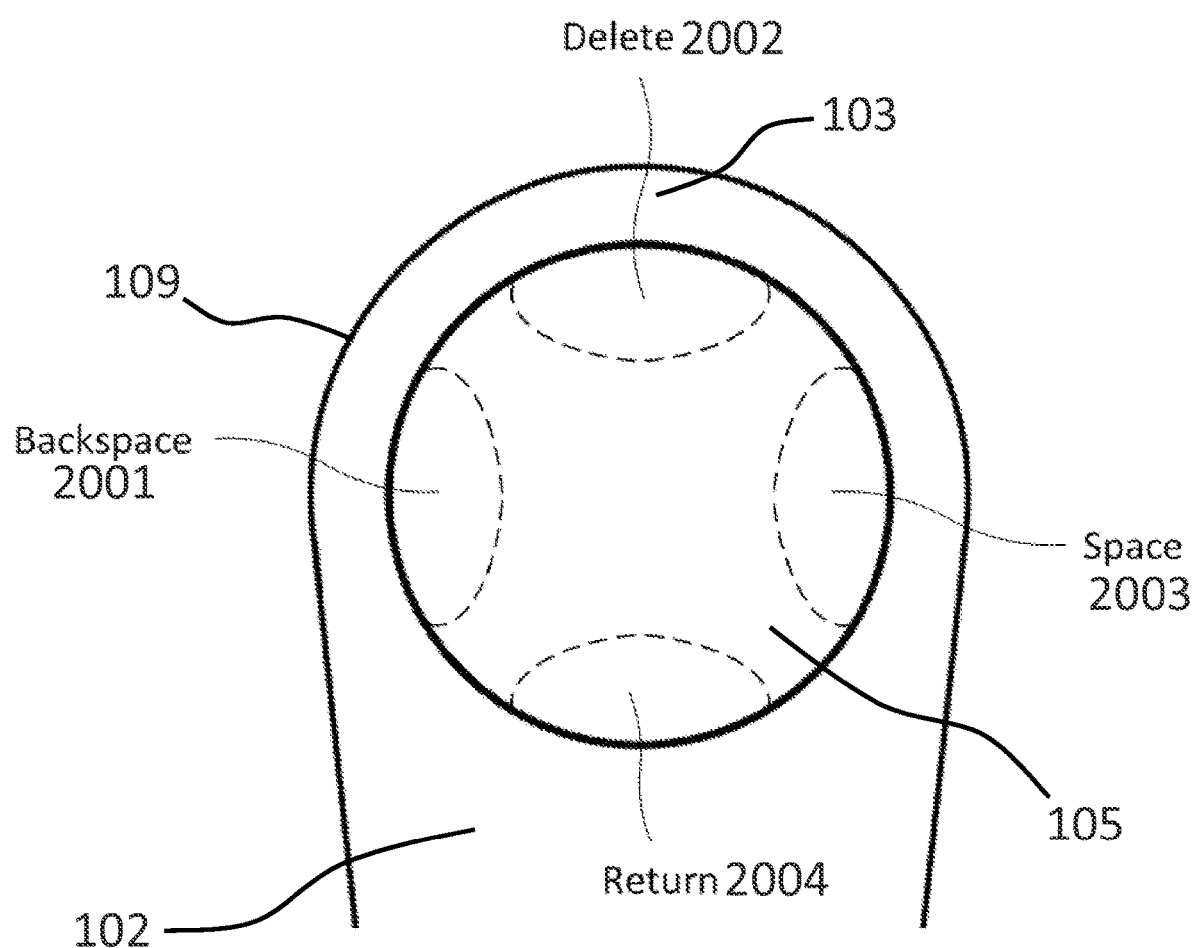
FIG. 20 shows a view of an embodiment of the thumb button that is configured, in combination with index button, to perform operations during the text input mode.

FIG. 20 shows a view 2000 of an embodiment of the thumb button 105 that is configured, in combination with index button 106, to activate operations during the text input mode. The view 2000 shows at least front slope 103, thumb button 105, and head end 109. The view 2000 further shows a left portion 2001, a top portion 2002, a right portion 2003, and a bottom portion 2004. In other embodiments, the view 2000 may not have all of the elements or features listed and/or may have other elements or features instead of or in addition to those listed.

FIG. 20 shows a view 2000 of the thumb button 105 that controls the text input in combination with the index button 106. During the text input mode, clicking on various portions of the thumb button 105 while holding down on the index button 106 may be translated to various commands related to manipulating text and/or navigating through text.

Left portion 2001 may be an embodiment of the left portion 1901. In an embodiment, clicking on the left portion 2001 when the index button 106 is pressed down deletes the text to the left of the cursor 1601 (e.g., similar to clicking the backspace key on the soft keyboard or a real keyboard).

Top portion 2002 may be an embodiment of the top portion 1902. In an embodiment, clicking on the top portion 2002 when the index button 106 is pressed down deletes the text to the right of the cursor 1601 (e.g., similar to clicking the delete key on the soft keyboard or a real keyboard).

Right portion 2003 may be an embodiment of the right portion 1903. In an embodiment, clicking on the right portion 2003 when the index button 106 is pressed down causes one space to be inserted to the current text cursor position (e.g., similar to pressing the space key on the soft keyboard or a real keyboard).

Bottom portion 2004 may be an embodiment of the bottom portion 1904. In an embodiment, clicking on the bottom portion 2004 when the index button 106 is pressed down starts a new line and moves the cursor 1601 to the beginning of the new line (e.g., similar to pressing the return key or enter key on the soft keyboard or a real keyboard).

Figure 21:
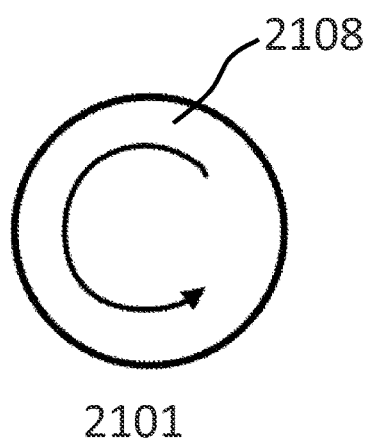
FIG. 21 shows a view of an embodiment of the thumb touch pad that recognizes hand writing.
Figure 21:
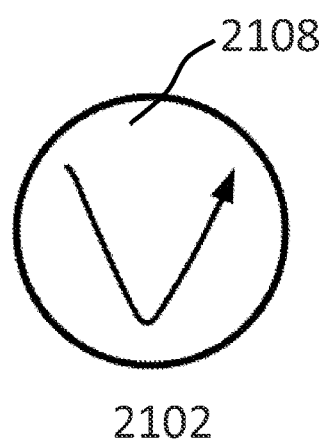
Figure 21:
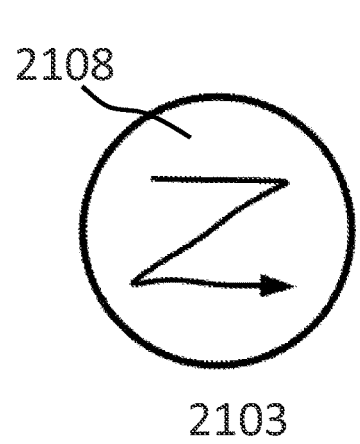
Figure 21:
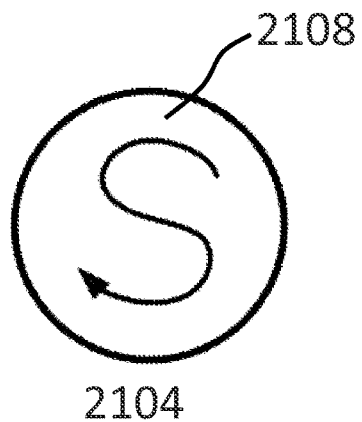
Figure 21:
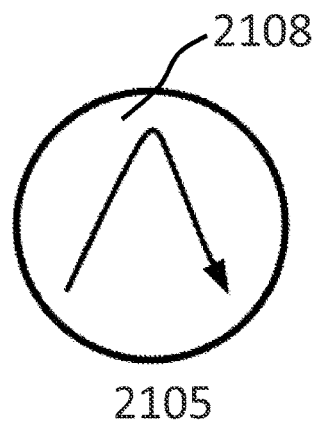
Figure 21:
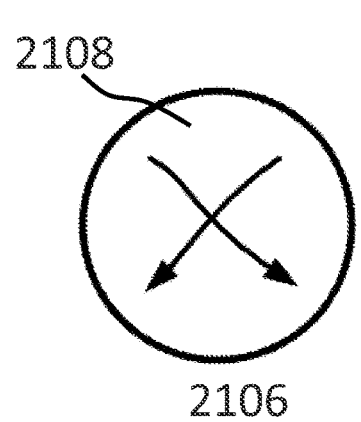

FIG. 21 shows a view 2100 of an embodiment of the thumb touch pad that recognizes hand writing. The view 2100 shows at least letters 2101, 2102, 2103, 2104, 2015, and 2106, and thumb touch pad 2108. In other embodiments, the view 2100 may not have all of the elements or features listed and/or may have other elements or features instead of or in addition to those listed.

FIG. 21 shows a view 2100 of the thumb touch pad that may recognize hand writing to be translated by the controller 100 to control commands. FIG. 21 shows examples of handwriting letters on the thumb touch, which when both the index button 106 and middle button 107 are held down, may be translated to various "short-cut" operations.

Letter 2101 shows a letter "C" written by the thumb 902 on the thumb touch pad. In an embodiment, writing letter 2101 while holding down on both the index button 106 and middle button 107 causes the selected content to be copied into the clipboard (e.g., similar to a "Ctrl-C" short-cut on a keyboard in a Windows system).

Letter 2102 shows a letter "V" written by the thumb 902 on the thumb touch pad, which, when both the index button 106 and middle button 107 are pressed down, causes to paste the content stored in the clipboard at the cursor position (e.g., similar to a "Ctrl-V" short-cut on a keyboard in a Windows system).

Letter 2103 shows a letter "Z" written by the thumb 902 on the thumb touch pad, which, when both the index button 106 and middle button 107 are pressed down, causes to revert/undo the last operation (e.g., similar to a "Ctrl-Z" short-cut on a keyboard in a Windows system).

Letter 2104 shows a letter "S" written by the thumb 902 on the thumb touch pad, which, when both the index button 106 and middle button 107 are pressed down, causes a document/webpage to be saved (e.g., similar to a "Ctrl-S" short-cut on a keyboard in a Windows system).

Letter 2015 shows a letter "A" written by the thumb 902 on the thumb touch pad, when both the index button 106 and middle button 107 are pressed down, causes the entire content to be selected (e.g., similar to a "Ctrl-A" short-cut on a keyboard in a Windows system).

Letter 2106 shows a letter "X" written by the thumb 902 on the thumb touch pad, which, when both the index button 106 and middle button 107 are pressed down, leads to cutting the selected content and store into the clipboard (e.g., similar to a "Ctrl-X" short-cut on a keyboard in a Windows system).

In an alternative embodiment, just drawing the letter or in on the touch pad is interpreted as the keyboard short cut using the same letter or when in a certain mode just drawing the letter is interpreted as the same keyboard shortcut associated with the letter drawn, so that for example drawing an X is interpreted as "Ctrl-X."

It should be understood that many other letters may be used to activate other "short-cut" operations. The arrows in FIG. 21 show the directions in which the letters are drawn. Alternatively, a user may choose to write in other directions or using another ways in which the handwriting letters/patterns can be recognized. In an embodiment, each letter input may correspond to a different short-cut operation.

Thumb touch pad 2108 may be an embodiment of the thumb touch pad that is connected on top of the thumb button 105, as discussed in conjunction with FIG. 1. In at least one embodiment, the controller 100 may recognize hand writing of characters, letters, shapes, and/or drawings that are directly drawn by the thumb 902 on the thumb touch pad 2108. During the text input mode, the user may choose to input text using the soft keyboard or real keyboard, or may activate a handwriting mode (e.g., by selecting from the setup menu) to write/draw content directly on the thumb touch pad 2108. In an embodiment, when a foreign language is selected in the settings of the handwriting mode, the thumb touch pad 2108 can recognize the hand writing of foreign language characters. In at least one embodiment, the controller 100 may recognize hand writing of characters, letters, shapes, and/or drawings that are directly drawn by moving the controller 100 itself in the air.

Figure 22:
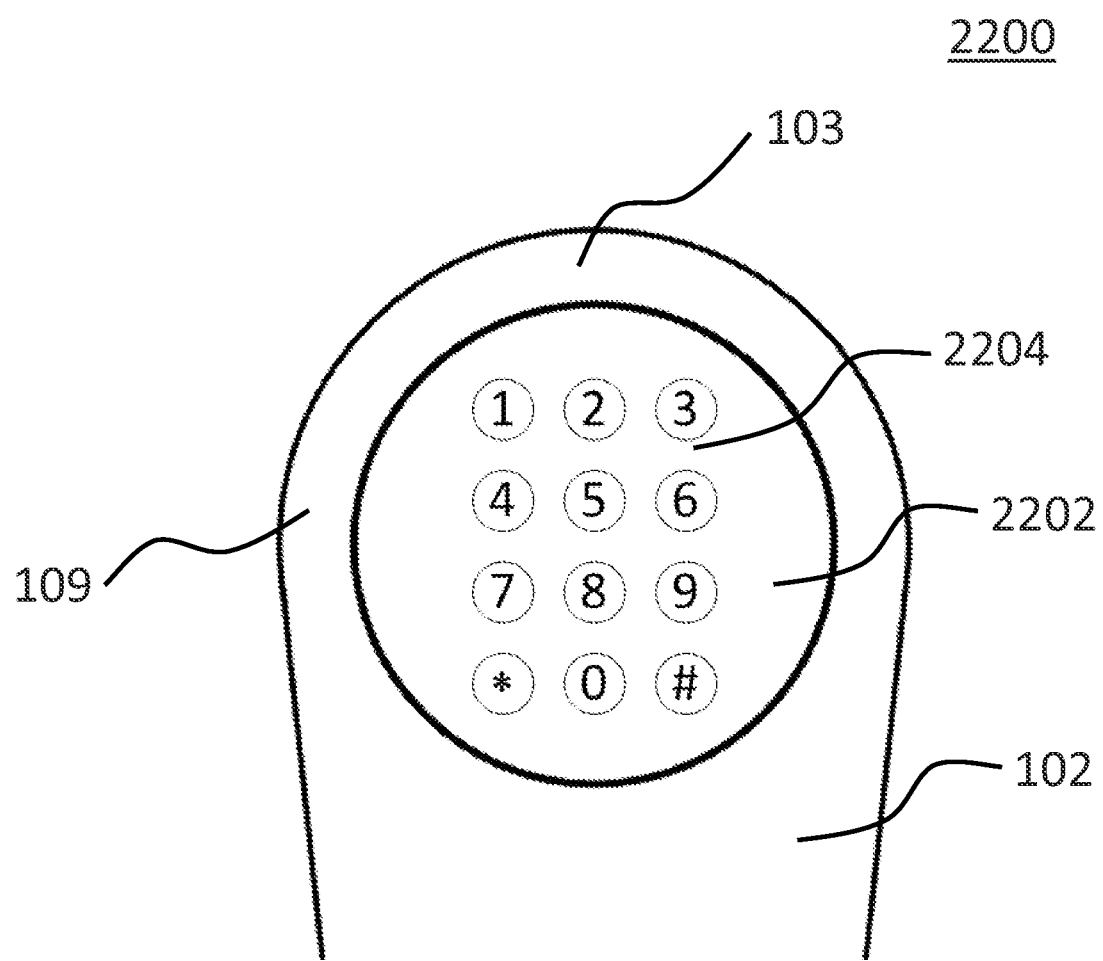
FIG. 22 shows a view of an embodiment of the thumb button having a touchscreen.

FIG. 22 shows a view 2200 of an embodiment of the thumb button 105 mounted with a touchscreen. The view 2200 shows at least top surface 102, front slope 103, and head end 109. The view 2200 further shows a touchscreen 2202 and key panel 2204. In other embodiments, the view 2200 may not have all of the elements or features listed and/or may have other elements or features instead of or in addition to those listed.

FIG. 22 shows a view 2200 of the thumb button 105 that is mounted with a touchscreen that can display information for the user to directly interact with. In an embodiment, the thumb touch pad on the thumb button 105 may not display information.

Touchscreen 2202 is an input device that is layered on the top of an electronic visual display. In at least one embodiment, the touchscreen 2202 displays images and/or other content for the user to interact with by touching the touchscreen 2202. In at least one embodiment, the display functionality of the touchscreen 2202 may operate independently from the touch sensors that detect finger movements. For example, the display of the touchscreen 2202 does not have to be activated all the time. When in certain modes, such as in the television mode, the touchscreen 2202 may display a numerical panel for the user to touch and input channel numbers. In another example, when a Voice over IP (VoIP) application is activated, the touchscreen 2202 may display a phone dialing panel for the user to dial a phone number to make a call over the internet. In other embodiment, the touchscreen 2202 may display other keypads, buttons and/or contents for the user to select and/or input.

Keypad 2204 includes a set of buttons or keys that are displayed on the touchscreen 2202. The user may touch the buttons or keys to select the corresponding number/letter. Although shown as a telephone keypad in FIG. 22, the keys of the keypad 2204 may bear any type of information such as, but not limited to, numbers, letters, symbols, and/or other characters.

Figure 23:
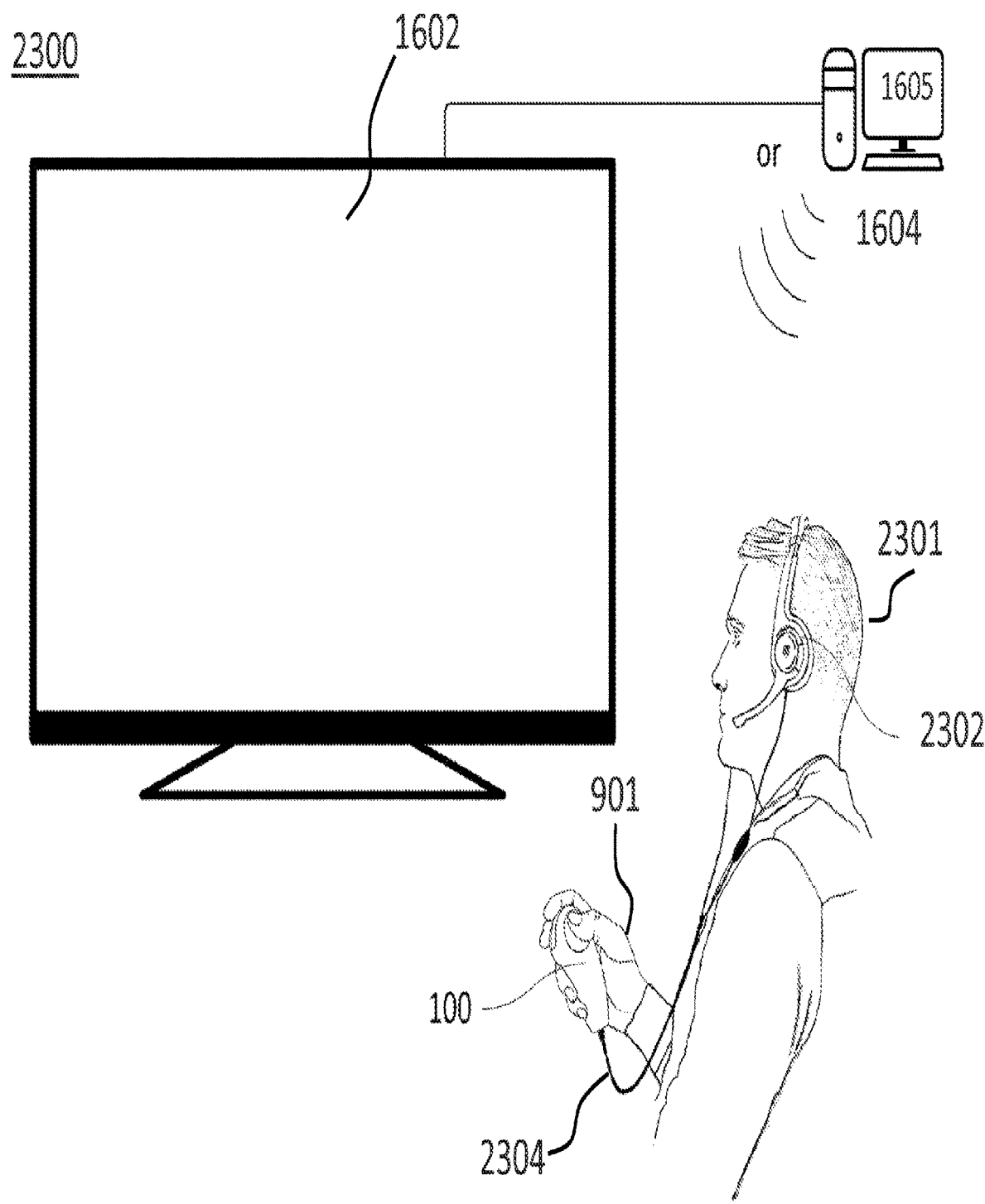
FIG. 23 shows a view of an embodiment of the controller connected to a headset.

FIG. 23 shows a view 2300 of an embodiment of the controller 100 connected to a headset. The view 2300 shows at least controller 100, right hand 901, display 1602, computing device 1604, and display 1605. The view 2300 further shows a user 2301, a headset 2302, and a cable 2304. In other embodiments, the view 2300 may not have all of the elements or features listed and/or may have other elements or features instead of or in addition to those listed.

FIG. 23 shows a view 2300 of an embodiment of the controller 100 controlling the multimedia content to be displayed by the display 1602 and a headset.

User 2301 is a person who may use the controller 100 to control various devices at his/her home. In at least one embodiment, the user 2301 does not have to walk to different locations/rooms at home to interact with different computing/electronic devices, but can stay wherever he/she wants and access multiple devices using a single controller 100. For example, the user 2301 may sit comfortably in the couch in the living room and watch the display 1602 of the flat screen TV that shows the user interface of the computing device 1604, or may put on a headset and/or a set of goggles to view the user interface of the computing device 1604.

Headset 2302 is a device that includes a pair of small loudspeakers that are designed to be held in place close to the ears of the user 2301, allowing the user 2301 to listen to an audio source privately. The headset 2302 may include a double-earpiece or a single-earpiece. In an embodiment, the headset 2302 is connected to the controller 100, via a cable. Alternatively, the headset 2302 may be wirelessly connected to the controller 100 and/or the computing device 1604. In at least one embodiment, the audio data may be transmitted from the computing device 1604 to the controller 100 and then played by the headset 2302. Alternatively, the headset 2302 may play audio data that is stored in a memory system of the controller 100. In an embodiment, the headset 2302 may have its own volume control. Alternatively or additionally, the playing of multimedia content may be controlled by the controller 100 in the media control mode, as discussed in conjunction with FIG. 16.

In at least one embodiment, the headset 2302 includes a microphone for detecting voice data that may be translated to voice commands. Alternatively, the controller 100 may be connected to a headphone or earphone that is not equipped with a microphone. Alternatively or additionally, the user may input voice commands via the microphone 702 installed on the controller 100.

Cable 2304 may include a plurality of electrical wires for connecting the headset 2302 to the connector 706 of the controller 100. In at least one embodiment, the cable 2304 transmits audio data from the controller 100 to the headset 2302 to be played, and/or transmits voice data from the headset 2302 to the controller 100.

Figure 24:
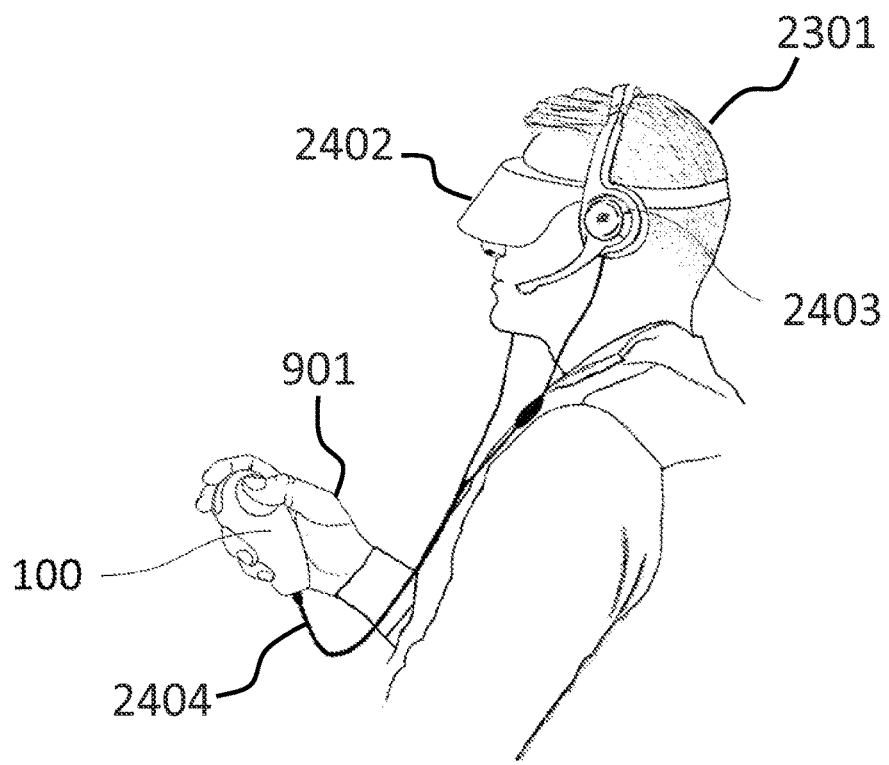
FIG. 24 shows a view of an embodiment of the controller connected to a set of goggles.

FIG. 24 shows a view 2400 of an embodiment of the controller 100 connected to a set of goggles. The view 2400 shows at least controller 100, right hand 901, computing device 1604, display 1605, and user 2301. The view 2400 further shows a set of goggles 2402, a headset 2403, and a cable 2304. In other embodiments, the view 2400 may not have all of the elements or features listed and/or may have other elements or features instead of or in addition to those listed.

FIG. 24 shows a view 2400 of an embodiment of the controller 100 that is connected to a set of goggles to display multimedia content.

Goggles 2402 are a type of eyewear that functions as a display device for displaying images and/or videos to be viewed by the user 2301 when wearing the set of goggles 2402. In at least one embodiment, the set of goggles 2402 takes the form of one or two display screens that are worn in front of the face of the user 2301 and project graphical images. In an embodiment, when wearing the set of goggles 2402, the user 2301 may see two separate images—one in each eye which the brain combines to form a three dimensional (3D) image. The set of goggles 2402 may show an illusion of depth which is a characteristic feature of virtual environments. In an embodiment, the set of goggles 2402 are projection goggles or a set of virtual reality (VR) goggles. In an embodiment, the set of goggles 2402 allows the user 2301 to view and interact with images and/or videos when wearing the set of goggles 2402. In at least one embodiment, the set of goggles 2402 may include an integrated headset for playing audio data to go with the video display. In at least one embodiment, the set of goggles 2402 is connected to the controller 100, via a cable. Alternatively, the set of goggles 2402 may be wirelessly connected to the controller 100 and/or the computing device 1604. In at least one embodiment, when the controller 100 or the set of goggles 2402 is communicatively connected to the computing system 1604. The set of goggles 2402 may project the user interface that was intended to be displayed by the display 1605 of the computing system 1604. In an embodiment, the set of goggles 2402 is powered by batteries, or may be installed with a built-in battery unit. In at least one embodiment, the set of goggles 2402 may be charged separately. Alternatively, the goggles 2402 are battery operated.

In at least one embodiment, the set of goggles 2402 and the controller 100 can form an independent computing system, without having to be connected to an external computer such as the computing system 1604. The user may view the setup menu or a user interface displayed via the set of goggles 2402 to configure the controller 100 to perform various operations. For example, the user may use the controller 100 to control the set of goggles 2402 to play music or video content that are stored in the memory system of the controller 100, to edit documents, and/or to browse the Internet (when the controller 100 is connected to the Internet), in similar manners as operating on a personal computer (PC), but with more ease and flexibility (e.g., the user 2301 may be lying in a couch instead of sitting in front of a PC). In at least one embodiment, the set of goggles 2402, if connected to the controller 100, is configured as the default display device for the controller 100. The set of goggles 2402 may display the setup menu or a start menu once the controller 100 is turned on. In an embodiment, the user can simply select from the setup menu or start menu shown, via the set of goggles 2402, using the controller 100, to establish a connection to the computing device 1604 and start operating on the computing device 1604. Alternatively, the user 2301 may establish the connection between the controller 100 and the computing device 1604 by pressing down all the three buttons simultaneously, as discussed in conjunction with FIG. 1.

In an embodiment, the set of goggles 2402 projects contents (e.g., user interface, web pages, documents, images, videos, etc.) privately and exclusively to the user 2301 who is wearing the set of goggles 2402, while the headset of the set of goggles 2402 plays audio content privately to the ears of the user 2301, preventing a third party to see and hear the communication content. Thus, the use of goggles 2402 with the headset effectively protects the privacy of the user 2301.

Headset 2403 may be similar to the headset 2302, except that the headset 2302 may be used as a standalone device while the headset 2403 may be integrated in or connected to the set of goggles 2402. In an embodiment, the set of goggles 2402 and the headset 2403 may be independent of one another, and the controller 100 may be connected individually to the set of goggles 2402 and headset 2403.

Cable 2404 connects the controller 100 to the set of goggles 2402 and the headset 2403. Cable 2404 may be similar to the cable 2304, except that the cable 2404 transmits video data as well as audio data to the set of goggles 2402 and the headset 2403, while the cable 2304 transmits only audio data/voice data to the headset 2302. In at least one embodiment, the controller 100 receives data (user interface, video, audio, for example) from the computing device 1604 via wireless connection, and then the controller 100 transmits the received data via cable 2404 to the goggles 2402. In another embodiment, the controller 100 may be wirelessly connected to the goggles 2402 and/or other display systems, and the controller 100 may transmit data to the goggles 2402 (and/or to other display systems for display).

In at least one embodiment, the controller 100 coordinates the display content, such as the videos or movies (e.g., on the display 1602, via the set of goggles 2402, or on other display devices), and the sound track of the videos or movies (e.g., via the headset 2403, or other speakers), to achieve a synchronized display effect. When the movie is paused in the middle, for example, the controller 100 controls display of video on the display 1602 or the set of goggles 2402 to pause, and also controls the audio via the headset 2403 or speakers to stop playing. In an embodiment, the display content on the display 1602 or goggles 2402 may be independent from the playing of audio content (e.g., the user may switch between different tasks while listening to music), and the controller 100 may individually control the display 1602/goggles 2402 and the headset 2403 or other speakers.

Figure 25:
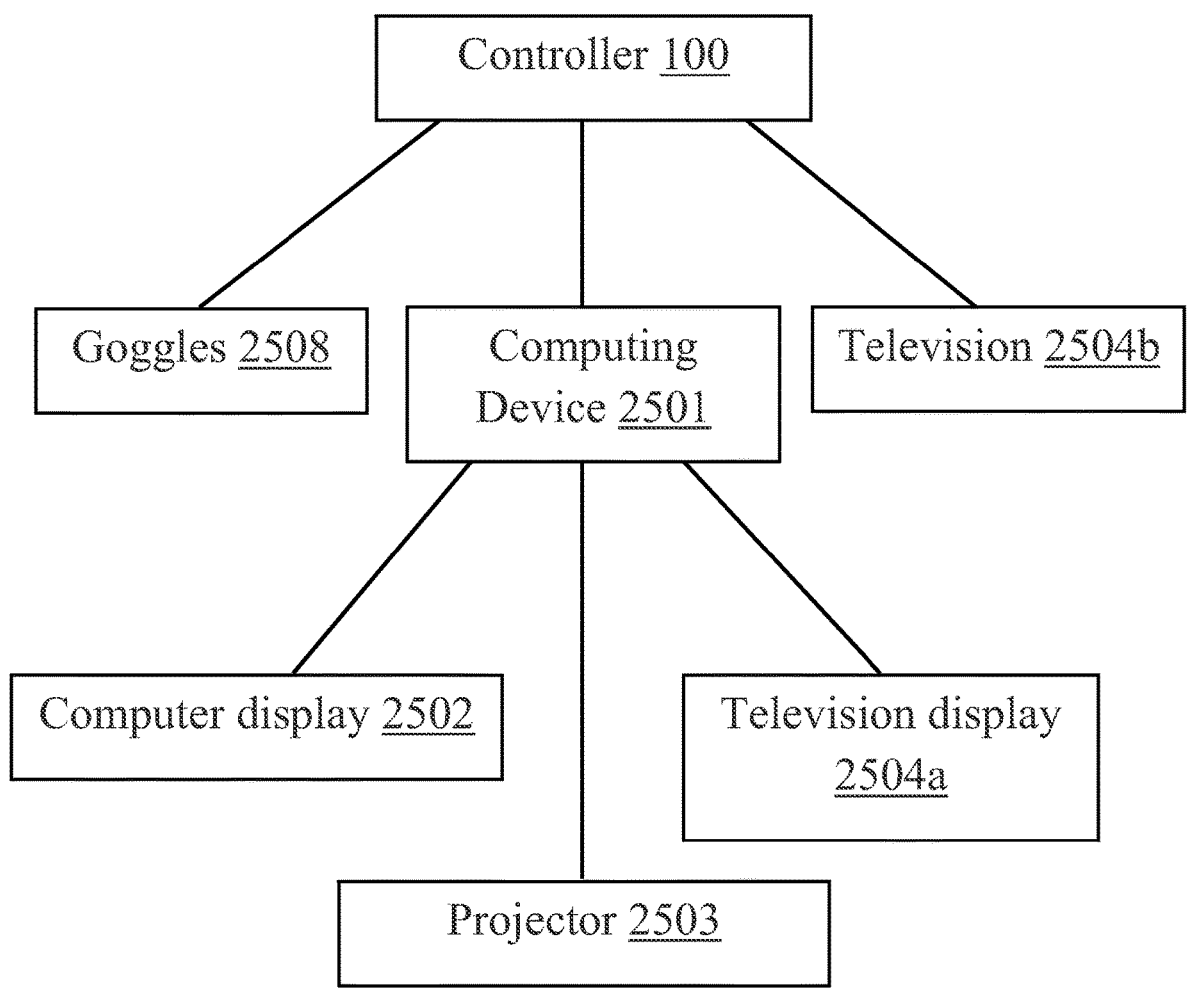
FIG. 25 shows a block diagram of display systems that may be controlled by the controller.

FIG. 25 shows a block diagram 2500 of display systems that may be controlled directly or indirectly by the controller 100. The block diagram 2500 shows the controller 100, a computing device 2501, a computer display 2502, a projector 2503, a television display 2504, a television 2504*b*, 2503 and a set of goggles 2508. In other embodiments, the block diagram 2500 may not have all of the elements or features listed and/or may have other elements or features instead of or in addition to those listed.

FIG. 25 shows a block diagram 2500 of the controller 100 that provides a single display platform for a variety of different display systems.

Computing device 2501 and computer display 2502 may be an embodiment of the computing device 1604 and the display 1605 of the computing device 1604, which were discussed in conjunction with FIG. 16. In at least one embodiment, the computer display 2502 and other display systems of FIG. 25 may be connected, via cables or wirelessly, to the computing device 2501. In an embodiment, in the control mode, once the controller 100 is connected to the computing device 2501, the computing device 2501 may instruct each connected display system to show a list of all the connected display systems. In at least one embodiment, in the control mode, the display systems needs to be on and connected to the computing device 2501 so that each of the display systems may display the list of connected display systems. The user 2301 may choose from the list a display system to view by watching the display closest to him/her. For example, the user 2301 may select the television display from the list, and the user interface on the computer display 2502 will then be mirrored onto the television display dedicatedly.

Projector 2503 is an optical device that projects images or videos onto a surface (e.g., a projection screen). In at least one embodiment, the projector 2503 is connected to the computing device 2501 via a cable or wirelessly. In an embodiment, in the control mode, the controller 100 controls the computing device 2501 to send data to the projector 2503 to project the user interface of the computing device 2501 on the projection screen.

Television display 2504a is a display system of a television. In at least one embodiment, the television display 2504a is connected to the computing device 2501 via cable or wirelessly, and the computing device 2501 mirrors the user interface onto the television display 2504a.

Television 2504b may be any type of television (TV) including, but not limited to, electronic television, digital television, flat screen TV, smart TV, 3D TV, cable TV, satellite TV, and web TV/internet TV. In at least one embodiment, television 2504b includes at least a screen (e.g., television display 2504a) and one or more speakers. In at least one embodiment, television 2504b may be controlled using a remote controller or a device that can transmit infrared signals or other wireless signals. In at least one embodiment, television 2504b may be controlled by the controller 100 in the TV mode, while the user points the controller 100 that has an infrared module toward the television 2504b. In an embodiment, the television 2504b may be located in the living room, in front of a couch or chairs. In at least one embodiment, the controller 100 controls the television 2504b to watch TV (in the television mode) or to display the user interface of the computing device 2501 on the television display 2504a (in the control mode).

Goggles 2508 are embodiments of the set of goggles 2402, which was discussed in conjunction with FIG. 24. In an embodiment, the goggles 2508 are connected to the controller 100, via at least a data cable, and the controller 100 sends user interface and/or video content that is received from the computing device 2501 to the goggles 2508 for display. In another embodiment, the controller 100 sends video content that is stored in the memory system of the controller 100 to the goggles 2508. Optionally, the goggles 2508 may be wireless connected to the computing device 2502 and receive data from the computing device 2501.

In at least one embodiment, the controller 100 may be directly connected to and controls the display system (goggles 2505, television 2504b in the TV mode, for example). In another embodiment, the controller 100 may indirectly manipulate the display content on the display system by instructing the computing device 1604 to mirror image/video content onto the display system (television display 2504a in the control mode, projector, for example).

Figure 26:
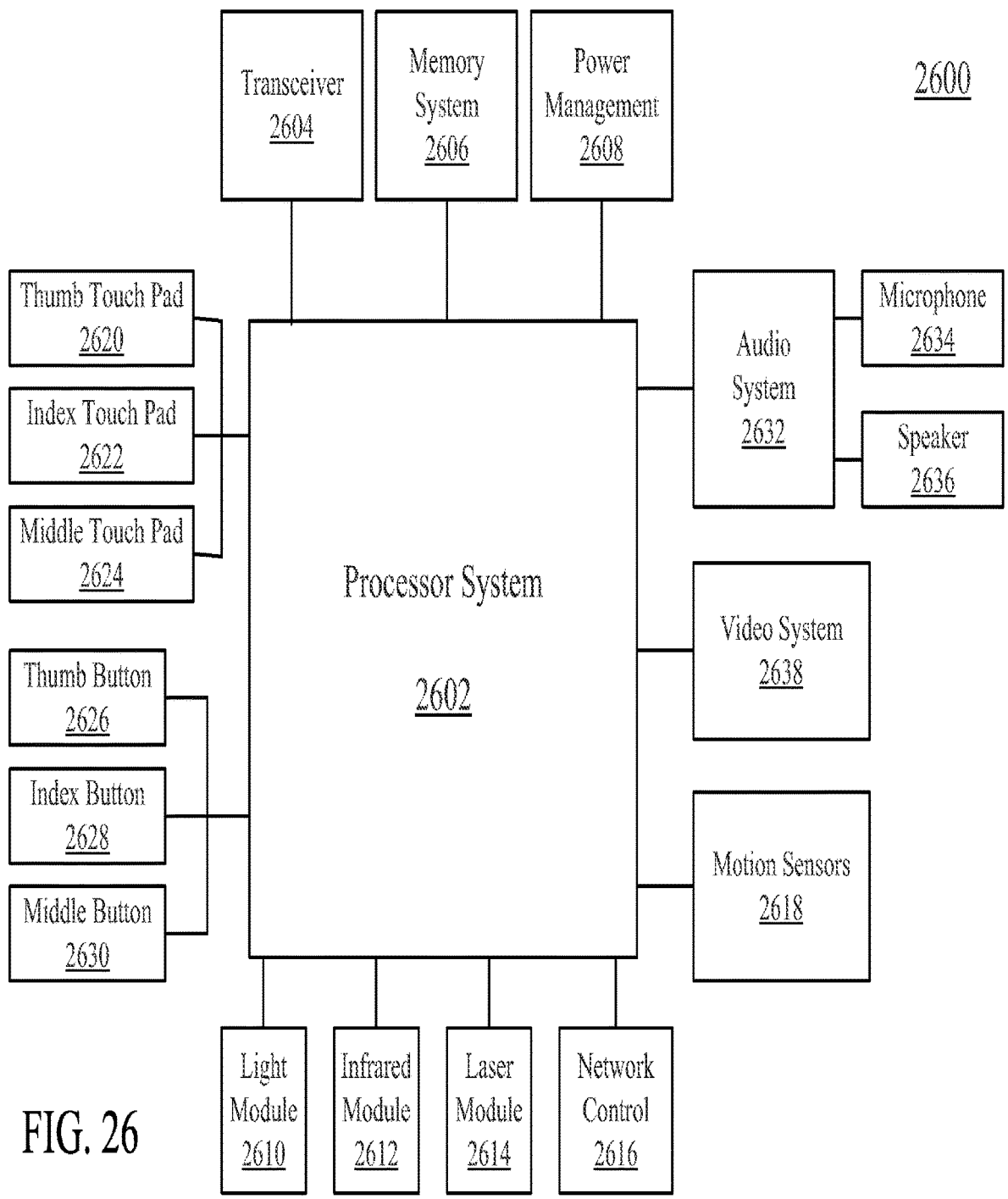
FIG. 26 shows a block diagram of an embodiment of the controller of FIG. 1.

FIG. 26 shows a block diagram 2600 of an embodiment of the controller 100 of FIG. 1. The controller 100 includes at least a processor system 2602, a transceiver 2604, a memory system 2606, a power management 2608, an LED 2610, a infrared 2612, a laser 2614, a network control 2616, motion sensors 2618, a thumb touch pad 2620, an index touch pad 2622, a middle touch pad 2624, a thumb button 2626, an index button 2628, a middle button 2630, an audio system 2632, a microphone 2634, a speaker 2636, and a video system 2638. In other embodiments, the system in block diagram 2600 may not have all of the elements or features listed and/or may have other elements or features instead of or in addition to those listed.

FIG. 26 shows a block diagram 2600 of the components in the controller 100.

Processor system 2602 may include any one of, some of, any combination of, or all of multiple parallel processors, a single processor, a system of processors having one or more central processors and/or one or more specialized processors dedicated to specific tasks. In at least one embodiment, processor system 2602 may implement machine instructions stored in a memory system, such as software for analyzing input information and accordingly controlling various peripherals. In at least one embodiment, processor system 2602 may collect and analyze input data from buttons, touch pads, motion sensors, and/or microphone of the controller 100, and translate the input data into control commands.

Transceiver 2604 is a device that includes both a transmitter and a receiver. In at least one embodiment, transceiver 2604 includes at least an antenna. In at least one embodiment, transceiver 2604 receives signals, and transmits signals to external devices. Alternatively or additionally, controller 100 includes a separate transmitter and receiver.

Memory system 2606 may include, for example, any one of, some of, any combination of, or all of a long term storage system, such as a hard drive; a short term storage system, such as random access memory; a removable storage system, such as a floppy drive or a removable drive; and/or flash memory. Memory system 2606 may include cache memory accessible by the processor 2602. Memory system 2606 may include one or more machine-readable mediums that may store a variety of different types of information. The term machine-readable medium is used to refer to any non-transient medium capable carrying information that is readable by a machine. One example of a machine-readable medium is a non-transient computer-readable medium. In at least one embodiment, memory system 2606 may include software for communicating with the computing device 1604, television 2504b, projector 2503, goggles 2402/2508, and/or other electronic devices. The software in the memory system 2606 may include machine instructions for transmitting and processing signals and generating control instructions based on input data. In at least one embodiment, memory system 2606 may store various settings and/or configuration related to various operation modes of the controller 100. For example, memory system 2606 may include configurations for the right hand mode and left hand mode.

Power management 2608 is a system that monitors and/or manages power status and/or consumptions. In at least one embodiment, power management 2608 records and updates the power status for the light 502 to show indications of the power status. In at least one embodiment, power management 2608 manages power supply to different modules of the controller 100 when in different mode of operation. In at least one embodiment, power management 2608 turns off the power or switches the controller 100 to a low-power state (e.g., idle mode, sleep mode, etc.) when the controller 100 is inactive.

Light module 2610 is a module that is configured to control the light 502. In at least one embodiment, the light module 2610 controls the on-and-off of the light 502, the color, and/or the percentage of the light 502 that is illuminated.

Infrared module 2612 is a module that is configured to generate and transmit digitally-coded pulses of infrared radiation to control external devices (e.g., the television 2504b) remotely. In at least one embodiment, the transmitter of the infrared module 2612 may be a light emitting diode (LED) that is built into the head end 109 of the controller 100. In at least one embodiment, in the television mode when the user points the transmitter of the infrared module 2612 toward the television 2504b, the infrared module 2612 sends control commands remotely to the television 2504b to control functions and/or settings such as power, volume, channels, etc. In at least one embodiment, infrared module 2612 may also send wireless signals to other electronic devices and/or computing devices.

Laser module 2614 is a module that is configured to control the laser 602, which was discussed in conjunction with FIG. 6. In an embodiment, laser module 2614 controls and/or activates the laser 602 in the presentation mode.

Network control 2616 is a system that controls the network communication between the controller 100 and various electronic devices and/or computing devices. In at least one embodiment, network control 2616 controls and manages the wireless and/or wired connections between the controller 100 and external devices. In an embodiment, the network control 2616 may include a network interface to communicate with a mobile communication network, local networks, and/or the internet. Alternatively or additionally, controller 100 may include any one of, some of, any combination of, or all of electrical cables, fiber optic cables, and/or means of sending signals through air or water (e.g. wireless communications), for example. Some examples of means of sending signals through air include systems for transmitting electromagnetic waves such as infrared and/or radio waves and/or systems for sending sound waves.

Motion sensors 2618 may include accelerometers and/or gyroscopes to detect movement and/or rotation of the controller 100. In an embodiment, motion sensors 2618 may include single- and/or multi-axis models of accelerometers to detect magnitude and direction of the proper acceleration, and thus to sense orientation of the controller 100. In an embodiment, motion sensors may include a gyroscope that uses Earth's gravity to help determine orientation and measuring rotational movement of the controller 100.

Thumb touch pad 2620, index touch pad 2622, and index touch pad 2624 are the touch pads formed by the touch sensors that are connected on top of the thumb button 105, index button 106, and middle button 107, respectively, which were discussed in conjunction with FIG. 1.

Thumb button 2626, index button 2628, and middle button 2630 may be embodiments of the thumb button 105, index button 106, and middle button 107, respectively, which were discussed in conjunction with FIG. 1.

Audio system 2632 is a system that is configured to receive, analyze, manage, interpret, and/or transmit audio data. In at least one embodiment, the audio system 2632 receives voice data from the microphone 702 of the controller 100 or the microphone of the headset 2302, and then the processor system translates the data into voice commands using speech recognition and natural language understanding algorithms and methods. In at least one embodiment, the audio system 2632 receives audio data from computing device 1604 and transmits the audio data to be played by headset 2302/2502 or speakers. For example, when the user opens up a movie or an audio file on the computer 1604 using the controller 100, the audio system 2632 receives audio data from the computer 1604 and transmits the audio data to the speaker of the television 2504b, or the headset 2302/2502, or the speakers 704a-b of the controller 100, depending on user selection. In at least one embodiment, the audio system 2632 may control the volume and/or channels of audio data.

Microphone 2634 may be an embodiment of the microphone 702, which was discussed in conjunction with FIG. 7A. In at least one embodiment, microphone 2634 receives voice data from the user and transmits the voice data to the audio system 2632 to be interpreted and translated to control commands.

Speaker 2636 may be an embodiment of the speakers 704a-b, which were discussed in conjunction with FIG. 7B. In at least one embodiment, speaker 2636 may play the audio content and/or sound of system alerts and/or notification ringtones.

Video system 2638 is a system that is configured to receive, control, manage, and/or transmit video data. In at least one embodiment, the video system 2638 receives video data from computing device 1604 and transmits the video data to be played by selected display systems. For example, when the user opens up a movie or a video file on the computer 1604 using the controller 100, the video system 2638 receives video data from the computer 1604 and transmits the video data to the display 1602 or the set of goggles 2402 to play the movie or video file.

Method of Using

Figure 27A:
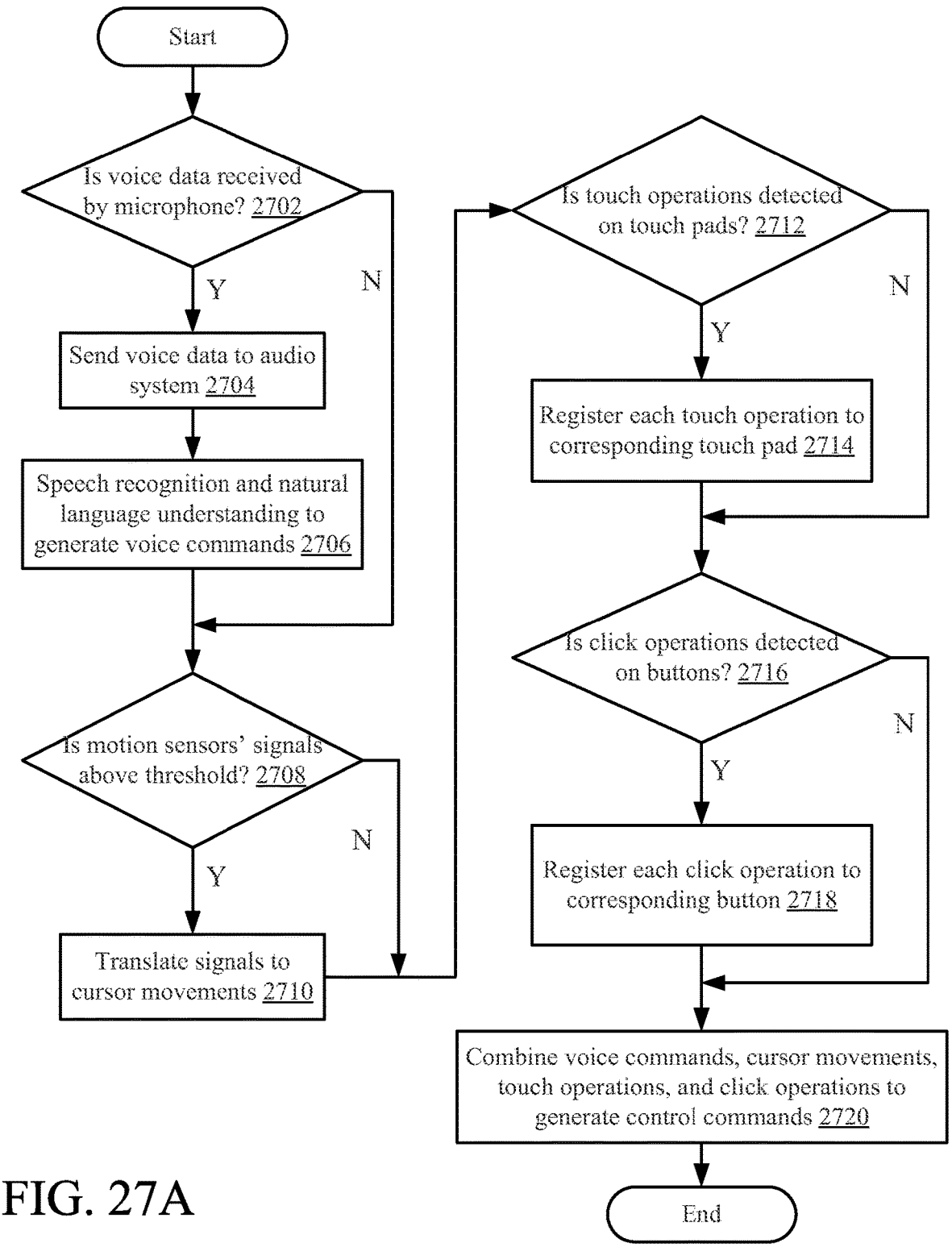
FIG. 27A is a flowchart of an embodiment of a method of using the controller to receive user inputs.

FIG. 27A is a flowchart of an embodiment of a method 2700a of using the controller 100 to receive user inputs.

In step 2702, the controller 100 determines whether voice data is received by the microphone 702. If voice data is received, the method 2700a proceeds to step 2704. If not, the method 2700a proceeds to step 2708.

In step 2704, the microphone 702 sends the received voice data to the audio system 2632.

In step 2706, the audio system 2632 analyzes and interprets the received voice data using speech recognition and interrelation algorithms and methods, and generates voice commands.

In step 2708, the controller 100 determines whether the signals from the motion sensors 2618 are above preset threshold. If the signal is above the threshold, the method 2700a proceeds to step 2710. If the signal is below the threshold, the method 2700a proceeds to step 2712.

In step 2710, if the signals detected by the motion sensors 2618 are above the threshold, the processor system 2602 analyzes the signals and translates into parameters related to the orientation and/or rotation of the movement. As part of step 2710, the processor system 2602 translates the signals to cursor movements.

In step 2712, the thumb touch pad 2620, index touch pad 2622, and middle touch pad 2624 determine whether touch operations are detected. If touch operations are received, the method 2700a proceeds to step 2714. If not, the method 2700a proceeds to step 2716.

In step 2714, the processor system 2602 registers each touch operation signal to the corresponding touch pad. In an embodiment, a single gesture (e.g., a single tap) is recorded on one touch pad. In another embodiment, two tap operations are recorded consecutively on the same touch pad (e.g., double tap on the thumb touch pad 2620). In yet another embodiment, two gestures are detected on two different touch pads simultaneously (e.g., in a zoom-in operation).

In step 2716, the thumb button 2626, index button 2628, and middle button 2630 determine whether click operations are received. If click operations are received, the method 2700a proceeds to step 2718. If not, the method 2700a proceeds to step 2720.

In step 2718, if click operations are received, the processor system 2602 registers each click operation signal to the corresponding button. In an embodiment, a single click on one button is interpreted as a command. In another embodiment, a prolonged signal indicating that a button is pressed down for a period of time is interpreted as another command. In another embodiment, two consecutive clicks on the same button are interpreted as another command (e.g., double click on the index button 2628). In an embodiment, commands on different buttons are received simultaneously. In at least one embodiment, the steps 2712 and 2716 take place simultaneously, and touch operations and click operations may be detected simultaneously. For example, the index button 2628 is held down, and meanwhile thumb is swiped or writing letter "C" on the thumb touch pad 2620.

In step 2720, the processor system 2602 combines the recorded voice commands, cursor movements, touch operations, and/or click operations to generate control commands. In at least one embodiment, according to the operation mode of the controller 100, the processor system 2602 translates the input signals to control commands (while in one mode a particular signal may be interpreted as one command, and while in another mode the same signal is interpreted as another command).

In an embodiment, each of the steps of method 2700a is a distinct step. In another embodiment, although depicted as distinct steps in FIG. 27A, step 2702-2720 may not be distinct steps. In other embodiments, method 2700a may not have all of the above steps and/or may have other steps in addition to or instead of those listed above. The steps of method 2700a may be performed in another order.

Figure 27B:
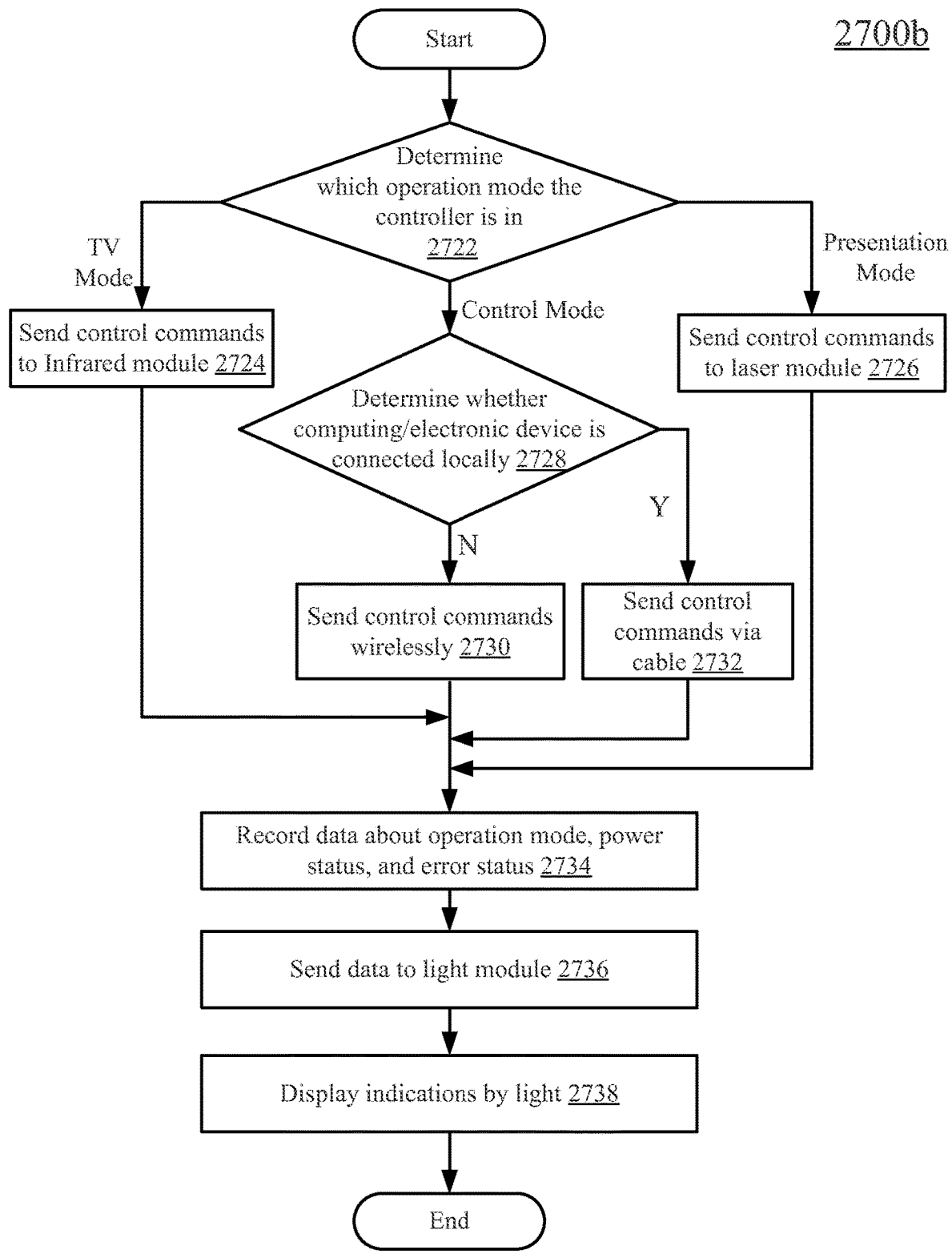
FIG. 27B is a flowchart of an embodiment of a method of using the controller in various modes.

FIG. 27B is a flowchart of an embodiment of a method 2700b of using the controller 100 in various modes.

In step 2722, the processor system 2602 determines and/or records which operation mode the controller 100 is in. In an embodiment, step 2722 and the step 2720 of FIG. 27A may be merged into one step.

In step 2724, if the controller 100 is determined to be in the TV mode, the processor system 2602 sends the control commands to the infrared module 2612. As part of the step 2724, the infrared module 2612 sends wireless signals to control the television 2504b.

In step 2726, if the controller 100 is determined to be in the presentation mode, the processor system 2602 sends the control commands to the laser module 2614 as well as sending control commands to the computing device 1604 to display images or presentation slides on a selected display device. As part of the step 2726, the laser module 2614 activates the laser 602 based on the user commands.

In step 2728, if the controller 100 is determined to be in the control mode, the processor system 2602 further determines whether the controller 100 is connected locally to the computing device 1604 or other devices. If no data cable is detected as connecting the controller 100 to the computing device 1604 or other devices, the method 2700b proceeds to step 2730. If a data cable is detected that connects the controller 100 to the computing device 1604 or other devices, the method 2700b proceeds to step 2732. As part of step 2728, wireless connection is established whether a data cable is detected.

In step 2730, the transceiver 2604 transmits the control commands wirelessly to the computing device 1604 or other devices (e.g., the set of goggles 2402, headset 2302, for example).

In step 2732, the controller 100 transmits the control commands to the computing device 1604 or other devices via cables. In at least one embodiment, the controller 100 may communicate with one device wirelessly and with another device via a cable, and thereby steps 2730 and 2732 may take place simultaneously. For example, the controller 100 may control the computing device 1604 to display the user interface on the display 1602 and/or the set of goggles 2402, and meanwhile the controller 100 may transmit audio data to the headset 2302/2403 via a cable.

In step 2734, the controller 100 records data about controller mode, power status, and error status.

In step 2736, the controller 100 sends the data about controller mode, power status, and error status to the light module 2610. As part of step 2736, the light module 2610 or the processor system 2602 analyzes the data received and generates control instructions based on the data received. As part of step 2736, the light module 2610 or the processor system 2602 sends the control instructions to the light 502.

In step 2738, the light 502 receives the control instructions and displays light indications to indicate the controller mode, power status, and error status to the user.

In an embodiment, each of the steps of method 2700b is a distinct step. In another embodiment, although depicted as distinct steps in FIG. 27B, step 2722-2738 may not be distinct steps. In other embodiments, method 2700b may not have all of the above steps and/or may have other steps in addition to or instead of those listed above. The steps of method 2700b may be performed in another order.

Figure 27C:
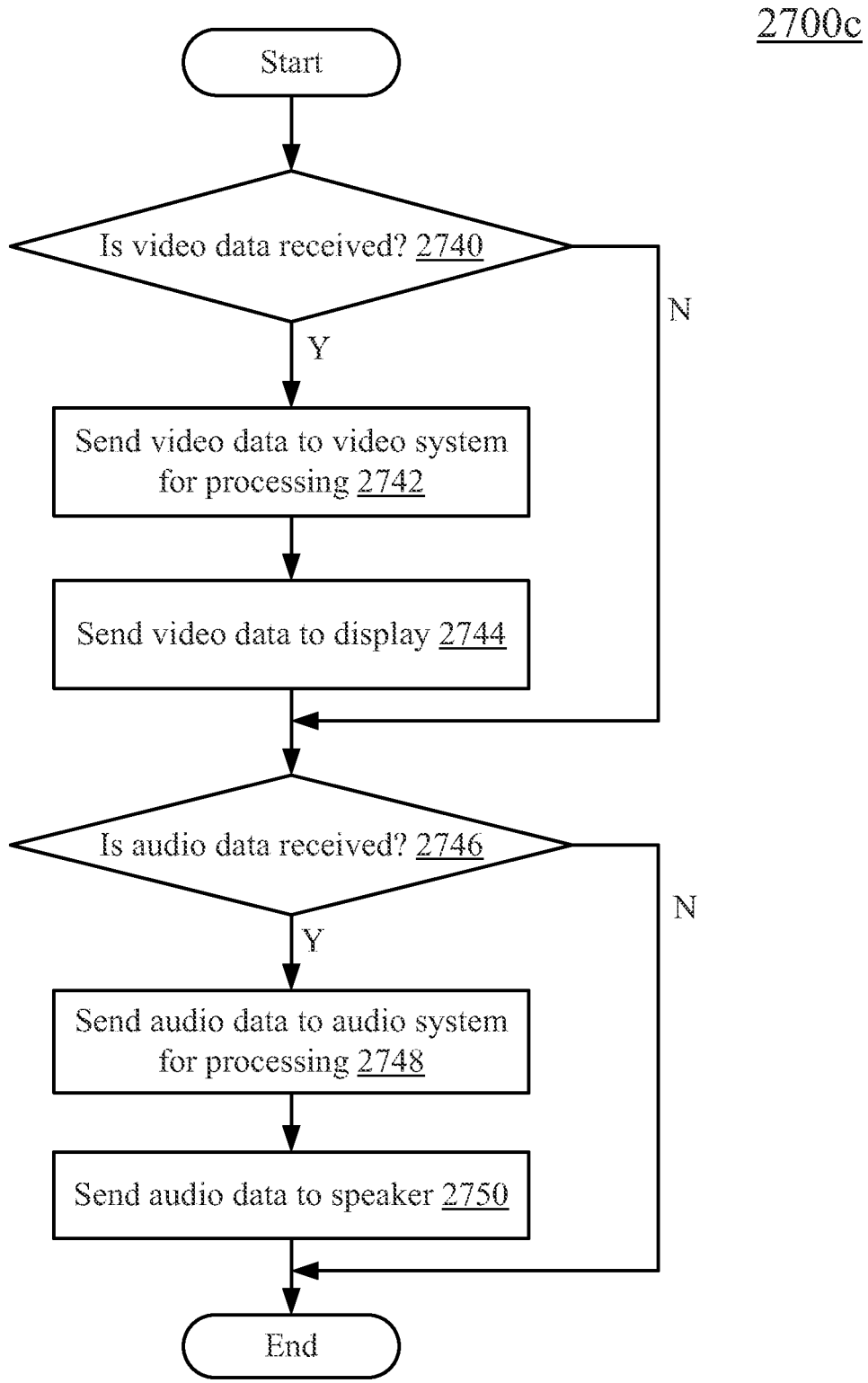
FIG. 27C is a flowchart of an embodiment of a method of using the controller to display video and/or audio data.

FIG. 27C is a flowchart of an embodiment of a method 2700c of using the controller 100 to display video and/or play audio data.

In step 2740, the controller 100 determines if video data is received. If video data is received, the method 2700c proceeds to step 2742. If not, the method 2700c proceeds to step 2746.

In step 2742, the controller 100 sends the video data to the video system 2638 for processing. As part of step 2724, the video system 2638 converts the video data to a compatible format that may be played by a display system that is selected by the user (e.g., the display 1602, the set of goggles 2402, the display 1605 of the computing device 1604, the projector 2503).

In step 2744, the controller 100 sends the video data to the display that is selected by the user.

In step 2746, the controller 100 determines if audio data is received. If audio data is received, the method 2700c proceeds to step 2748. If not, the method 2700c ends.

In step 2748, the controller 100 sends the audio data to the audio system 2632 for processing. As part of step 2728, the audio system 2632 processes and/or converts the audio data to a compatible format that may be played by speakers that are selected by the user (e.g., the speakers 704a-b of the controller 100, the speakers of the television 1603, the speakers of the headset 2302, the speakers that are connected to the computing device 1604).

In step 2750, the controller 100 sends the audio data to the speakers that are selected by the user.

In an embodiment, each of the steps of method 2700c is a distinct step. In another embodiment, although depicted as distinct steps in FIG. 27C, step 2740-2750 may not be distinct steps. In other embodiments, method 2700c may not have all of the above steps and/or may have other steps in addition to or instead of those listed above. The steps of method 2700c may be performed in another order.

In at least one embodiment, the controller 100 may control the display and/or speakers to play multimedia content using the method 2700c, while input user commands using the method 2700a during the playing (e.g., control the volume, pause, play back, fast forward, etc.). The input user commands may be sent out in various modes as depicted in method 2700b.

Method of Assembling

Figure 28:
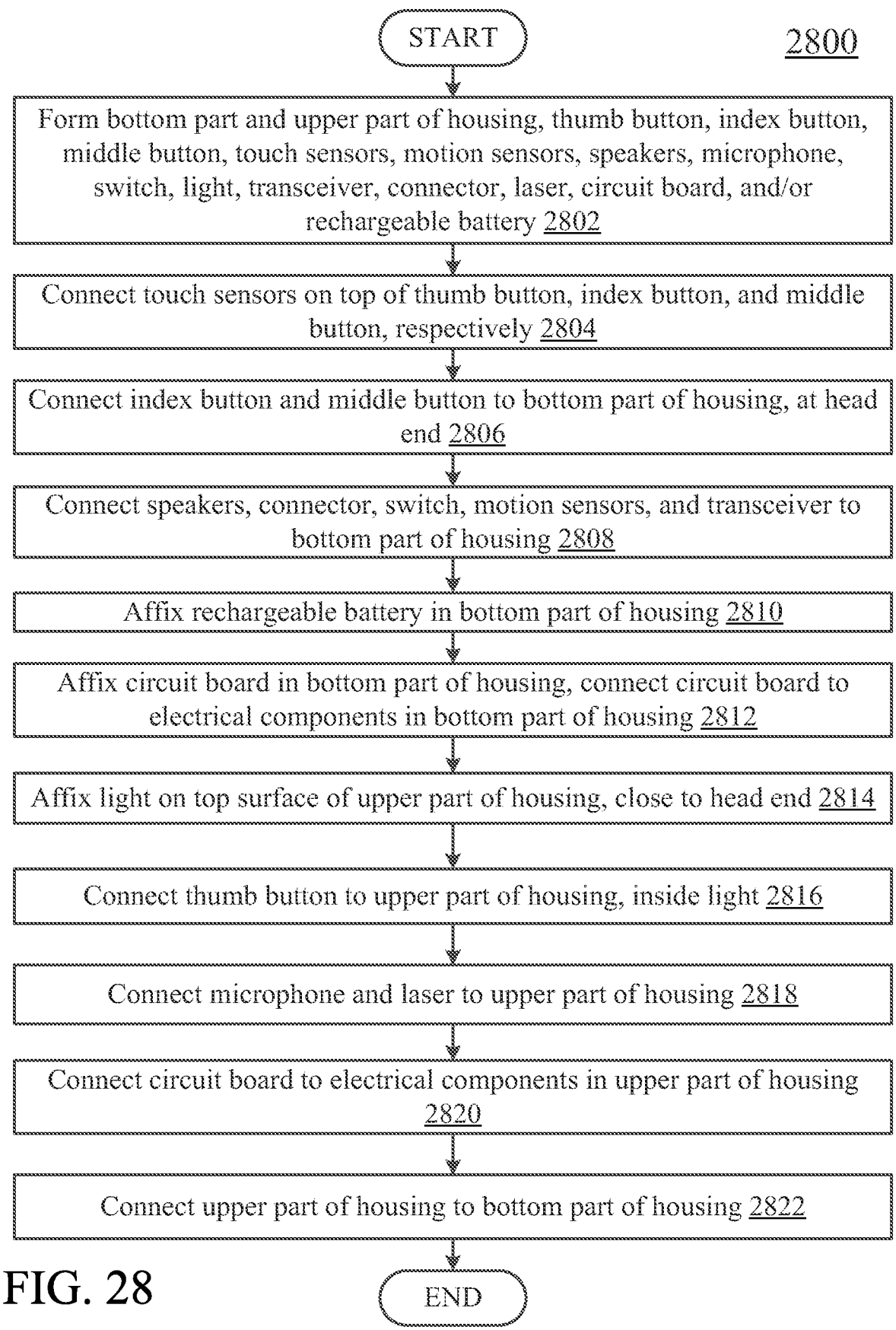
FIG. 28 is a flowchart of an embodiment of a method of assembling the controller.

FIG. 28 is a flowchart of an embodiment of a method 2800 of assembling the controller 100.

In step 2802, the bottom part and upper part of housing 101, thumb button 105, index button 106, middle button 107, circuit board, motion sensors 2618, speakers 704a-b, microphone 702, light 502, switch 404, transceiver 2604, connector 706, laser 602, and/or a battery holder are formed. In an embodiment, the housing 101 may include a bottom part that is covered by an upper part. The upper part may include at least the upper surface 102 and front slope 103. The bottom part includes the rest of housing 101. The upper part fits on the bottom part similar to the way a cover fits on a container.

In step 2804, touch sensors are connected to the top of thumb button 105, index button 106, and middle button 107 to form thumb touch pad 2620, index touch pad 2622, and index touch pad 2624, respectively.

In step 2806, the index button 106 and middle button 107 are connected to the bottom part of housing 101, at the head end 109. As part of step 2806, the index button 106 and middle button 107 are connected to two button switches, respectively.

In step 2808, the speakers 704a-b and connector 706 are connected to the bottom part of the housing 101, at the tail end 108. As part of the step 2808, the switch 404 is connected to the bottom part of the housing 101. As part of the step 2808, the motion sensors 2618 and transceiver 2604 are affixed in the bottom part of housing 101.

In step 2810, a built-in rechargeable battery is affixed in the bottom part of housing 101. Optionally, as an alternative, a battery holder may be connected in the bottom part of housing 101. In an embodiment, the battery holder in the housing 101 may include leads from the battery to a power supply/adapter system that formals (e.g., converts the voltage, current, and/or frequency of) the electricity to one that is appropriate for the rest of the system of the controller 100. Optionally in step 2810, a battery (batteries) is (are) placed inside the battery holder for providing electricity to the controller 100. Alternatively, batteries may not be installed during manufacture and/or for sale, and a user may insert the batteries before start using the controller 100.

In step 2812, the circuit board is affixed inside the bottom part of the housing 101. As part of the step 2812, the circuit board is connected via wires with the button switches and touch sensors that are connected to the index button 106 and middle button 107, respectively, the switch 404, the built-in battery, the motion sensor 2618, the transceiver 2604, the speakers 704a-b, and connector 706.

In step 2814, the light 502 is affixed on the top surface 102 of the upper part of the housing 101, close to the head end 109.

In step 2816, the thumb button 105 is connected to the upper part of the housing 101, inside the light 502. Alternatively, the buttons may be connected to the housing 101 first, and then the touch sensors may be attached to the top of the buttons. As part of step 2816, the thumb button 105 is connected to a button switch. Or alternatively, the button switch for the thumb button 105 may be connected in the bottom part of the housing 101.

In step 2818, the microphone 702 is connected to the upper part of the housing 101, close to the tail end 108. As part of step 2818, the laser 602 is connected to the front slope 103 on the upper part of the housing 101.

In step 2820, the circuit board is connected via wires to the light 502, touch sensors and button switch of the thumb button 105, microphone 702, and laser 602.

In step 2822, the upper part of the housing 101 is connected to the bottom part of the housing 101. Optionally as part of step 2822, the upper part is glued to the bottom part of the housing 101 to permanently connect the two parts of the housing 101 together.

In an embodiment, each of the steps of method 2800 is a distinct step. In another embodiment, although depicted as distinct steps in FIG. 28, step 2802-2822 may not be distinct steps. In other embodiments, method 2800 may not have all of the above steps and/or may have other steps in addition to or instead of those listed above. The steps of method 2800 may be performed in another order.

Figure 29:
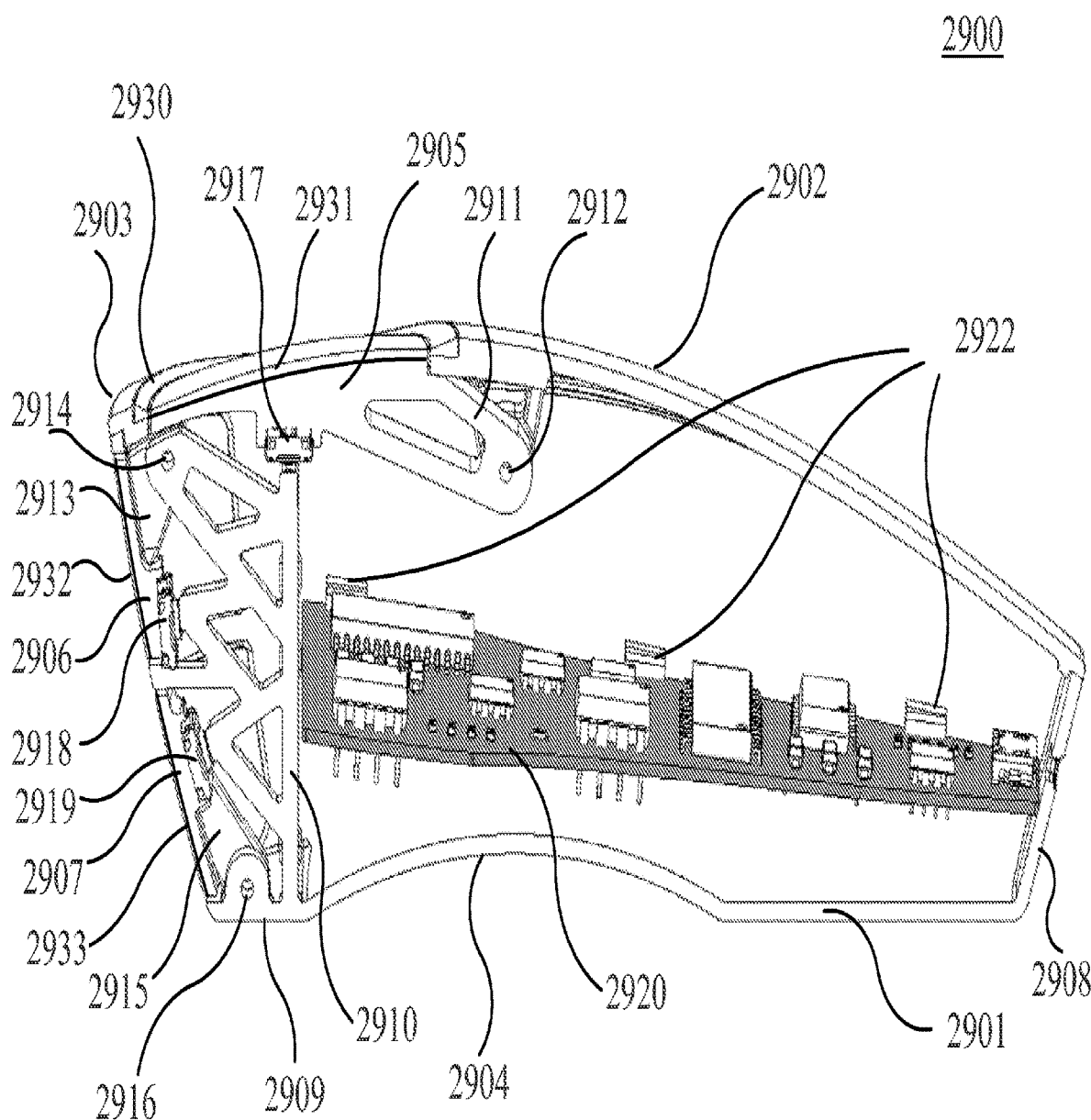
FIG. 29 shows a cross-sectional side view of an embodiment of the controller.

FIG. 29 shows a cross-sectional side view 2900 of an embodiment of the controller 100 of FIG. 1. The device in the view 2900 includes at least a housing 2901, a top surface 2902, a front slope 2903, a concave area 2904, a thumb button 2905, an index button 2906, a middle button 2907, a tail end 2908, a head end 2909, a rack 2910, a thumb button bar 2911, a pivot 2912, an index button bar 2913, a pivot 2914, a middle button bar 2915, a pivot 2916, button switches 2917, 2918, and 2919, a circuit 2920, supporting structures 2922, a light 2930, a thumb touch pad 2931, an index touch pad 2932, and a middle touch pad 2933. In other embodiments, the device in view 2900 may not have all of the elements or features listed and/or may have other elements or features instead of or in addition to those listed.

FIG. 29 shows a cross-sectional side view 2900 of an embodiment of the controller 100, demonstrating internal mechanical and electrical components.

The housing 2901, top surface 2902, front slope 2903, concave area 2904, thumb button 2905, index button 2906, middle button 2907, tail end 2908, and head end 2909 are embodiments of the housing 101, top surface 102, front slope 103, concave area 104, thumb button 105, index button 106, middle button 107, tail end 108, and head end 109, which were discussed in conjunction with FIG. 1. The light 2930 is an embodiment of the light 502, which was discussed in conjunction with FIG. 5. In at least one embodiment, touch sensors are connected on the thumb button 2905, index button 2906, middle button 2907 to form touch pads for detecting finger movements and/or gestures, respectively, in manners that were discussed throughout the specification.

Rack 2910 is a structure that is fixed inside the housing 2901, close to the head end 2909. In at least one embodiment, the rack 2910 is perpendicular to the top surface 2902. In at least one embodiment, the rack 2910 is affixed to the inner surface of the housing 2901 at the bottom of the head end 2909. Alternatively or additionally, the rack 2910 is connected to a portion of the housing 2901 in between the index button 2906 and middle button 2907, and/or to the front slope 2903 from inside the housing 2901. In at least one embodiment, the rack 2910 supports button switches of the thumb button 2905, index button 2906, and/or middle button 2907. In other embodiments, the rack 2910 may include other shapes and/or structures.

Thumb button bar 2911 is connected on one end to a bottom side of the thumb button 2905, and the other end is pivotally connected to the inner side of the top surface 2902. In an embodiment, when the thumb button 2905 is pressed (and released), the thumb button 2905 and thumb button bar 2911 pivot to activate (and deactivate) a button switch, which may make or break a circuit, thereby indicating when thumb button 2905 was depressed.

Pivot 2912 is a pivot that holds the thumb button bar 2911 and a protrusion on the inner surface of the housing 2901 together. Pivot 2912 allows the thumb button bar 2911 to rotate about the pivot 2912 while one end is attached to the housing 2901. In at least one embodiment, the pivot 2912 is spring loaded to bias the thumb button 2905 to stay in an unpressed position until the user clicks the thumb button 2905.

Index button bar 2913 is connected on one end to an inner side of the index button 2906, and the other end is pivotally connected to a portion of the rack 2910 close to the front slope 2903. Alternatively, the index button bar 2910 is pivotally connected to a protrusion inside the housing 2901 close to the front slope 2903. In an embodiment, when the index button 2906 is pressed (and released), the index button 2906 and index button bar 2913 pivot to activate (and deactivate) a button switch, which may make or break a circuit, thereby indicating when index button 2906 was depressed Pivot 2914 is a pivot that holds the index button bar 2913 and the rack 2910 together. Pivot 2914 allows the index button bar 2913 to rotate about the pivot 2914 while one end is attached to the rack 2910. In at least one embodiment, the pivot 2914 is spring loaded to bias the index button 2906 to stay in an unpressed position until the user clicks the index button 2906.

Middle button bar 2915 is connected on one end to an inner side of the middle button 2907, and the other end is pivotally connected to a protrusion inside the housing 2901 at the bottom of the head 2909. Alternatively, the middle button bar 2915 may be pivotally connected to the rack 2910. In an embodiment, when the middle button 2907 is pressed (and released), the middle button 2907 and middle button bar 2915 pivot to activate (and deactivate) a button switch, which may make or break a circuit that indicates when middle button 2907 was depressed.

Pivot 2916 is a pivot that holds the middle button bar 2915 and the protrusion of the housing 2901 together. Pivot 2916 allows the middle button bar 2915 to rotate about the pivot 2916 while one end is attached to the housing 2901. In at least one embodiment, the pivot 2916 is spring loaded to bias the middle button 2907 to stay in an unpressed position until the user clicks the middle button 2907.

Button switches 2917, 2918, and 2919 are electric switches or sensing devices that detect click operations on the thumb button 2905, index button 2906, and middle button 2907, respectively. In at least one embodiment, the button switches 2917, 2918, and 2919 are micro-switches. In an embodiment, the button switch 2917 is connected to the bottom side of the thumb button 2905, and is activated when the thumb button 2905 is clicked or held down. In an embodiment, the button switch 2918 and 2919 are connected to the inner side of the index button 2906 and middle button 2907, respectively, and are activated when the index button 2906 and middle button 2907 are clicked or held down, respectively.

Circuit 2920 includes a circuit board that mechanically supports and electrically connects electronic components of the circuit 2920. Circuit 2902 may include the circuitry shown in block diagram 2600 (FIG. 26). In an embodiment, the circuit board of circuit 2920 may be single sided (one layer), or double sided (two layers), or multi-layer (outer and inner layers). In at least one embodiment, the circuit 2920 receives and process signals corresponding to the finger operations, voice commands, and/or motion of the controller 100 to communicate with and control the computing device 1604 and/or other devices. In at least one embodiment, the circuit board may be attached to the rack 2910 and/or other supporting structures inside the housing 2901. In at least one embodiment, more than one circuit board may be affixed in the housing 101 of the controller 100.

Supporting structures 2922 are structures that hold and support the circuit 2920 inside the housing 2901. In at least one embodiment, the supporting structures 2922 include a plurality of bars and/or tabs that are fixed to the inner surface of the housing 2901 and the circuit 2920 are attached to the supporting structures 2922.

Thumb touch pad 2931, index touch pad 2932, and middle touch pad 2933 are embodiments of the thumb touch pad, index touch pad, and middle touch pad that were attached on top of the thumb button 105, index button 106 and middle button 107, respectfully, which were discussed in conjunction with FIG. 1.

In an embodiment, the index button 106 and middle button 107 may be merged into one button, which is connected with touch sensors. The merged single button may be manipulated by both the index and middle fingers, or may be controlled using the index finger only. In an embodiment, the shape and/or size of the controller may be different from that of the controller 100 depicted in FIGS. 1-7, where the controller can be held in human hands in a comfortable posture so as to reduce the muscle stress of the user when operating the controller. The position of each button may also be different from that of the controller 100, where the dedicated finger for each button can rest and move comfortably on the button during the operation of the controller.

Alternatives and Extensions

In an embodiment, home computing experience is segmented when the user needs to work on different computing/electronic devices that may be located in different places in a house. For example, a personal computer may be set up on a desk in the study room, a flat screen TV may be set up as the entertainment center in the living room, laptop computers or tablets may be found in various places such as bedroom or dining room, while a smart phone may be carried by the user wherever he goes. Therefore, it may be desired in at least some circumstances for the user to communicate to a computing device with a single control device that incorporates navigating, text inputting, audio communication capabilities, display mirroring. It may also be desired in at least some circumstances for the user to control various computing/electronic devices using a single control device. Therefore, instead of interacting with different devices via different interfaces, the user can use the controller 100 as a single human-machine interface to interact with multiple computing/electronic devices. For example, the user may sit comfortably in a couch in the living room to use the controller 100 to control the operations on the personal computer and view the user interface on the screen of the TV or using a projector, or watch movies or play video games using a virtual reality goggle and a headset. In addition, instead of extending the arm to operate the traditional electrical mouse on a surface, the user may hold the controller 100 and relax his arm and wrist in a natural posture, while use his fingers to click and/or make gestures on the buttons and/or touch pads of the controller 100. The user may also move the controller 100 in the air for further control of the cursor movement and/or handwriting recognition. Furthermore, the controller 100 may detect voice commands from the user. The controller 100 allows the user to control various devices and/or operations in different modes (e.g., to control the TV in the television mode, to control the laser in the presentation mode, to control a soft key board and text editing during the text input mode, etc.)

It should be understood that on the computing device 1604, at least a type of software (e.g., driver) may be used to assist the controller 100 to achieve all user intended operations. For example, when the controller 100 sends control commands to the computing device 1604, the driver will translate the control commands into corresponding operations, such as moving the cursor, activating the soft keyboard, opening an application, playing video and audio streams, etc.

Figure 30:
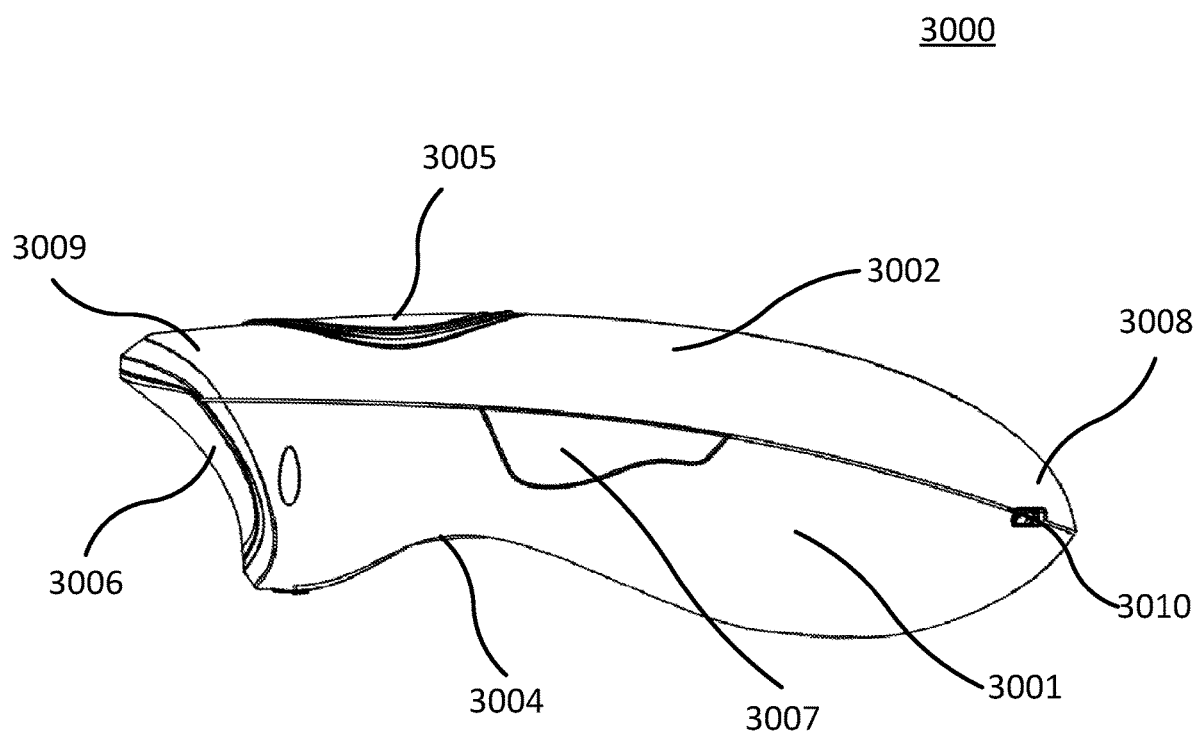
FIG. 30 shows a left side view of another embodiment of a controller.

FIG. 30 shows a view 3000 of an embodiment of the controller having two touch buttons and a button. Controller 3000 shows at least a housing 3001, a top surface 3002, a concave area 3004, a top touch button 3005, a front touch button 3006, a side button 3007, a tail end 3008, a head end 3009, and a connector 3010. In other embodiments, the controller 3000 may not have all of the elements or features listed and/or may have other elements or features instead of or in addition to those listed.

FIG. 30 shows a left side view of a controller 3000 that includes one touch button on the top, one touch button on the front, both connected to touch sensors. A third button on the side does not have a touch pad.

Top button 3005 is a button that is located on the top surface 3002, close to the head end 3009 of the controller 3000. In at least one embodiment, when the user holds the controller 3000 with his right hand, the thumb of the right hand rests on the top touch button 3005 in a natural posture, and may click and/or move on the thumb button 3005. In at least one embodiment, high resolution touch sensors are connected to the top of the top button 3006, and thus serve as a top touch pad. Moving thumb on the top touch pad may be interpreted in similar manners as moving thumb on the thumb touch pad of the controller 100 as illustrated in FIG. 1. Click operations on the top button may be interpreted in similar manners as click operations on the thumb button of the controller 100 as illustrated in FIG. 1. Throughout this specification the "thumb touch button," "thumb button," "top touch button," "top button," "main button," and "function button" may be substituted one for the other to obtain different embodiments.

Front button 3006 is a single button that is located on the head end 3009 of the controller 3000, on which the index finger rests in a natural posture when the controller 3000 is held in the right hand of a user. In at least one embodiment, high resolution touch sensors are connected to the top of the front button 3006, and thus serve as a front touch pad. Scrolling or swiping on the front touch pad with the index finger may be interpreted in similar manners as scrolling or swiping on the index touch pad of the controller 100 as illustrated in FIG. 1. Click operations on the front button may be interpreted in similar manners as click operations on the index button of the controller 100 as illustrated in FIG. 1. In at least one embodiment, the front button 3006 may include the functionalities of a "left button" of a traditional electronic mouse, besides of many other functions. Throughout this specification the "index-finger touch button," "index-finger button," "index button," "front touch button," "front button," and "left button" may be substituted one for the other to obtain different embodiments.

Side button 3007 is a button that is located on the left side of the controller 3000. When the controller 3000 is held in the right hand of a user, the middle finger wraps around the concave area 3004 in the bottom of the controller, and a tip of the middle finger rests on the side button naturally. In at least one embodiment, the side button 3007 is connected to a button switch and/or other sensors for detecting click operations when the middle finger clicks or presses down on the side button 3007. Click operations on the side button may be interpreted in similar manners as click operations on the middle button of the controller 100 as illustrated in FIG. 1. In an embodiment, the side button 3007 may look similar to a shape of any button as illustrated in FIG. 1. In other embodiments, the side button 3007 may have other shapes and/or sizes. In at least one embodiment, the side button 3007 may include the functionalities of a "right button" of a traditional electronic mouse, besides of many other functions. Throughout this specification, the "middle-finger button," "middle button," "side button," and "right button" may be substituted one for the other to obtain different embodiments.

Tail end 3008 is the end of the controller 3000 that is closest to the wrist when the controller 3000 is held in the hand of the user.

Head end 3009 is the end of the controller 3000 that is wrapped by the index finger when the controller 3000 is held in the hand of the user.

Connector 3310 is an electro-mechanical device for connecting the controller 3000 to other devices. In at least one embodiment, the connector 3310 is both a charging port and a data connector. The functions and usages of the connector 3310 is similar to the connector or other components as illustrated in FIG. 7b.

As shown in FIG. 30, the configuration of the device in this particular embodiment is not symmetric. It can be operated comfortably only by a right hand. For a left hand to comfortably operate such a device, a mirror symmetric version of the controller 3000 of FIG. 1 can be used.

Figure 31:
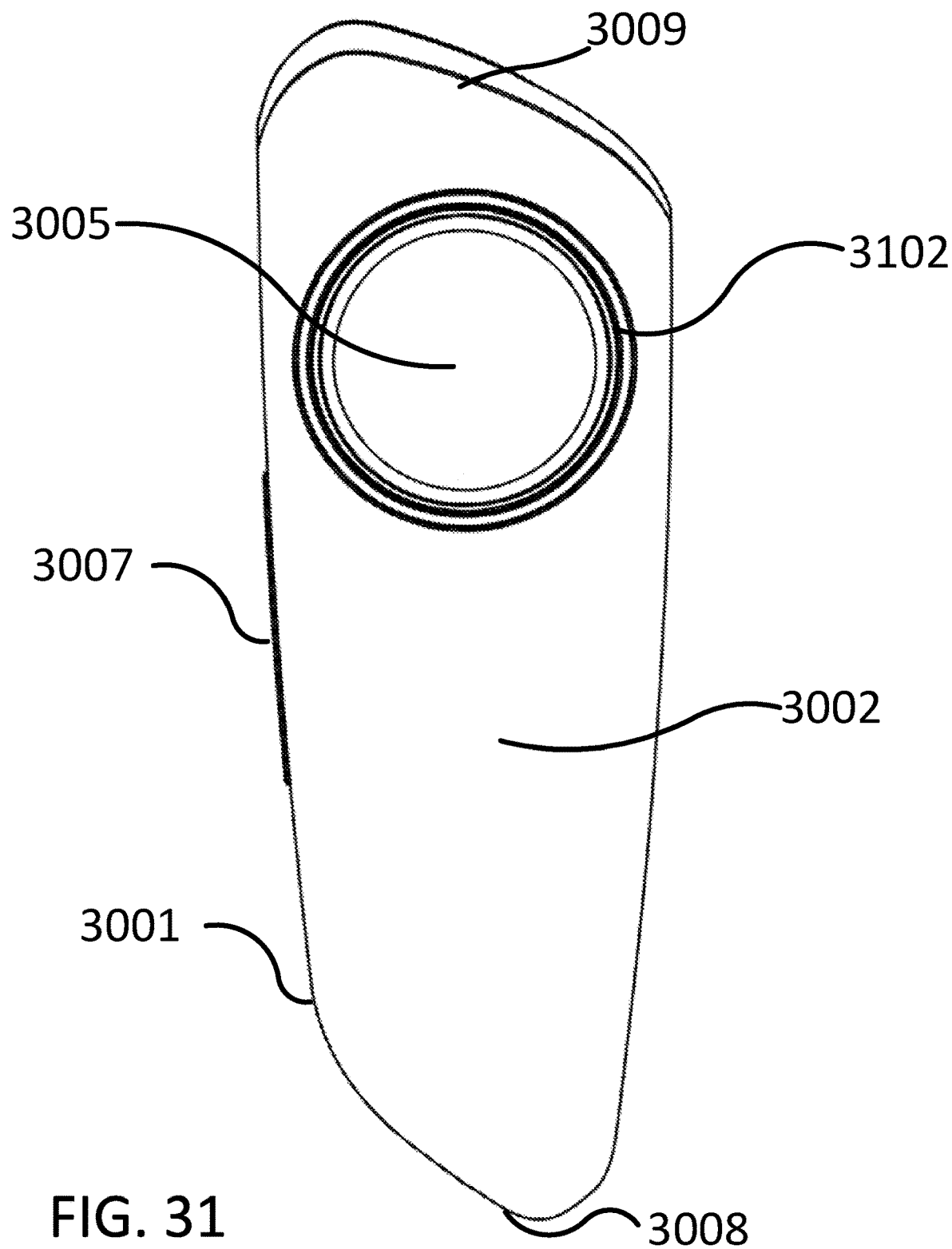
FIG. 31 shows a top view of an embodiment of the controller of FIG. 30.

FIG. 31 shows a top view 3100 of an embodiment of the controller 3000 of FIG. 30. The view 3100 shows at least housing 3001, top surface 3002, top button 3005, side button 3007, tail end 3008, and head end 3009. View 3100 further shows a light 3102. In other embodiments, the device in view 3100 may not have all of the elements or features listed and/or may have other elements or features instead of or in addition to those listed.

FIG. 31 shows a top view 3100 when the user looks at the top surface 3002 of the controller 3000. The directions (e.g., up, down, left, right) with respect to the thumb touch pad can be the same as illustrated in FIG. 2.

Head end 3009 is the end of the controller 3000 which may be wrapped by the index finger when the controller 3000 is held in the hand of a user. The front button 3006, which is not shown in FIG. 31, is located on the front side of the head end 3009. In an embodiment, the head end 3009 can have a similar curve and/or shape as the head end 109 of the controller 200 as illustrated in FIG. 2. In other embodiments, the head 3009 may have other shapes and/or sizes. In at least one embodiment, the head end 3009 may look like the shape of the head end as illustrated in FIG. 2, where the right portion of the head end is a slope from a top view angle. This slope shape can be due to the edge of the front end. The actual front button, which is under the front edge, can assume a flatter surface or a curvy surface, for the purposes of esthetics or ease of use. This is partly illustrated in FIG. 30 from the left side view.

Light 3102 is a light that is installed on the top surface 3002 for indication purposes. In at least one embodiment, the light 3102 has a ring shape that outlines the edge of the thumb button 3005. The functions and usages of the light 3102 can similar to the light as illustrated in FIG. 5.

Figure 32:
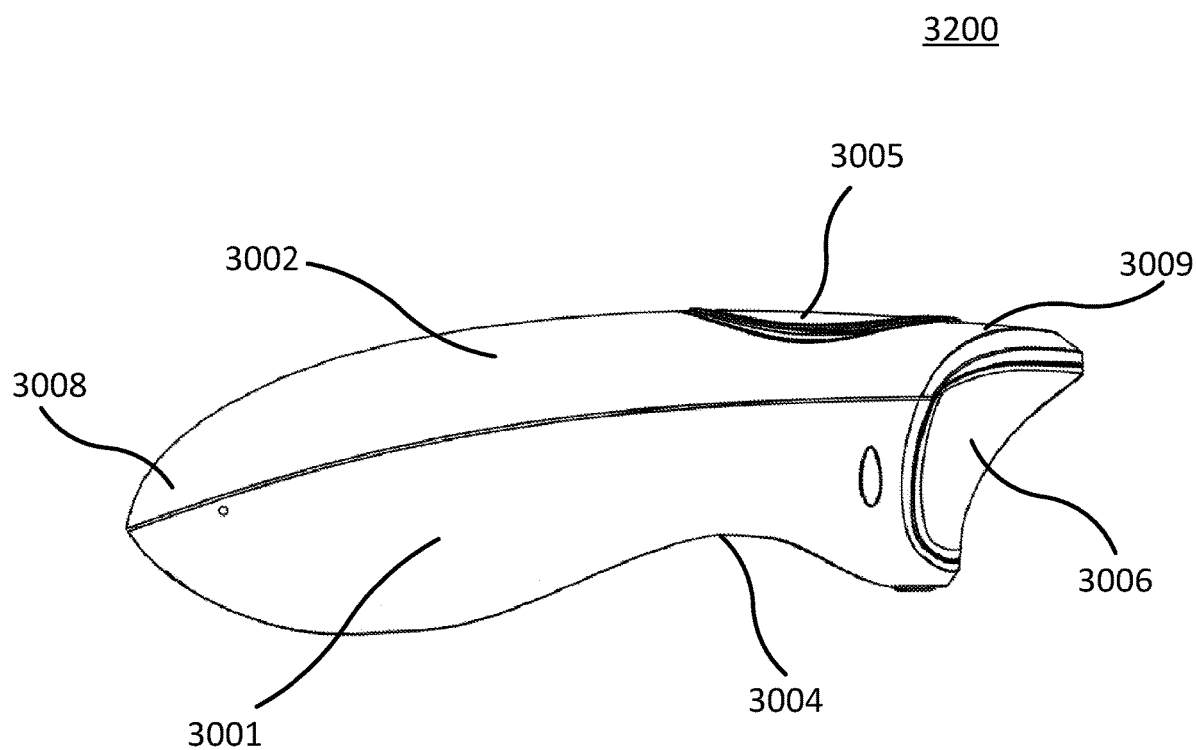
FIG. 32 shows a right side view of an embodiment of the controller of FIG. 309.

FIG. 32 shows a right view 3200 of an embodiment of the controller. The right view 3200 of the controller 3000 shows at least a housing 3001, a top surface 3002, a concave area 3004, a top touch button 3005, a front touch button 3006, a tail end 3008, and a head end 3009. In other embodiments, the controller 3000 may not have all of the elements or features listed and/or may have other elements or features instead of or in addition to those listed.

Figure 33:
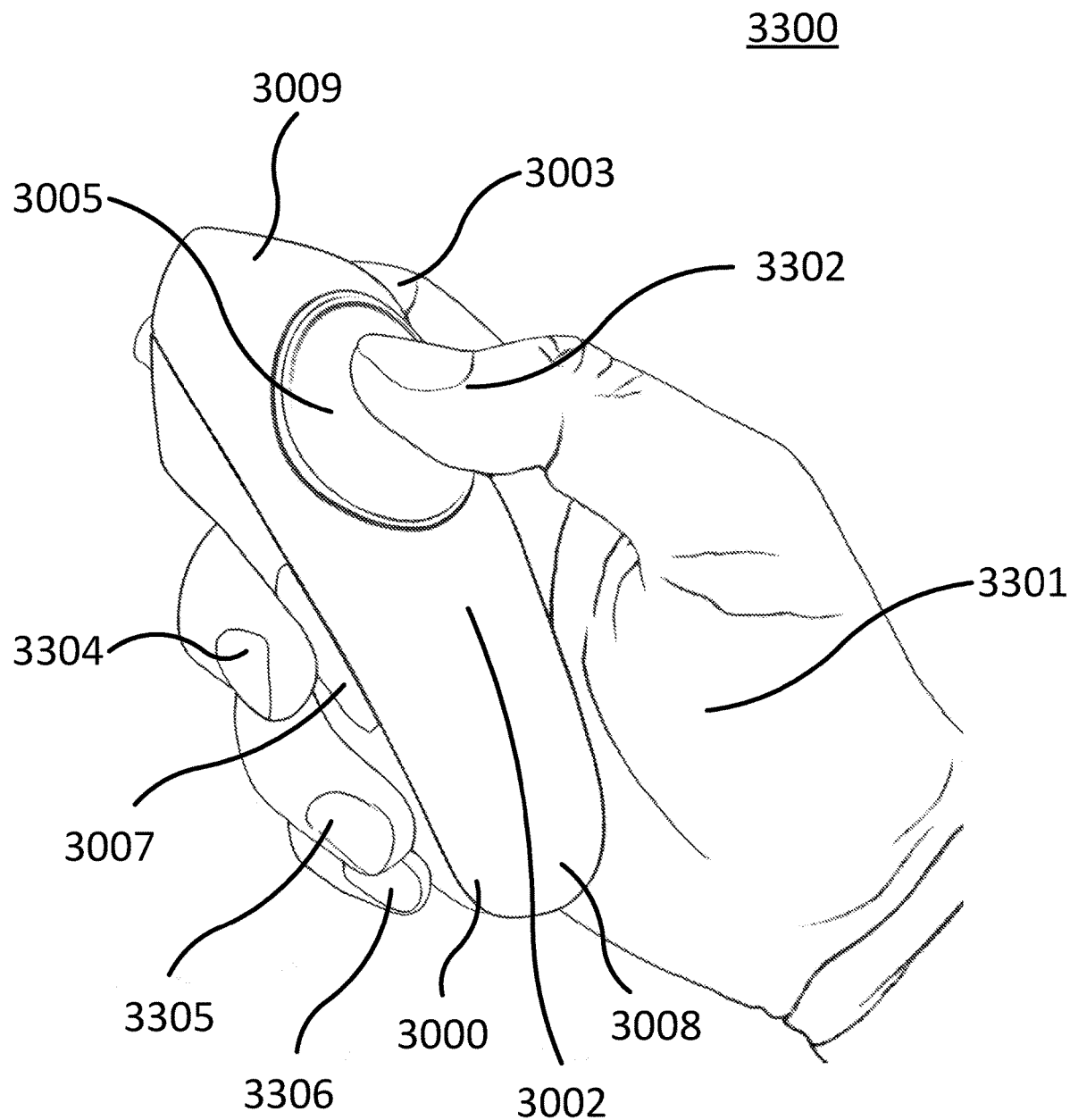
FIG. 33 shows a view of an embodiment of the controller of FIG. 30 held in a right hand.

FIG. 33 shows a view 3300 of an embodiment of the controller 3000 held in a right hand. View 3300 shows at least controller 3000, top surface 3002, front slope 3003, top button 3005, side button 3007, tail end 3008, and head end 3009. Front button 3006 is not visible from this view angle. View 3300 further shows a right hand 3301 that includes thumb 3302, index finger 3303, middle finger 3304, ring finger 3305, and little finger 3306. In other embodiments, the view 3300 may not have all of the elements or features listed and/or may have other elements or features instead of or in addition to those listed.

FIG. 33 shows a view 3300 of the controller 3000 that is held in the right hand of a user, with the thumb resting on the top button 3005, the index finger in contact with the front button 3006. The middle finger rests on the side button 3007. The middle finger, the ring finger and little finger wrap underneath the concave area 3004 to support the controller 3000.

Thumb 3302 is in contact with the top button 3005, while index finger 3303 and middle finger 3304 are in contact with the front button 3006 and side button 3007, respectively, in a natural posture when the right hand 3301 is holding the controller 3000. The directions of movements of the thumb 3302 with respect to the top button 3005 can be the same as or similar to the top button as illustrated in FIG. 2. The directions of movements of the index finger 3303 on the front touch pad, are defined as follows. A left movement is defined as the movement of the index finger 3303 along the front touch pad from the right side of the controller 3000 toward the left side as shown in FIG. 33. A right movement is defined as the movement of the index finger 3303 along the front touch pad from the left side of the controller 3000 toward the right side as shown in FIG. 33. An up movement is defined as the movement of the index finger 3303 across the front touch pad, toward the top surface 3002. A down movement is defined as the movement of the index finger 3303 across the front touch pad toward the bottom surface.

Middle finger, ring finger 3305 and little finger 3306 wrap underneath the concave area 3004 for support.

Touch operations on front touch pad can be mapped to different interaction commands for different embodiments. In at least one embodiment, Left-right sliding of the index finger on the front touch pad can be mapped to a window scrolling operation. In other embodiments, up-down swiping of the index finger on the front touch pad may be mapped to a window scrolling operation.

All functionalities (e.g. three-button-hold), as disclosed in FIGS. 1-29, triggered by the operations on thumb button, thumb touchpad, index button, index touch pad, and middle button, individually or combined, may apply to the embodiment illustrated in FIG. 33, directly via top button, top touchpad, front button, front touchpad, and side button.

As illustrated in FIG. 9, if the controller in FIG. 9 is configured for a shooting game, the index button can be used as a trigger, and the middle button can be used for reload. Similarly, in some embodiments, as illustrated in FIG. 33, the front button can be used as the trigger while the side button can be used for reload.

In some alternative embodiments, when the controller as illustrated in FIG. 12 is configured to remotely control a PC, to activate a zoom-out operation, the thumb moves from right to left on the thumb touch pad, simultaneously the index finger moves from right to left on the index touch pad. Similar operations by the thumb and the index fingers as illustrated in FIG. 33 can perform the same zoom-out operation. In some embodiments, since the middle button as illustrated in FIG. 33 does not have a touchpad connected to it, functionalities of the middle touchpad in FIGS. 1-29, for example the switch operation as illustrated in FIG. 14, can be defined and implemented by different finger operations and/or with other buttons and touchpads of the device 3000.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. An electronic controller device, comprising:
a first button component including a first touch pad, the first button component configured to register a press action by a first finger of a hand of a user holding the electronic controller device in the air, the first touch pad configured to register a touch gesture by the first finger;
a second button component including a second touch pad, the second button component configured to register a press action by a second finger of the hand of the user holding the electronic controller device in the air, the second touch pad configured to register a touch gesture by the second finger;
a processing circuit configured to:
detect a first touch gesture of the first finger on the first touch pad of the first button component, the first touch gesture being detected based on at least one of a first direction or a first distance of movement of the first finger on the first touch pad;
detect a second touch gesture of the second finger on the second touch pad of the second button component, the second touch gesture being detected based on at least one of a second direction or a second distance of movement of the second finger on the second touch pad;
generate a first input signal for an external device based on at least one of the first touch gesture or the second touch gesture;
detect one or more first press actions of the first finger on the first button component, each of the one or more first press actions being detected based on comparing a first pressure exerted by the first finger on the first button component against a first threshold;

detect one or more second press actions of the second finger on the second button component, each of the one or more second press actions being detected based on comparing a second pressure exerted by the second finger on the second button component against a second threshold; and generate a second input signal for the external device based on at least one of the one or more first press actions or the one or more second press actions; and a communication interface configured to:
transmit the first input signal to the external device to cause the external device to perform a first function; and
transmit the second input signal to the external device to cause the external device to perform a second function.

2. The electronic controller device of claim 1, further comprising:
a housing having a top surface,
wherein the first button component is located on the top surface of the housing such that a thumb of the hand rests on the first button component when the user holds the electronic controller device with the hand.

3. The electronic controller device of claim 1, further comprising:
a housing having a head end,
wherein the second button component is located on the head end of the housing such that an index finger of the hand rests on the second button component when the user holds the electronic controller device with the hand.

4. The electronic controller device of claim 1, further comprising:
a housing having a side surface and a bottom concave area; and
a third button component configured to register a press action,
wherein the third button component is located on the side surface of the housing such that a middle finger of the hand wraps around the bottom concave area and a tip of the middle finger rests on the third button component when the user holds the electronic controller device with the hand.

5. The electronic controller device of claim 4, wherein the third button component includes a third touch pad, the third touch pad configured to register a touch gesture by the middle finger.

6. The electronic controller device of claim 1, wherein the second input signal include information of locations of at least one of the first touch gesture or the second touch gesture on, respectively, the first and second touch pads.

7. The electronic controller device of claim 1, further comprising:
a housing having an ergonomic shape that fits human hand arches.

8. The electronic controller device of claim 1, wherein the first and second button components are configured to register the first touch gesture and the second touch gesture simultaneously.

9. The electronic controller device of claim 1, further comprising:
a motion sensor configured to detect a location, a motion, or an orientation of the electronic controller device.

10. The electronic controller device of claim 1, wherein at least one of the first and second button components includes a haptic component configured to provide haptic feedback.

11. The electronic controller device of claim 1, further comprising:
a lighting component having a ring shape that outlines an edge of the first button component, the lighting component configured to emit light to indicate a status of the electronic controller device.

12. The electronic controller device of claim 1, wherein at least one of the first and second touch pads is configured to detect touch gestures by multiple fingers simultaneously.

13. The electronic controller device of claim 1, wherein the communication interface is a wireless communication interface or a connector for an external cable.

14. The electronic controller device of claim 1, wherein the external device comprises a display device;
wherein the second input signal is configured to indicate to the external device to change a 3-D view point of the display device; and
wherein the first input signal is configured to indicate a direction and a degree of rotation of the 3-D view point of the display device.

15. The electronic controller device of claim 1, wherein the external device comprises a display device to display a mouse cursor and a text box;
wherein the first input signal is configured to set a location of the mouse cursor on the display device; and
wherein the second input signal is configured to locate a text cursor in the text box.

16. The electronic controller device of claim 1, wherein the external device comprises a display device to display texts;
wherein the first input signal is configured to select a subset of the texts for editing; and
wherein the second input signal is configured to cause the display device to display a keyboard to edit the selected subset of the texts.

17. The electronic controller device of claim 1, wherein the second input signal is configured to establish a wireless connection between the communication interface and the external device; and
wherein the first input signal is transmitted via the wireless connection.

18. The electronic controller device of claim 1, wherein the external device comprises an eyewear that functions as a display device.

19. The electronic controller device of claim 1, wherein the second input signal is configured to set an operation mode of the external device; and
wherein the first input signal is configured to change a function of the external device within the operation mode.

20. The electronic controller device of claim 1, wherein the external device comprises a display device to display a mouse cursor and a text box;
wherein the first input signal is configured to set a location of the mouse cursor on the display device; and
wherein the second input signal is configured to select an item that overlaps with at least a part of the mouse cursor on the display device.

21. The electronic controller device of claim 1, wherein the first button component and the second button component face different directions.

22. The electronic controller device of claim 1, wherein the first signal is generated based on at least one of: detecting a first number of the one or more first press actions, or detecting a second number of the one or more second press actions.

23. A method of detecting user inputs, comprising:
- detecting, by a processing circuit via a first button component of a controller device, one or more first press actions by a first finger of a hand of a user holding the controller device in the air, each of the one or more first press actions being detected based on comparing a first pressure exerted by the first finger on the first button component against a first threshold;
- detecting, by the processing circuit via a first touch pad included in the first button component, a first touch gesture by the first finger, the first touch gesture being detected based on at least one of a first direction or a first distance of movement of the first finger on the first touch pad;
- detecting, by the processing circuit via a second button component of the controller device, one or more second press actions by a second finger of the hand of the user holding the controller device in the air, each of the one or more second press actions being detected based on comparing a second pressure exerted by the second finger on the second button component against a second threshold;
- detecting, by the processing circuit via a second touch pad included in the second button component, a second touch gesture by the second finger, the second touch gesture being detected based on at least one of a second direction or a second distance of movement of the second finger on the second touch pad;
- generating, by the processing circuit, a first input signal for an external device based on at least one of the first touch gesture or the second touch gesture;
- transmitting, by the processing circuit, the first input signal to the external device via a communication interface of the controller device to cause the external device to perform a first function;
- generating, by the processing circuit, a second input signal for the external device based on at least one of the one or more first press actions or the one or more second press actions; and
- transmitting, by the processing circuit, the second input signal to the external device via the communication interface of the controller device to cause the external device to perform a second function.

24. The method of claim 23, further comprising:
- detecting, by the processing circuit and via a third button component, at least one of a third touch gesture or a third press action when a middle finger of the hand wraps around a bottom concave area of a surface of the controller device and a tip of the middle finger rests on the third button component, wherein the third button component is located on a side surface of the controller device.

25. The method of claim 23, wherein at least one of the first touch gesture or the one or more first press actions is detected by the first button component when the hand holds the controller device and a thumb of the hand rests on the first button component; and
- wherein the first button component is located on a top surface of the controller device.

26. The method of claim 23, wherein at least one of the second touch gesture or the one or more second press actions is detected by the second button component when the hand holds the controller device and an index finger of the hand rests on the second button component; and
- wherein the second button component is located on a head end of the controller device.

27. The method of claim 23, wherein the first touch gesture and the second touch gesture are detected simultaneously.

28. The method of claim 23, wherein at least one of the first and second touch pads are configured to register touch gestures by multiple fingers simultaneously.

29. The method of claim 23, further comprising:
- emitting light that indicates a status of the controller device.

30. The method of claim 23, further comprising:
- detecting a location, a motion or an orientation of the controller device by a sensor of the controller device.

31. The method of claim 23, further comprising:
- receiving an instruction from the external device via the communication interface; and
- in response to the instruction, performing a haptic feedback by a haptic component of the controller device.

* * * * *